(12) United States Patent
Graus et al.

(10) Patent No.: US 12,552,215 B2
(45) Date of Patent: Feb. 17, 2026

(54) ADJUSTABLE SUSPENSIONS AND VEHICLE OPERATION FOR OFF-ROAD RECREATIONAL VEHICLES

(71) Applicant: Polaris Industries Inc., Medina, MN (US)

(72) Inventors: Jonathon P. Graus, Stacy, MN (US); David D. Helgeson, Vadnais Heights, MN (US); Kyle W. Olson, Coon Rapids, MN (US); Justin T. Anderson, Stacy, MN (US); Jacob P. Horky, Shoreview, MN (US); Kevin P. Blair, Novi, MI (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/402,214

(22) Filed: Jan. 2, 2024

(65) Prior Publication Data

US 2024/0131892 A1  Apr. 25, 2024

Related U.S. Application Data

(63) Continuation of application No. 17/379,675, filed on Jul. 19, 2021, now Pat. No. 11,904,648.

(Continued)

(51) Int. Cl.
*B60G 17/016* (2006.01)
*B60G 15/06* (2006.01)
(Continued)

(52) U.S. Cl.
CPC ........ *B60G 17/0164* (2013.01); *B60G 15/06* (2013.01); *B60G 17/01908* (2013.01);
(Continued)

(58) Field of Classification Search
CPC .. B60G 21/0558; B60G 21/055; B60G 15/06; B60G 17/01908; B60G 17/01933;
(Continued)

(56) References Cited

U.S. PATENT DOCUMENTS 3,013,442 A  12/1961  Fox et al.
3,400,945 A   9/1968  Sampietro
(Continued)

FOREIGN PATENT DOCUMENTS

AU  2012323853 A1  5/2014
AU  2015328248 A1  5/2017
(Continued)

OTHER PUBLICATIONS

International Preliminary Report on Patentability received for PCT Patent Application No. PCT/US2021/042230, mailed on Jan. 26, 2023, 10 pages.
(Continued)

*Primary Examiner* — Jason D Shanske
*Assistant Examiner* — Matthew James O'Neill
(74) *Attorney, Agent, or Firm* — SCHWEGMAN LUNDBERG & WOESSNER, P.A.

(57) ABSTRACT

Suspension systems for recreational vehicles are disclosed. The suspension systems may include at least one adjustable member coupling a sway bar to respective suspensions. The suspension systems may include a torque actuator associated with a sway bar.

9 Claims, 54 Drawing Sheets

Related U.S. Application Data

(60) Provisional application No. 63/216,341, filed on Jun. 29, 2021, provisional application No. 63/183,554, filed on May 3, 2021, provisional application No. 63/053,278, filed on Jul. 17, 2020.

(51) Int. Cl.
*B60G 17/019* (2006.01)
*B60G 17/08* (2006.01)
*B60G 21/055* (2006.01)

(52) U.S. Cl.
CPC ....... *B60G 17/01933* (2013.01); *B60G 17/08* (2013.01); *B60G 21/055* (2013.01); *B60G 2202/30* (2013.01); *B60G 2202/31* (2013.01); *B60G 2202/442* (2013.01); *B60G 2204/8302* (2013.01); *B60G 2300/07* (2013.01); *B60G 2400/104* (2013.01); *B60G 2400/204* (2013.01); *B60G 2401/16* (2013.01); *B60G 2500/114* (2013.01)

(58) Field of Classification Search
CPC ............................ B60G 17/0164; B60G 17/08; B60G 2202/30; B60G 2202/31; B60G 2202/442; B60G 2204/8302; B60G 2300/07; B60G 2400/104; B60G 2400/204; B60G 2401/16; B60G 2500/114
See application file for complete search history.

(56) References Cited

U.S. PATENT DOCUMENTS

| | | |
|---|---|---|
| 3,623,565 A | 11/1971 | Ward et al. |
| 3,737,001 A | 6/1973 | Rasenberger |
| 3,760,246 A | 9/1973 | Wright et al. |
| 3,861,229 A | 1/1975 | Domaas |
| 3,933,213 A | 1/1976 | Trowbridge |
| 3,952,829 A | 4/1976 | Gray |
| 3,982,446 A | 9/1976 | Van Dyken |
| 4,075,841 A | 2/1978 | Hamma et al. |
| 4,112,885 A | 9/1978 | Iwata et al. |
| 4,116,006 A | 9/1978 | Wallis |
| 4,319,658 A | 3/1982 | Collonia et al. |
| 4,327,948 A | 5/1982 | Beck et al. |
| 4,340,126 A | 7/1982 | Larson |
| 4,453,516 A | 6/1984 | Filsinger |
| 4,462,480 A | 7/1984 | Yasui et al. |
| 4,508,078 A | 4/1985 | Takeuchi et al. |
| 4,580,537 A | 4/1986 | Uchiyama |
| 4,600,215 A | 7/1986 | Kuroki et al. |
| 4,620,602 A | 11/1986 | Capriotti |
| 4,658,662 A | 4/1987 | Rundle |
| 4,671,235 A | 6/1987 | Hosaka |
| 4,688,533 A | 8/1987 | Otobe |
| 4,691,676 A | 9/1987 | Kikuchi |
| 4,691,677 A | 9/1987 | Hotate et al. |
| 4,722,548 A | 2/1988 | Hamilton et al. |
| 4,741,554 A | 5/1988 | Okamoto |
| 4,749,210 A | 6/1988 | Sugasawa |
| 4,759,329 A | 7/1988 | Nobuo et al. |
| 4,765,296 A | 8/1988 | Ishikawa et al. |
| 4,779,895 A | 10/1988 | Rubel |
| 4,781,162 A | 11/1988 | Ishikawa et al. |
| 4,785,782 A | 11/1988 | Tanaka et al. |
| 4,787,353 A | 11/1988 | Ishikawa et al. |
| 4,805,923 A | 2/1989 | Soltis |
| 4,809,179 A | 2/1989 | Klingler et al. |
| 4,809,659 A | 3/1989 | Tamaki et al. |
| 4,817,466 A | 4/1989 | Kawamura et al. |
| 4,819,174 A | 4/1989 | Furuno et al. |
| 4,826,205 A | 5/1989 | Kouda et al. |
| 4,827,416 A | 5/1989 | Kawagoe et al. |
| 4,831,533 A | 5/1989 | Per-Harald |
| 4,838,780 A | 6/1989 | Yamagata et al. |
| 4,856,477 A | 8/1989 | Hanaoka et al. |
| 4,860,708 A | 8/1989 | Yamaguchi et al. |
| 4,862,854 A | 9/1989 | Oda et al. |
| 4,867,474 A | 9/1989 | Smith |
| 4,881,428 A | 11/1989 | Ishikawa et al. |
| 4,893,501 A | 1/1990 | Sogawa |
| 4,895,343 A | 1/1990 | Sato |
| 4,898,137 A | 2/1990 | Fujita et al. |
| 4,898,138 A | 2/1990 | Nishimura et al. |
| 4,901,695 A | 2/1990 | Kabasin et al. |
| 4,903,983 A | 2/1990 | Fukushima et al. |
| 4,905,783 A | 3/1990 | Bober |
| 4,913,006 A | 4/1990 | Tsuyama et al. |
| 4,919,097 A | 4/1990 | Mitui et al. |
| 4,926,636 A | 5/1990 | Tadokoro et al. |
| 4,927,170 A | 5/1990 | Wada |
| 4,930,082 A | 5/1990 | Harara et al. |
| 4,934,667 A | 6/1990 | Pees et al. |
| 4,949,262 A | 8/1990 | Buma et al. |
| 4,949,989 A | 8/1990 | Kakizaki et al. |
| 4,961,146 A | 10/1990 | Kajiwara |
| 4,966,247 A | 10/1990 | Masuda |
| 4,969,695 A | 11/1990 | Maehata et al. |
| 5,000,278 A | 3/1991 | Morishita |
| 5,002,028 A | 3/1991 | Arai et al. |
| 5,002,148 A | 3/1991 | Miyake et al. |
| 5,015,009 A | 5/1991 | Ohyama et al. |
| 5,018,408 A | 5/1991 | Bota et al. |
| 5,024,460 A | 6/1991 | Hanson et al. |
| 5,029,328 A | 7/1991 | Kamimura et al. |
| 5,033,328 A | 7/1991 | Shimanaka |
| 5,036,939 A | 8/1991 | Johnson et al. |
| 5,037,128 A | 8/1991 | Okuyama et al. |
| 5,040,114 A | 8/1991 | Ishikawa et al. |
| 5,054,813 A | 10/1991 | Kakizaki |
| 5,060,744 A | 10/1991 | Katoh et al. |
| 5,062,657 A | 11/1991 | Majeed |
| 5,071,157 A | 12/1991 | Majeed |
| 5,071,158 A | 12/1991 | Yonekawa et al. |
| 5,076,385 A | 12/1991 | Terazawa et al. |
| 5,078,109 A | 1/1992 | Yoshida et al. |
| 5,080,392 A | 1/1992 | Bazergui |
| 5,083,811 A | 1/1992 | Sato et al. |
| 5,088,464 A | 2/1992 | Meaney |
| 5,092,298 A | 3/1992 | Suzuki et al. |
| 5,092,624 A | 3/1992 | Fukuyama et al. |
| 5,096,219 A | 3/1992 | Hanson et al. |
| 5,105,923 A | 4/1992 | Iizuka |
| 5,113,345 A | 5/1992 | Mine et al. |
| 5,113,821 A | 5/1992 | Fukui et al. |
| 5,114,177 A | 5/1992 | Fukunaga et al. |
| 5,129,475 A | 7/1992 | Kawano et al. |
| 5,144,559 A | 9/1992 | Kamimura et al. |
| 5,150,635 A | 9/1992 | Minowa et al. |
| 5,161,822 A | 11/1992 | Lund |
| 5,163,538 A | 11/1992 | Derr et al. |
| 5,170,343 A | 12/1992 | Matsuda |
| 5,174,263 A | 12/1992 | Meaney |
| 5,189,615 A | 2/1993 | Rubel et al. |
| 5,218,540 A | 6/1993 | Ishikawa et al. |
| 5,233,530 A | 8/1993 | Shimada et al. |
| 5,253,728 A | 10/1993 | Matsuno et al. |
| 5,265,693 A | 11/1993 | Rees et al. |
| 5,307,777 A | 5/1994 | Sasajima et al. |
| 5,314,362 A | 5/1994 | Nagahora |
| 5,315,295 A | 5/1994 | Fujii |
| 5,337,239 A | 8/1994 | Okuda |
| 5,342,023 A | 8/1994 | Kuriki et al. |
| 5,343,396 A | 8/1994 | Youngblood |
| 5,343,780 A | 9/1994 | McDaniel et al. |
| 5,350,187 A | 9/1994 | Shinozaki |
| 5,361,209 A | 11/1994 | Tsutsumi |
| 5,361,213 A | 11/1994 | Fujieda et al. |
| 5,362,094 A | 11/1994 | Jensen |
| 5,366,236 A | 11/1994 | Kuriki et al. |
| 5,375,872 A | 12/1994 | Ohtagaki et al. |
| 5,377,107 A | 12/1994 | Shimizu et al. |
| 5,383,680 A | 1/1995 | Bock et al. |
| 5,384,705 A | 1/1995 | Inagaki et al. |

(56) References Cited

U.S. PATENT DOCUMENTS

| | | |
|---|---|---|
| 5,390,121 A | 2/1995 | Wolfe |
| 5,391,127 A | 2/1995 | Nishimura |
| RE34,906 E | 4/1995 | Tamaki et al. |
| 5,406,920 A | 4/1995 | Murata et al. |
| 5,413,540 A | 5/1995 | Streib et al. |
| 5,443,558 A | 8/1995 | Ibaraki et al. |
| 5,444,621 A | 8/1995 | Matsunaga et al. |
| 5,446,663 A | 8/1995 | Sasaki et al. |
| 5,467,751 A | 11/1995 | Kumagai |
| 5,475,593 A | 12/1995 | Townend |
| 5,475,596 A | 12/1995 | Henry et al. |
| 5,483,448 A | 1/1996 | Liubakka et al. |
| 5,485,161 A | 1/1996 | Vaughn |
| 5,490,487 A | 2/1996 | Kato et al. |
| 5,510,985 A | 4/1996 | Yamaoka et al. |
| 5,514,049 A | 5/1996 | Kamio et al. |
| 5,515,273 A | 5/1996 | Sasaki et al. |
| 5,521,825 A | 5/1996 | Unuvar et al. |
| 5,524,724 A | 6/1996 | Nishigaki et al. |
| 5,550,739 A | 8/1996 | Hoffmann et al. |
| 5,555,499 A | 9/1996 | Yamashita et al. |
| 5,575,737 A | 11/1996 | Weiss |
| 5,586,032 A | 12/1996 | Kallenbach et al. |
| 5,611,309 A | 3/1997 | Kumagai et al. |
| 5,630,623 A | 5/1997 | Ganzel |
| 5,632,503 A | 5/1997 | Raad et al. |
| 5,645,033 A | 7/1997 | Person et al. |
| 5,678,847 A | 10/1997 | Izawa et al. |
| 5,713,428 A | 2/1998 | Linden et al. |
| 5,749,596 A | 5/1998 | Jensen et al. |
| 5,774,820 A | 6/1998 | Linden et al. |
| 5,832,398 A | 11/1998 | Sasaki et al. |
| 5,845,726 A | 12/1998 | Kikkawa et al. |
| 5,873,802 A | 2/1999 | Tabata et al. |
| 5,880,532 A | 3/1999 | Stopher |
| 5,890,870 A | 4/1999 | Berger et al. |
| 5,897,287 A | 4/1999 | Berger et al. |
| 5,921,889 A | 7/1999 | Nozaki et al. |
| 5,922,038 A | 7/1999 | Horiuchi et al. |
| 5,938,556 A | 8/1999 | Lowell |
| 5,957,992 A | 9/1999 | Kiyono |
| 5,992,558 A | 11/1999 | Noro et al. |
| 6,000,702 A | 12/1999 | Streiter |
| 6,002,975 A | 12/1999 | Schiffmann et al. |
| 6,016,795 A | 1/2000 | Ohki |
| 6,019,085 A | 2/2000 | Sato et al. |
| 6,032,752 A | 3/2000 | Karpik et al. |
| 6,038,500 A | 3/2000 | Weiss |
| 6,070,681 A | 6/2000 | Catanzarite et al. |
| 6,073,072 A | 6/2000 | Ishii et al. |
| 6,073,074 A | 6/2000 | Saito et al. |
| 6,076,027 A | 6/2000 | Raad et al. |
| 6,078,252 A | 6/2000 | Kulczycki et al. |
| 6,086,510 A | 7/2000 | Kadota |
| 6,094,614 A | 7/2000 | Hiwatashi |
| 6,112,866 A | 9/2000 | Boichot et al. |
| 6,120,399 A | 9/2000 | Okeson et al. |
| 6,122,568 A | 9/2000 | Madau et al. |
| 6,124,826 A | 9/2000 | Garthwaite et al. |
| 6,125,326 A | 9/2000 | Ohmura et al. |
| 6,125,782 A | 10/2000 | Takashima et al. |
| 6,134,499 A | 10/2000 | Goode et al. |
| 6,138,069 A | 10/2000 | Ellertson et al. |
| 6,148,252 A | 11/2000 | Iwasaki et al. |
| 6,154,703 A | 11/2000 | Nakai et al. |
| 6,155,545 A | 12/2000 | Noro et al. |
| 6,157,297 A | 12/2000 | Nakai |
| 6,157,890 A | 12/2000 | Nakai et al. |
| 6,161,908 A | 12/2000 | Takayama et al. |
| 6,167,341 A | 12/2000 | Gourmelen et al. |
| 6,170,923 B1 | 1/2001 | Iguchi et al. |
| 6,176,796 B1 | 1/2001 | Lislegard |
| 6,178,371 B1 | 1/2001 | Light et al. |
| 6,181,997 B1 | 1/2001 | Badenoch et al. |
| 6,192,305 B1 | 2/2001 | Schiffmann |
| 6,206,124 B1 | 3/2001 | Mallette et al. |
| 6,217,480 B1 | 4/2001 | Iwata et al. |
| 6,226,389 B1 | 5/2001 | Lemelson et al. |
| 6,240,365 B1 | 5/2001 | Bunn |
| 6,244,398 B1 | 6/2001 | Girvin et al. |
| 6,244,986 B1 | 6/2001 | Mori et al. |
| 6,249,728 B1 | 6/2001 | Streiter |
| 6,249,744 B1 | 6/2001 | Morita |
| 6,254,108 B1 | 7/2001 | Germain et al. |
| 6,260,650 B1 | 7/2001 | Gustavsson |
| 6,263,858 B1 | 7/2001 | Pursifull et al. |
| 6,275,763 B1 | 8/2001 | Lotito et al. |
| 6,276,333 B1 | 8/2001 | Kazama et al. |
| 6,288,534 B1 | 9/2001 | Starkweather et al. |
| 6,290,034 B1 | 9/2001 | Ichimaru |
| 6,318,337 B1 | 11/2001 | Pursifull |
| 6,318,490 B1 | 11/2001 | Laning |
| 6,343,248 B1 | 1/2002 | Rizzotto et al. |
| 6,351,704 B1 | 2/2002 | Koerner |
| 6,352,142 B1 | 3/2002 | Kim |
| 6,370,458 B1 | 4/2002 | Shal et al. |
| 6,370,472 B1 | 4/2002 | Fosseen |
| 6,371,884 B1 | 4/2002 | Channing |
| 6,379,114 B1 | 4/2002 | Schott et al. |
| 6,427,115 B1 | 7/2002 | Sekiyama |
| 6,456,908 B1 | 9/2002 | Kumar |
| 6,463,385 B1 | 10/2002 | Fry |
| 6,470,852 B1 | 10/2002 | Kanno |
| 6,476,714 B2 | 11/2002 | Mizuta |
| 6,483,201 B1 | 11/2002 | Klarer |
| 6,483,467 B2 | 11/2002 | Kushida et al. |
| 6,485,340 B1 | 11/2002 | Kolb et al. |
| 6,488,609 B1 | 12/2002 | Morimoto et al. |
| 6,502,025 B1 | 12/2002 | Kempen |
| 6,507,778 B2 | 1/2003 | Koh |
| 6,513,611 B2 | 2/2003 | Ito et al. |
| 6,526,342 B1 | 2/2003 | Burdock et al. |
| 6,551,153 B1 | 4/2003 | Hattori |
| 6,573,827 B1 | 6/2003 | McKenzie |
| 6,581,710 B2 | 6/2003 | Sprinkle et al. |
| 6,604,034 B1 | 8/2003 | Speck et al. |
| 6,644,318 B1 | 11/2003 | Adams et al. |
| 6,647,328 B2 | 11/2003 | Walker |
| 6,655,233 B2 | 12/2003 | Evans et al. |
| 6,657,539 B2 | 12/2003 | Yamamoto et al. |
| 6,675,577 B2 | 1/2004 | Evans |
| 6,684,140 B2 | 1/2004 | Lu |
| 6,685,174 B2 | 2/2004 | Behmenburg et al. |
| 6,699,085 B2 | 3/2004 | Hattori |
| 6,704,643 B1 | 3/2004 | Suhre et al. |
| 6,719,313 B2 * | 4/2004 | Zadok ............... B60G 17/021 280/5.509 |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 | 5/2005 | Barton et al. |
| 6,895,518 B2 | 5/2005 | Wingen |
| 6,897,629 B2 | 5/2005 | Wilton et al. |
| 6,938,508 B1 | 9/2005 | Saagge |

(56) References Cited

U.S. PATENT DOCUMENTS

| | | |
|---|---|---|
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B2 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,305,295 B2 | 12/2007 | Bauerle et al. |
| 7,311,082 B2 | 12/2007 | Yokoi |
| 7,315,779 B2 | 1/2008 | Rioux et al. |
| 7,316,288 B1 | 1/2008 | Bennett et al. |
| 7,318,410 B2 | 1/2008 | Yokoi |
| 7,318,593 B2 | 1/2008 | Sterly et al. |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | Mcintyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,204,666 B2 | 6/2012 | Takeuchi et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |

(56) References Cited

U.S. PATENT DOCUMENTS

| | | |
|---|---|---|
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,359,149 B2 | 1/2013 | Shin |
| 8,374,748 B2 | 2/2013 | Jolly |
| 8,376,373 B2 | 2/2013 | Conradie |
| 8,382,130 B2 | 2/2013 | Nakamura |
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,651,503 B2 | 2/2014 | Rhodig |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Yang |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 8,973,930 B2 | 3/2015 | Rhodig |
| 8,994,494 B2 | 3/2015 | Koenig et al. |
| 8,997,952 B2 | 4/2015 | Getz et al. |
| 9,010,768 B2 | 4/2015 | Kinsman et al. |
| 9,027,937 B2 | 5/2015 | Ryan et al. |
| 9,038,791 B2 | 5/2015 | Marking |
| 9,050,869 B1 | 6/2015 | Pelzer |
| 9,123,249 B2 | 9/2015 | Braunberger et al. |
| 9,150,070 B2 | 10/2015 | Luttinen et al. |
| 9,151,384 B2 | 10/2015 | Kohler et al. |
| 9,162,573 B2 | 10/2015 | Grajkowski et al. |
| 9,186,952 B2 | 11/2015 | Yleva |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,365,251 B2 | 6/2016 | Safranski et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,643,616 B2 | 5/2017 | Lu |
| 9,662,954 B2 | 5/2017 | Scheuerell et al. |
| 9,665,418 B2 | 5/2017 | Arnott et al. |
| 9,695,899 B2 | 7/2017 | Smith et al. |
| 9,771,084 B2 | 9/2017 | Norstad |
| 9,802,621 B2 | 10/2017 | Gillingham et al. |
| 9,809,195 B2 | 11/2017 | Giese et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,920,810 B2 | 3/2018 | Smeljanskij et al. |
| 9,937,762 B2 | 4/2018 | Sunahiro |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,137,873 B2 | 11/2018 | Bowers et al. |
| 10,154,377 B2 | 12/2018 | Post et al. |
| 10,189,428 B1 | 1/2019 | Sellars et al. |
| 10,195,989 B2 | 2/2019 | Braunberger et al. |
| 10,202,159 B2 | 2/2019 | Braunberger et al. |
| 10,207,554 B2 | 2/2019 | Schroeder et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,363,941 B2 | 7/2019 | Norstad |
| 10,384,682 B2 | 8/2019 | Braunberger et al. |
| 10,391,989 B2 | 8/2019 | Braunberger |
| 10,406,884 B2 | 9/2019 | Oakden-Graus et al. |
| 10,410,520 B2 | 9/2019 | Braunberger et al. |
| 10,436,125 B2 | 10/2019 | Braunberger et al. |
| 10,450,006 B2 * | 10/2019 | Kinsman ................ B60N 2/015 |
| 10,479,408 B2 | 11/2019 | Upah et al. |
| 10,578,184 B2 | 3/2020 | Gilbert et al. |
| 10,704,640 B2 | 7/2020 | Galasso et al. |
| 10,723,408 B2 | 7/2020 | Pelot |
| 10,731,724 B2 | 8/2020 | Laird et al. |
| 10,774,896 B2 | 9/2020 | Hamers et al. |
| 10,933,710 B2 | 3/2021 | Tong |
| 10,981,429 B2 | 4/2021 | Tsiaras et al. |
| 11,001,120 B2 | 5/2021 | Cox |
| 11,110,913 B2 | 9/2021 | Krosschell et al. |
| 11,124,036 B2 | 9/2021 | Brady et al. |
| 11,142,033 B2 | 10/2021 | Yoshida et al. |
| 11,148,748 B2 | 10/2021 | Galasso |
| 11,162,555 B2 | 11/2021 | Haugen |
| 11,192,414 B1 | 12/2021 | Berardi |
| 11,192,424 B2 | 12/2021 | Tabata et al. |
| 11,279,198 B2 | 3/2022 | Marking |
| 11,285,964 B2 | 3/2022 | Norstad et al. |
| 11,306,798 B2 | 4/2022 | Cox et al. |
| 11,351,834 B2 | 6/2022 | Cox |
| 11,364,762 B2 | 6/2022 | Hadi |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox et al. |
| 11,448,283 B2 | 9/2022 | Strickland |
| 11,472,252 B2 | 10/2022 | Tong |
| 11,479,075 B2 | 10/2022 | Graus et al. |
| 11,904,648 B2 | 2/2024 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0082752 A1 | 6/2002 | Obradovich |
| 2002/0113185 A1 | 8/2002 | Ziegler |
| 2002/0113393 A1 | 8/2002 | Urbach |
| 2002/0115357 A1 | 8/2002 | Hiki et al. |

(56) References Cited

U.S. PATENT DOCUMENTS

| | | |
|---|---|---|
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |
| 2005/0027428 A1 | 2/2005 | Glora et al. |
| 2005/0045148 A1 | 3/2005 | Katsuragawa et al. |
| 2005/0077696 A1 | 4/2005 | Ogawa |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2005/0284446 A1 | 12/2005 | Okuyama |
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1 | 12/2006 | Takamatsu et al. |
| 2006/0284387 A1 | 12/2006 | Klees |
| 2007/0007742 A1 | 1/2007 | Allen et al. |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1 | 11/2007 | Langer |
| 2007/0271026 A1 | 11/2007 | Hijikata |
| 2007/0294008 A1 | 12/2007 | Yasui et al. |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1 | 5/2008 | Hrovat et al. |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1 | 1/2009 | Germain |
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |
| 2009/0095254 A1 | 4/2009 | Yamada |
| 2009/0096598 A1 | 4/2009 | Tengler et al. |
| 2009/0108546 A1 | 4/2009 | Ohletz et al. |
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | Mcintyre |
| 2009/0287392 A1 | 11/2009 | Thomas |
| 2009/0301830 A1 | 12/2009 | Kinsman et al. |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |

(56) References Cited

U.S. PATENT DOCUMENTS

| | | |
|---|---|---|
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | Mackenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0025012 A1 | 2/2011 | Nakamura |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0215544 A1 | 9/2011 | Rhodig |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |
| 2012/0191302 A1 | 7/2012 | Sternecker et al. |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0125027 A1 | 5/2014 | Rhodig |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1 | 8/2014 | Oshita et al. |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0084290 A1 | 3/2015 | Norton et al. |
| 2015/0091269 A1 | 4/2015 | Yleva |
| 2015/0108732 A1 | 4/2015 | Luttinen et al. |
| 2015/0217778 A1 | 8/2015 | Fairgrieve et al. |
| 2015/0329141 A1 | 11/2015 | Preijert |
| 2016/0059660 A1 | 3/2016 | Brady et al. |
| 2016/0082802 A1 | 3/2016 | Izak |
| 2016/0107498 A1 | 4/2016 | Yamazaki |
| 2016/0121689 A1 | 5/2016 | Park et al. |
| 2016/0121905 A1 | 5/2016 | Gillingham et al. |
| 2016/0121924 A1 | 5/2016 | Norstad |
| 2016/0153516 A1 | 6/2016 | Marking |
| 2016/0200164 A1 | 7/2016 | Tabata et al. |
| 2016/0214455 A1 | 7/2016 | Reul et al. |
| 2016/0236528 A1* | 8/2016 | Sunahiro ............... B60G 3/20 |
| 2016/0347137 A1* | 12/2016 | Despres-Nadeau .... B60G 3/202 |
| 2016/0347142 A1 | 12/2016 | Seong et al. |
| 2017/0008363 A1 | 1/2017 | Ericksen et al. |
| 2017/0043778 A1 | 2/2017 | Kelly |
| 2017/0087950 A1 | 3/2017 | Brady et al. |
| 2017/0129298 A1 | 5/2017 | Lu et al. |
| 2017/0129301 A1* | 5/2017 | Harvey ............... F16F 1/3873 |
| 2017/0129390 A1 | 5/2017 | Akaza et al. |
| 2017/0313152 A1 | 11/2017 | Kang |
| 2017/0321729 A1 | 11/2017 | Melcher |
| 2018/0001729 A1 | 1/2018 | Goffer et al. |
| 2018/0009443 A1 | 1/2018 | Norstad |
| 2018/0126817 A1 | 5/2018 | Russell et al. |
| 2018/0141543 A1 | 5/2018 | Krosschell et al. |
| 2018/0264902 A1 | 9/2018 | Schroeder et al. |
| 2018/0265062 A1 | 9/2018 | Bowers et al. |
| 2018/0297435 A1 | 10/2018 | Brady et al. |
| 2018/0339566 A1 | 11/2018 | Ericksen et al. |
| 2018/0354336 A1 | 12/2018 | Oakden-Graus et al. |
| 2018/0361853 A1 | 12/2018 | Grajkowski et al. |
| 2019/0100071 A1* | 4/2019 | Tsiaras .................. F16F 9/46 |
| 2019/0118604 A1 | 4/2019 | Suplin et al. |
| 2019/0118898 A1 | 4/2019 | Ericksen et al. |
| 2019/0217894 A1 | 7/2019 | Upah et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0156430 A1 | 5/2020 | Oakden-Graus et al. |
| 2020/0223279 A1 | 7/2020 | Mckeefery |
| 2020/0238781 A1 | 7/2020 | Hadi |
| 2020/0269648 A1 | 8/2020 | Halper |
| 2020/0282786 A1 | 9/2020 | Lorenz et al. |
| 2021/0031579 A1 | 2/2021 | Booth et al. |
| 2021/0031713 A1 | 2/2021 | Kotrla et al. |
| 2021/0070124 A1 | 3/2021 | Brady et al. |

(56) References Cited

U.S. PATENT DOCUMENTS

| | | |
|---|---|---|
| 2021/0070125 A1 | 3/2021 | Brady et al. |
| 2021/0070126 A1 | 3/2021 | Brady et al. |
| 2021/0086578 A1 | 3/2021 | Scheuerell et al. |
| 2021/0088100 A1 | 3/2021 | Woelfel |
| 2021/0102596 A1 | 4/2021 | Malmborg et al. |
| 2021/0108696 A1 | 4/2021 | Connor |
| 2021/0162830 A1 | 6/2021 | Graus et al. |
| 2021/0162833 A1 | 6/2021 | Graus et al. |
| 2021/0206263 A1 | 7/2021 | Grajkowski et al. |
| 2021/0229519 A1 | 7/2021 | Tsiaras et al. |
| 2021/0268860 A1 | 9/2021 | Randall |
| 2021/0300140 A1 | 9/2021 | Ericksen et al. |
| 2021/0300141 A1 | 9/2021 | De Grammont et al. |
| 2021/0316716 A1 | 10/2021 | Krosschell et al. |
| 2021/0362806 A1 | 11/2021 | Hedlund et al. |
| 2021/0379957 A1 | 12/2021 | Tabata et al. |
| 2021/0402837 A1 | 12/2021 | Azuma |
| 2022/0009304 A1 | 1/2022 | Leclerc |
| 2022/0016949 A1 | 1/2022 | Graus et al. |
| 2022/0032708 A1 | 2/2022 | Tabata et al. |
| 2022/0041029 A1 | 2/2022 | Randall et al. |
| 2022/0056976 A1 | 2/2022 | Anderson |
| 2022/0080796 A1 | 3/2022 | Dong et al. |
| 2022/0088988 A1 | 3/2022 | Menden et al. |
| 2022/0134830 A1 | 5/2022 | Voelkel et al. |
| 2022/0227191 A1 | 7/2022 | Dong et al. |
| 2022/0266844 A1 | 8/2022 | Norstad et al. |
| 2022/0288990 A1 | 9/2022 | Smith |
| 2022/0324282 A1 | 10/2022 | Brady et al. |
| 2022/0332159 A1 | 10/2022 | Corsico |
| 2022/0388362 A1 | 12/2022 | Graus et al. |
| 2022/0397194 A1 | 12/2022 | Kohler et al. |
| 2023/0013665 A1 | 1/2023 | Gagnon et al. |
| 2023/0079941 A1 | 3/2023 | Graus et al. |
| 2024/0123972 A1 | 4/2024 | Krosschell et al. |
| 2024/0190448 A1 | 6/2024 | Norstad et al. |

FOREIGN PATENT DOCUMENTS

| | | |
|---|---|---|
| CA | 2260292 A1 | 7/2000 |
| CA | 2851626 A1 | 4/2013 |
| CA | 2963790 A1 | 4/2016 |
| CA | 2965309 A1 | 5/2016 |
| CA | 3018906 A1 | 4/2019 |
| CN | 1129646 A | 8/1996 |
| CN | 2255379 Y | 6/1997 |
| CN | 2544987 Y | 4/2003 |
| CN | 1660615 A | 8/2005 |
| CN | 1664337 A | 9/2005 |
| CN | 1746803 A | 3/2006 |
| CN | 1749048 A | 3/2006 |
| CN | 1810530 A | 8/2006 |
| CN | 101088829 A | 12/2007 |
| CN | 101417596 A | 4/2009 |
| CN | 101549626 A | 10/2009 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 103079934 A | 5/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 | 7/2015 |
| CN | 105564437 A | 5/2016 |
| CN | 106183688 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| DE | 3705520 A1 | 9/1988 |
| DE | 3811541 A1 | 10/1988 |
| DE | 4017255 A1 | 12/1990 |
| DE | 4323589 A1 | 1/1994 |
| DE | 4328551 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0473766 | 2/1994 |
| EP | 0691226 A1 | 1/1996 |
| EP | 0745965 A1 | 12/1996 |
| EP | 0829383 A2 | 3/1998 |
| EP | 0953470 A2 | 11/1999 |
| EP | 1005006 A2 | 5/2000 |
| EP | 1022169 A2 | 7/2000 |
| EP | 1172239 A2 | 1/2002 |
| EP | 1219475 A1 | 7/2002 |
| EP | 1238833 A1 | 9/2002 |
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2311670 | 4/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| EP | 3461663 A1 | 4/2019 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 A | 1/2003 |
| GB | 2412448 A | 9/2005 |
| GB | 2441348 A | 3/2008 |
| GB | 2445291 A | 7/2008 |
| GB | 2552237 A | 1/2018 |
| GB | 2577871 | 4/2020 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2001-278089 A | 10/2001 |
| JP | 2002-219921 A | 8/2002 |
| JP | 2003-328806 A | 11/2003 |

(56) References Cited

FOREIGN PATENT DOCUMENTS

| | | | |
|---|---|---|---|
| JP | 2008-273246 | A | 11/2008 |
| JP | 2009-035220 | A | 2/2009 |
| JP | 2009-160964 | A | 7/2009 |
| JP | 4584510 | B2 | 11/2010 |
| JP | 2011-126405 | A | 6/2011 |
| JP | 5149443 | B2 | 2/2013 |
| JP | 2013-173490 | A | 9/2013 |
| JP | 2013-189109 | A | 9/2013 |
| KR | 10-2008-0090833 | A | 10/2008 |
| TW | M299089 | U | 10/2006 |
| WO | 92/10693 | A1 | 6/1992 |
| WO | 96/05975 | A1 | 2/1996 |
| WO | 97/27388 | A1 | 7/1997 |
| WO | 99/59860 | A1 | 11/1999 |
| WO | 00/53057 | A1 | 9/2000 |
| WO | 02/20318 | A1 | 3/2002 |
| WO | 2004/009433 | A1 | 1/2004 |
| WO | 2004/098941 | A1 | 11/2004 |
| WO | 2009/008816 | A1 | 1/2009 |
| WO | 2009/133000 | A1 | 11/2009 |
| WO | 2012/028923 | A1 | 3/2012 |
| WO | 2015/004676 | A1 | 1/2015 |
| WO | 2016/057555 | A1 | 4/2016 |
| WO | 2016/069405 | A2 | 5/2016 |
| WO | 2018/189712 | A1 | 10/2018 |
| WO | 2020/089837 | A1 | 5/2020 |

OTHER PUBLICATIONS

Written Opinion issued by the International Searching Authority, dated Jun. 7, 2018, for related International Patent Application No. PCT/US2017/062303; 22 pages.
3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.
Ackermann et al., "Robust steering control for active rollover avoidance of vehicles with elevated center of gravity", Jul. 1998, pp. 1-6.
Article 34 Amendment, issued by the European Patent Office, dated Aug. 29, 2016, for related International patent application No. PCT/US2015/057132; 34 pages.
Bhattacharyya et al., "An Approach to Rollover Stability in Vehicles Using Suspension Relative Position Sensors and Lateral Acceleration Sensors", Dec. 2005, 100 pages.
Compare: Three Selectable Terrain Management Systems, Independent Land Rover News Blog, retrieved from https://web.archive.org/web/20120611082023/ . . . ; archive date Jun. 11, 2012; 4 pages.
EDFC Active Adjust Damping Force Instantly according to G-Force & Speed, Tein, retrieved from https://web.archive.org/web/20160515190809/ . . . ; archive date May 15, 2016; 22 pages.
English translation of Examination Report issued by the State Intellectual Property Office of People's Republic of China, dated Jun. 1, 2015, for Chinese Patent Application No. 201180037804.3; 13 pages.
European Search Report issued by the European Patent Office, dated Feb. 10, 2017, for corresponding European patent application No. 16193006; 7 pages.
Examination Report issued by the European Patent Office, dated Aug. 1, 2016, for European Patent Application No. 11724931.8; 5 pages.
Examination Report issued by the State Intellectual Property Office of People's Republic of China, dated Feb. 3, 2016, for Chinese Patent Application No. 201180037804.3; 14 pages.
Examination Report No. 1 issued by the Australian Government IP Australia, dated Apr. 15, 2014, for Australian Patent Application No. 2011261248; 5 pages.
Examination Report No. 1 issued by the Australian Government IP Australia, dated Aug. 10, 2018, for Australian Patent Application No. 2015328248; 2 pages.
Examination Report No. 1 issued by the Australian Government IP Australia, dated Jan. 12, 2017, for corresponding Australian patent application No. 2015271880; 6 pages.
Examination Report No. 2 issued by the Australian Government IP Australia, dated Jun. 29, 2017, for Australian Patent Application No. 2015271880; 8 pages.
Examination Report No. 2 issued by the Australian Government IP Australia, dated May 29, 2015, for Australian Patent Application No. 2011261248; 8 pages.
Examination Report No. 3 issued by the Australian Government IP Australia, dated Dec. 1, 2017, for Australian Patent Application No. 2015271880; 7 pages.
Extended European Search Report issued by the European Patent Office, dated Sep. 7, 2018, for European Patent Application No. 18183050.6; 7 pages.
First drive: Ferrari's easy-drive supercar, GoAuto.com.au, Feb. 16, 2010; 4 pages.
Gangadurai et al.; Development of control strategy for optimal control of a continuously variable transmission operating in combination with a throttle controlled engine; SAE International; Oct. 12, 2005.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Procccdings of the 2004 IEEE International Conference on Networking, Mar. 21-23, 2004, pp. 719-724.
Ingalls, Jake; Facebook post https://www.facebook.com/groups/877984048905836/permalink/110447996625624- 2; Sep. 11, 2016; 1 page.
International Preliminary Report on Patentability in PCT Application Serial No. PCT/US15/57132, issued Jan. 30, 2017 (6 pages).
International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability issued by the International Bureau of WIPO, dated May 12, 2015, for International Application No. PCT/US2013/068937; 7 pages.
International Preliminary Report on Patentability issued by The International Bureau of WIPO, Dec. 4, 2012, for International Application No. PCT/US2011/039165; 9 pages.
International Preliminary Report on Patentability received for PCT Patent Application No. PCT/IB2019/060089, mailed on Jun. 3, 2021, 22 pages.
International Preliminary Report on Patentability received for PCT Patent Application No. PCT/US2017/062303, mailed on May 31, 2019, 23 pages.
International Search Report and Written Opinion issued by the European Patent Office, dated Feb. 18, 2014, for International Application No. PCT/US2013/068937; 11 pages.
International Search Report and Written Opinion of the International Searching Authority for International Application No. PCT/US2011/39165, dated Jan. 3, 2012; 15 pages.
International Search Report and Written Opinion of the International Searching Authority, dated Aug. 31, 2018, for International Patent Application No. PCT/US2018/036383; 12 pages.
International Search Report and Written Opinion received for PCT Patent Application No. PCT/IB2019/060089, mailed on May 29, 2020, 24 pages.
International Search Report and Written Opinion received for PCT Patent Application No. PCT/US2015/054296, mailed on Dec. 18, 2015, 9 pages.
International Search Report and Written Opinion received for PCT Patent Application No. PCT/US2015/057132, mailed on May 13, 2016, 17 pages.

(56) References Cited

OTHER PUBLICATIONS

International Search Report and Written Opinion received for PCT Patent Application No. PCT/US2021/033199, mailed on Aug. 23, 2021, 14 pages.
International Search Report and Written Opinion received for PCT Patent Application No. PCT/US2021/042230, mailed on Dec. 17, 2021, 4 pages.
International Search Report issued by the International Searching Authority, dated Jun. 7, 2018, for related International Patent Application No. PCT/US2017/062303; 7 pages.
Machine translation of DE 3705520 A1 from espacenet.com November (Year: 2022).
Mckay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.
Office Action issued by the Canadian Intellectual Property Office, dated Apr. 21, 2017, for corresponding Canadian patent application No. 2,801,334; 3 pages.
Office Action issued by the Canadian Intellectual Property Office, dated Jul. 26, 2019, for Canadian Patent Application No. 2,963,790; 3 pages.
Office Action issued by the Canadian Intellectual Property Office, dated Jun. 22, 2021, for Canadian Patent Application No. 3,043,481; 3 pages.
Office Action issued by the Canadian Intellectual Property Office, dated May 10, 2021, for Canadian Patent Application No. 2,890,996; 3 pages.
Office Action issued by the Canadian Intellectual Property Office, dated Oct. 1, 2019, for Canadian Patent Application No. 2,965,309; 8 pages.
Office Action issued by the Mexican Patent Office, dated Jun. 25, 2014, for corresponding Mexican patent application No. MX/a/2012/014069; 2 pages.
Scott Tsuneishi, "2005 Subaru WRX Sti—Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.
Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.
Trebi-Ollennu et al., Adaptive Fuzzy Throttle Control of an All Terrain Vehicle, 2001, Abstract.
Unno et al.; Development of Electronically Controlled DVT Focusing on Rider's Intention of Acceleration and Deceleration; SAE International; Oct. 30, 2007.
"EDFC Active Adjust Damping Force Instantly according to G-Force and Speed, Tein", [Online]. Retrieved from the Internet: https: www.tein.com products edfc_active_pro.html, (May 28, 2014), 16 pgs.
"U.S. Appl. No. 17/379,675, Restriction Requirement mailed Sep. 7, 2022", 10 pgs
"U.S. Appl. No. 17/379,675, Response filed Oct. 27, 2022 to Restriction Requirement mailed Sep. 7, 2022", 8 pgs.
"U.S. Appl. No. 17/379,675, Non Final Office Action mailed Jan. 20, 2023", 14 pgs.
"U.S. Appl. No. 17/379,675, Response filed Jul. 19, 2023 to Non Final Office Action mailed Jan. 20, 2023", 7 pgs.
"U.S. Appl. No. 17/379,675, Notice of Allowance mailed Oct. 4, 2023", 7 pgs.
"U.S. Appl. No. 17/379,675, Notice of Allowance mailed Jan. 4, 2024", 5 pgs.
"Mexican Application Serial No. MX a 2022 015902, Office Action mailed Jul. 9, 2025", With English Machine Translation, 9 pgs
"Mexican Application Serial No. MX a 2022 015902, Response filed Nov. 24, 2025 to Office Action mailed Jul. 9, 2025", With English Machine Translation, 24 pgs.
"Chinese Application Serial No. 202180044159.1, Office Action mailed Dec. 31, 2025", W English Translation, 16 pgs.

* cited by examiner

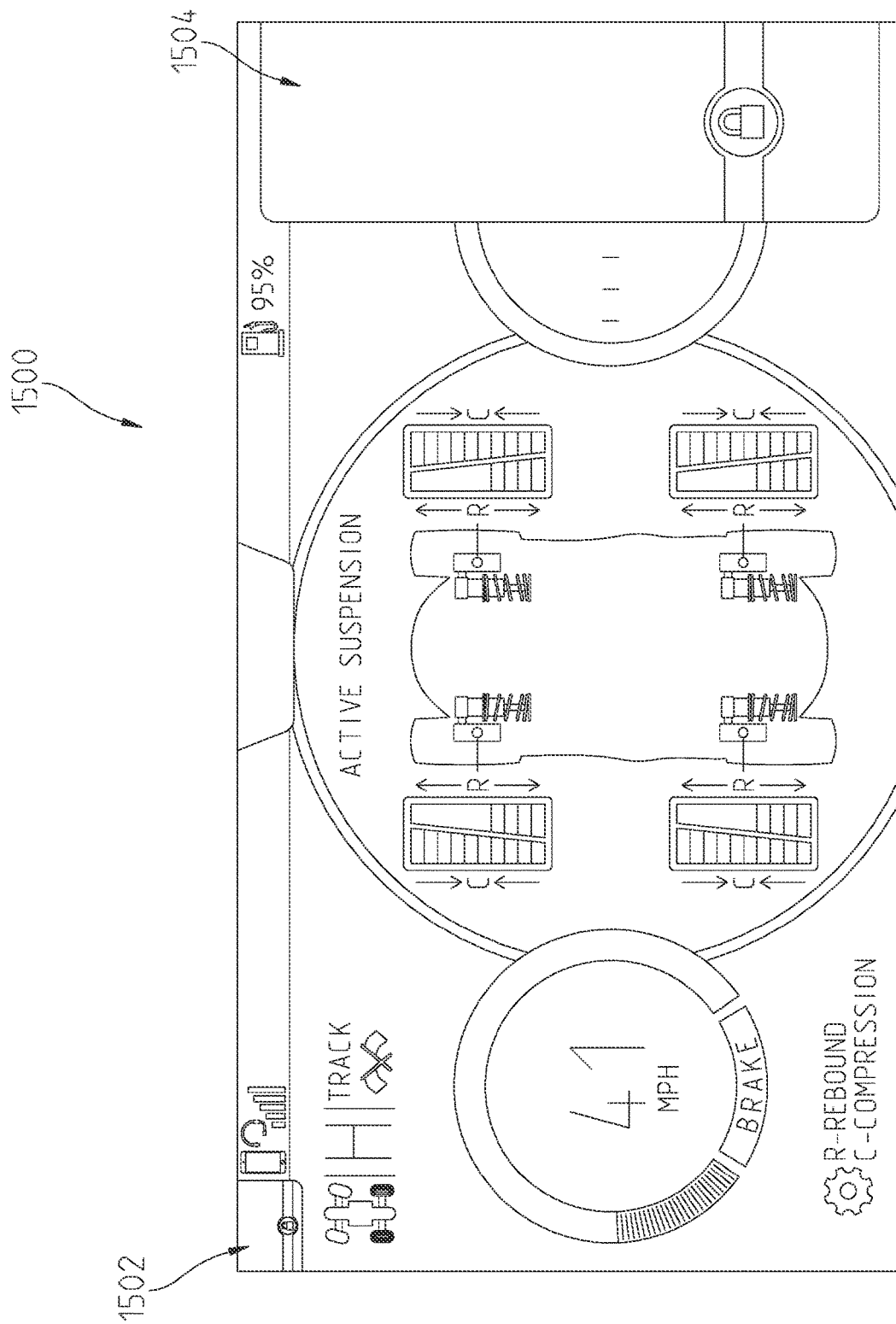

ADJUSTABLE SUSPENSIONS AND VEHICLE OPERATION FOR OFF-ROAD RECREATIONAL VEHICLES

RELATED APPLICATIONS

This application is a continuation of U.S. patent application Ser. No. 17/379,675, filed Jul. 19, 2021, which claims the benefit of U.S. Provisional Application Ser. No. 63/053,278, filed Jul. 17, 2020, titled VEHICLE HAVING ADJUSTABLE COMPRESSION AND REBOUND DAMPING; U.S. Provisional Application Ser. No. 63/183,554, filed May 3, 2021, titled VEHICLE HAVING ADJUSTABLE COMPRESSION AND REBOUND DAMPING; and U.S. Provisional Application Ser. No. 63/216,341, filed Jun. 29, 2021, titled VEHICLE HAVING ADJUSTABLE COMPRESSION AND REBOUND DAMPING, the entire disclosures of which are expressly incorporated by reference herein. This application is related to U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES, the entire disclosure of which is expressly incorporated by reference herein.

TECHNICAL FIELD OF THE DISCLOSURE

The present application relates to recreational vehicles and, more particularly, to suspension systems for recreational vehicles.

BACKGROUND OF THE DISCLOSURE

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment.

Some off-road vehicles also include electronically controlled adjustable shocks along with sensors for active ride control systems.

SUMMARY OF THE DISCLOSURE

In exemplary embodiments of the disclosure, various vehicles having one or more adjustable suspensions are provided.

In an exemplary embodiment of the present disclosure, a vehicle is provided. The vehicle comprising: a plurality of ground engaging members including a first portion on a left side of a vertical longitudinal centerline plane of the vehicle and a second portion on a right side of the vertical longitudinal centerline plane of the vehicle; a frame supported by the plurality of ground engaging members; an operator area including an operator seat supported by the frame; a left side suspension moveably coupling a first ground engaging member of the first portion of the plurality of ground engaging members to the frame; a first electronically controlled shock absorber having a first end moveably coupled to the left side suspension and a second end moveably coupled to the frame; a right side suspension moveably coupling a first ground engaging member of the second portion of the plurality of ground engaging members to the frame; a second electronically controlled shock absorber having a first end moveably coupled to the right side suspension and a second end moveably coupled to the frame; a sway bar moveably coupled to the frame, the sway bar having a first end moveably coupled to the left side suspension and a second end moveably coupled to the right side suspension; a third electronically controlled shock absorber positioned to operatively couple the sway bar to one of the left side suspension and the right side suspension; and an electronic controller operatively coupled to the first electronically controlled shock absorber, the second electronically controlled shock absorber, and the third electronically controlled shock absorber, the electronic controller setting a first characteristic of the first electronically controlled shock absorber, a second characteristic of the second electronically controlled shock absorber, and a third characteristic of the third electronically controlled shock absorber.

In an example thereof, the third adjustable shock absorber is coupled to the sway bar on a first end and the one of the left side suspension and the right side suspension on a second end.

In another example thereof, when the electronic controller determines the vehicle is in a first condition, the electronic controller adjusts the third characteristic of the third electronically controlled shock absorber to a first setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a first setting. In a variation thereof, the electronic controller further adjusts the other one of the first characteristic of the first electronically controlled shock absorber and the second characteristic of the second electronically controlled shock absorber to a first setting. In another variation thereof, when the electronic controller determines the vehicle is not in the first condition, the electronic controller adjusts the third characteristic of the third electronically controlled shock absorber to a second setting and adjusts the one of the first characteristic of the first electronically controlled shock absorber and the second characteristic of the second electronically controlled shock absorber that is coupled to the same one of the left side suspension and the right side suspension that the second end of the third adjustable shock absorber is coupled to a second setting. In a further variation thereof, the first setting of the third electronically controlled shock absorber restricting a compression of the third electronically controlled shock absorber.

In still another example thereof, the third electronically controlled shock absorber is positioned rearward of the operator seat.

In still a further example thereof, the third electronically controlled shock absorber is positioned forward of the operator seat.

In another example thereof, the electronic controller controls only a compression damping characteristic of the third electronically controlled shock absorber.

In yet another example thereof, the third electronically controlled shock absorber includes an electronically controlled bypass valve which is adjustable by the electronic controller.

In a variation thereof, the third electronically controlled shock absorber further includes a shock body having an interior, a top end, and a bottom end; a piston positioned in the interior of the shock body and dividing the interior of the shock body into a first cavity and a second cavity; and a bypass conduit in fluid communication with the interior of the shock body on a first side of the piston at a first location and in fluid communication with the interior of the shock body on a second side of the piston at a second location, wherein a compressed gas is present on the second side of the piston and the second side of the piston is closer to the top end of the shock body than the first side of the piston. In a further variation thereof, the interior of the shock body includes a liquid fluid and both the first location and the second location are lower than an interface between the liquid and the compressed gas. In still a further variation thereof, the electronically controlled bypass valve has a first setting wherein the liquid is able to flow from the first location to the second location and from the second location to the first location and a second setting wherein the liquid is able to flow only from the second location to the first location.

In another variation thereof, the third electronically controlled shock absorber further includes a shock body having an interior; a piston positioned in the interior of the shock body and dividing the interior of the shock body into a first cavity and a second cavity; a spring positioned in the interior of the shock body and compressible between a first end of the shock body and the piston, wherein the electronically controlled bypass valve controls a flow of fluid between the first cavity and the second cavity. In a further variation thereof, the spring is positioned on the same side of the piston as the first cavity and the electronically controlled bypass valve controls the flow of fluid from the first cavity to the second cavity. In yet a further variation thereof, the third electronically controlled shock absorber further includes a bleed valve that controls the flow of fluid from the second cavity to the first cavity.

In yet another variation thereof, the third electronically controlled shock absorber further includes a shock body having an interior; a piston positioned in the interior of the shock body and dividing the interior of the shock body into a first cavity and a second cavity; a first spring positioned in the interior of the shock body and compressible between a first end of the shock body and a first side of the piston; and a second spring positioned in the interior of the shock body and compressible between a second end of the shock body and a second side of the piston, wherein the electronically controlled bypass valve controls a flow of fluid between the first cavity and the second cavity. In yet a further variation thereof, the first spring and the second spring position the piston within the interior of the shock body absent external loading and with the electronically controlled bypass valve set to allow the flow of fluid between the first cavity and the second cavity.

In yet a further example thereof, the electronic controller further monitors a brake pressure sensor to control at least one of the first electronically controlled shock absorber, the second electronically controlled shock absorber, and the third electronically controlled shock absorber.

In another exemplary embodiment of the present disclosure, a vehicle is provided. The vehicle comprising: a plurality of ground engaging members including a first portion on a left side of a vertical longitudinal centerline plane of the vehicle and a second portion on a right side of the vertical longitudinal centerline plane of the vehicle; a frame supported by the plurality of ground engaging members; an open-air operator area including an operator seat supported by the frame; a cab frame positioned to extend over the operator seat; a left side front suspension moveably coupling a first ground engaging member of the first portion of the plurality of ground engaging members to the frame; a first electronically controlled shock absorber having a first end moveably coupled to the left side front suspension and a second end moveably coupled to the frame; a right side front suspension moveably coupling a first ground engaging member of the second portion of the plurality of ground engaging members to the frame; a second electronically controlled shock absorber having a first end moveably coupled to the right side front suspension and a second end moveably coupled to the frame; a sway bar moveably coupled to the frame, the sway bar having a first portion moveably coupled to the left side front suspension and a second portion moveably coupled to the right side front suspension; a torque actuator operatively coupling the first portion of the sway bar and the second portion of the sway bar; and an electronic controller operatively coupled to the first electronically controlled shock absorber, the second electronically controlled shock absorber, and the torque actuator, the electronic controller setting a first characteristic of the first electronically controlled shock absorber, a second characteristic of the second electronically controlled shock absorber, and a third characteristic of the torque actuator.

In an example thereof, the electronic controller induces a torque with the torque controller to move the at least one of the left front suspension and the right front suspension to alter a roll angle of the vehicle towards zero.

In still yet another exemplary embodiment of the present disclosure, a recreational vehicle is provided. The recreational vehicle comprising: a plurality of ground engaging members; a frame supported by the plurality of ground engaging members; a powertrain assembly supported by the frame and operably coupled to the plurality of ground engaging members; at least one inertial measurement unit (IMU) supported by the frame, the IMU configured to sense a lateral acceleration of the recreational vehicle; and a controller operably coupled to the IMU, the controller configured to: compute a centripetal acceleration of the recreational vehicle; and determine a roll angle of the recreational vehicle using the centripetal acceleration.

In an example thereof, the recreational vehicle further comprising a steering angle sensor, wherein the controller is configured to compute the centripetal acceleration of the recreational vehicle based upon one or more measurements from the steering angle sensor.

In a further example thereof, the recreational vehicle further comprising a vehicle speed sensor, wherein the controller is configured to compute the centripetal acceleration of the recreational vehicle based upon one or more measurements from the vehicle speed sensor.

In yet another example thereof, the recreational vehicle further comprising a ground engaging member speed sensor, wherein the controller is configured to compute the centripetal acceleration of the recreational vehicle based upon one or more measurements from the ground engaging member speed sensor.

In yet a further example thereof, the recreational vehicle further comprising a global positioning system (GPS) receiver, wherein the controller is configured to compute the centripetal acceleration of the recreational vehicle based upon one or more measurements from the GPS receiver.

In still a further example thereof, to determine the roll angle of the recreational vehicle using the centripetal acceleration, the controller is configured to remove the centripetal acceleration from the lateral acceleration. In a variation thereof, to determine the roll angle of the recreational vehicle using the centripetal acceleration, the controller is configured to: remove the centripetal acceleration from the lateral acceleration to determine an inertial magnitude due to the roll angle.

In yet another exemplary embodiment of the present disclosure, a recreational vehicle is provided. The recreational vehicle comprising: a plurality of ground engaging members; a frame supported by the plurality of ground engaging members; a powertrain assembly supported by the frame and operably coupled to the plurality of ground engaging members; at least one inertial measurement unit (IMU) supported by the frame, the IMU configured to sense a longitudinal acceleration of the all-terrain vehicle; and a controller operably coupled to the IMU, the controller configured to: compute an acceleration of the recreational vehicle due to the vehicle accelerating forward or backward; and determine a pitch angle of the recreational vehicle using the acceleration of the recreational vehicle due to the vehicle accelerating forward or backward.

In an example thereof, the recreational vehicle further comprising a vehicle speed sensor, wherein the controller is configured to compute the acceleration of the recreational vehicle due to the vehicle accelerating forward or backward based upon one or more measurements from the vehicle speed sensor.

In another example thereof, the recreational vehicle further comprising a ground engaging member speed sensor wherein the controller is configured to compute the acceleration of the recreational vehicle due to the vehicle accelerating forward or backward based upon one or more measurements from the ground engaging member speed sensor.

In yet another example thereof, the recreational vehicle further comprising a global positioning system (GPS) receiver, wherein the controller is configured to compute the acceleration of the recreational vehicle due to the vehicle accelerating forward or backward based upon one or more measurements from the GPS receiver.

In still another example thereof, to determine the pitch angle of the recreational vehicle using the acceleration of the recreational vehicle due to the vehicle accelerating forward or backward, the controller is configured to remove the acceleration of the recreational vehicle due to the vehicle accelerating forward or backward from the longitudinal acceleration. In a variation thereof, to determine the pitch angle of the recreational vehicle using the acceleration of the recreational vehicle due to the vehicle accelerating forward or backward, the controller is configured to: remove the acceleration of the recreational vehicle due to the vehicle accelerating forward or backward from the longitudinal acceleration to determine an inertial magnitude due to the pitch angle.

In yet still a further exemplary embodiment of the present disclosure, a shock absorber is provided. The shock absorber comprising: a shock body having an interior, a top end, and a bottom end; a piston positioned in the interior of the shock body and dividing the interior of the shock body into a first cavity and a second cavity; a bypass conduit in fluid communication with the interior of the shock body on a first side of the piston at a first location and in fluid communication with the interior of the shock body on a second side of the piston at a second location, the first location being positioned between the piston and the bottom end of shock body and the second location being positioned between the piston and the top end of the shock body; a liquid fluid positioned on both the first side of the piston and the second side of the piston; and a compressed gas positioned on the second side of the piston, wherein the second location of the bypass conduit is positioned between the second side of the piston and an interface between the compressed gas and the liquid.

In an example thereof, the shock absorber further comprising an electronically controlled bypass valve has a first setting wherein the liquid is able to flow from the first location to the second location and from the second location to the first location and a second setting wherein the liquid is able to flow only from the second location to the first location.

In another example thereof, the shock absorber further comprising a rod coupled to the piston and extending out of the top end of the shock body.

In still yet a further exemplary embodiment of the present disclosure, vehicle is provided. The vehicle comprising: a plurality of ground engaging members; a frame supported by the plurality of ground engaging members; an operator area including an operator seat supported by the frame; a first suspension moveably coupling a first ground engaging member to the frame; a first electronically controlled shock absorber having a first end moveably coupled to first suspension and a second end moveably coupled to the frame; a first sensor supported by the vehicle to monitor a first characteristic; and an electronic controller operatively coupled to the first electronically controlled shock absorber to control a damping characteristic of the first electronically controlled shock absorber, the electronic controller being operatively coupled to the first sensor and controlling the damping characteristic of the first electronically controlled shock absorber based at least on a frequency characteristic based on the monitored first characteristic.

In an example thereof, the first characteristic is an acceleration. In a variation thereof, the first characteristic is an angular acceleration.

The above mentioned and other features of the disclosure, and the manner of attaining them, will become more apparent and will be better understood by reference to the following description of embodiments taken in conjunction with the accompanying drawings. These above mentioned and other features may be used in any combination or permutation.

BRIEF DESCRIPTION OF THE DRAWINGS

FIG. 55 illustrates an exemplary display screen of the operator interface of the exemplary side-by-side recreational vehicle of FIG. 4.

Corresponding reference characters indicate corresponding parts throughout the several views.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side vehicle, it should be understood that the features disclosed herein may have application to other types of vehicles such as all-terrain vehicles, snowmobiles, and golf carts.

Figure 1:
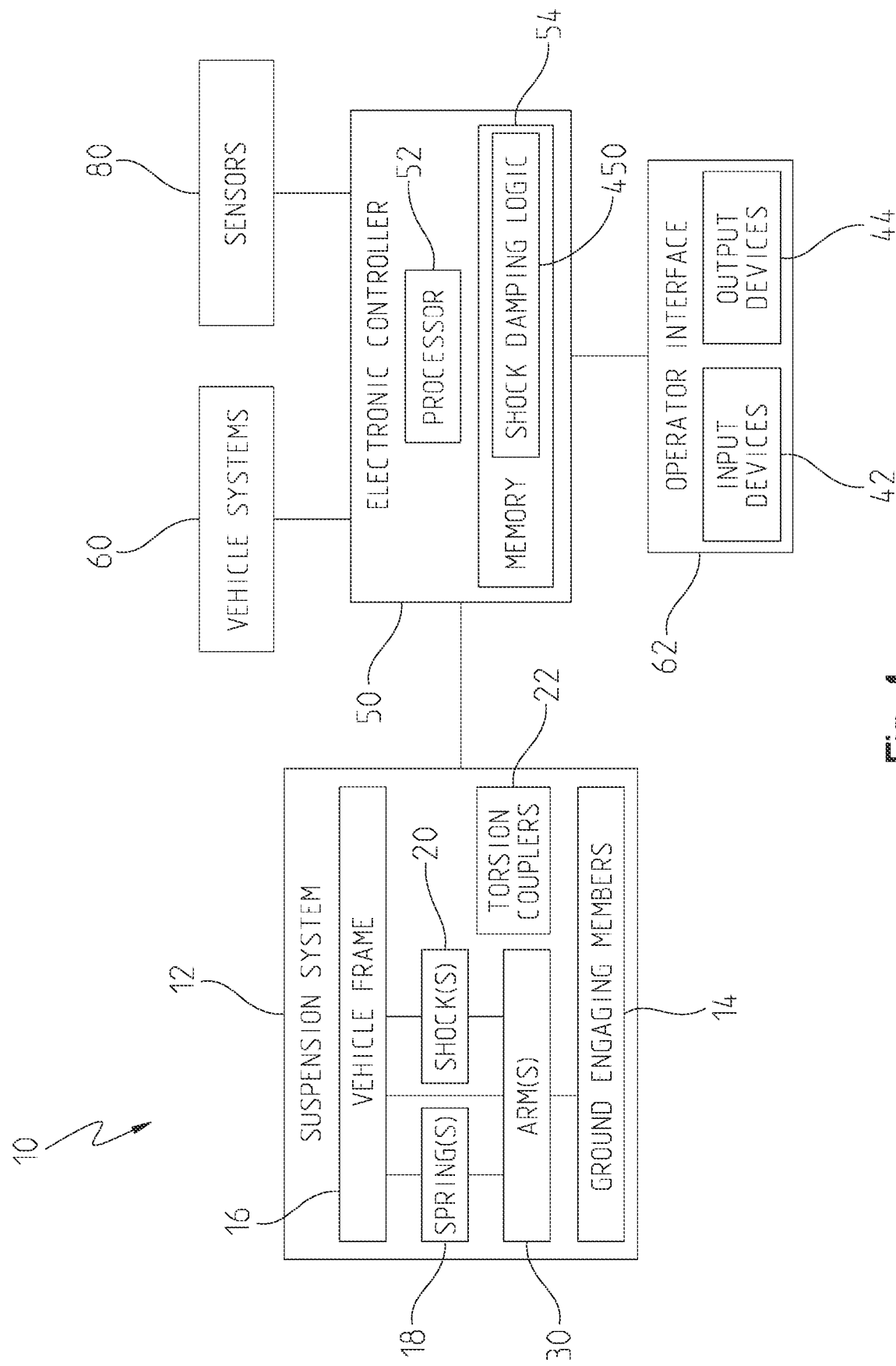
FIG. 1 illustrates a representative view of an exemplary recreational vehicle.

Referring now to FIG. 1, the present disclosure relates to a vehicle 10 having suspension systems 11 coupling a plurality of ground engaging members 14 and a vehicle frame 16. Exemplary ground engaging members 14 include wheels, skis, guide tracks, treads or other suitable devices for supporting the vehicle relative to the ground.

Suspension systems 12 typically include springs 18 and shock absorbers 20 coupled between the ground engaging members 14 and the frame 16. Springs 18 may include, for example, coil springs, leaf springs, air springs or other gas springs. The air or gas springs 18 may be adjustable. See, for example, U.S. Pat. No. 7,950,486, assigned to the current assignee, the entire disclosure of which is incorporated herein by reference. Shocks 20 may be electronically controlled to adjust one or both of a compression damping characteristic of the shock and a rebound damping characteristic of the shock. Exemplary adjustable shocks include the FOX 3.0 Live Valve X2 Internal Bypass shock having electronic independent compression damping control and rebound damping control available from FOX located at 6634 Highway 53 in Braselton, Georgia 30517. In embodiments, shocks 20 include a first controllable valve to adjust compression damping and a second controllable valve to adjust rebound damping. In embodiments, shocks 20 include a combination valve which controls both compression damping and rebound damping. Additional exemplary adjustable shocks are described in U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES, the entire disclosure of which is expressly incorporated by reference herein.

In embodiments, each ground engaging member 14 is coupled to vehicle frame 16 through a separate suspension system 12 having one or more springs 18 and adjustable shocks 20. In embodiments, a single suspension system 12 may couple at least two ground engaging members 14 to the vehicle frame 16.

Further, suspension systems 12 may further include one or more torsion couplers 22 which couple individual suspension systems 12 together such that a movement of a first suspension system 12 influences the movement of a second suspension system 12. An exemplary torsion coupler 22 is a sway bar. As described herein, exemplary torsion couplers 22 may include one or more adjustable components or systems, such as torque actuator 1200 (see FIGS. 46 and 47) to adjust the characteristics of the torsion coupler 22 and therefore the interdependence between the coupled suspension systems 12. As disclosed herein, exemplary torque actuators 1200 may also actively torque the coupled suspension systems 12.

Each of ground engaging members 14 are coupled to vehicle frame 16 through one or more suspensions arms 30 of the respective suspension system 12, such as A-arms, trailing arms, control arms, and other suitable arms. The respective arms 30 permit vertical movement of the ground engaging member 14 relative to the vehicle frame 16. Springs 18 and shocks 20 are typically coupled to one of the respective arms 30 and vehicle frame 16 and the damping characteristics of springs 18 and shocks 20 control the vertical movement of ground engaging member 11 relative to vehicle frame 16. These damping characteristics, as described herein, may be adjusted to improve the handling, comfort, ride height, performance, and other characteristics of vehicle 10. In the case of a snowmobile, a first portion of the springs 18 and shocks 20 may be located between suspension arms coupled to front skis and the snowmobile frame and a second portion of the springs 18 and shocks 20 are located within an interior of an endless track ground engaging member, as described in U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES, the entire disclosure of which is expressly incorporated by reference herein.

Vehicle 10 further includes an electronic controller 50 operatively coupled to adjustable shocks 20 of suspension systems 12 and other adjustable components, such as torsion couplers 22. Electronic controller 50 includes at least one processor 52 and at least one non-transitory computer readable medium, memory 54. In embodiments, electronic controller 50 is a single unit that controls the operation of various systems 60 of vehicle 10. In embodiments, electronic controller 50 is a distributed system comprised of multiple controllers each of which control one or more systems of vehicle 10 and may communicate with each other over one or more wired and/or wireless networks. In embodiments, the multiple controllers communicate over a CAN network.

Further, electronic controller 50 is operatively coupled to a plurality of sensors 80 which monitor various parameters of vehicle 10 or the environment surrounding vehicle 10. In embodiments, one or more of the sensors 80 may be incorporated as part of electronic controller 50, have a direct connection to electronic controller 50, and/or provide information regarding sensed characteristics over one or more wired and/or wireless networks. In embodiments, the multiple sensors and controllers communicate over a CAN network.

Controller 50 performs certain operations (e.g., provides commands) to control one or more subsystems of other vehicle components. In embodiments, controller 50 forms a portion of a processing subsystem including one or more computing devices having memory, processing, and communication hardware. Controller 50 may be a single device or a distributed device, and the functions of the controller 50 may be performed by hardware and/or as the execution of computer instructions stored on a non-transitory computer readable storage medium, such as memory 54, by one or more processors.

Figure 2:
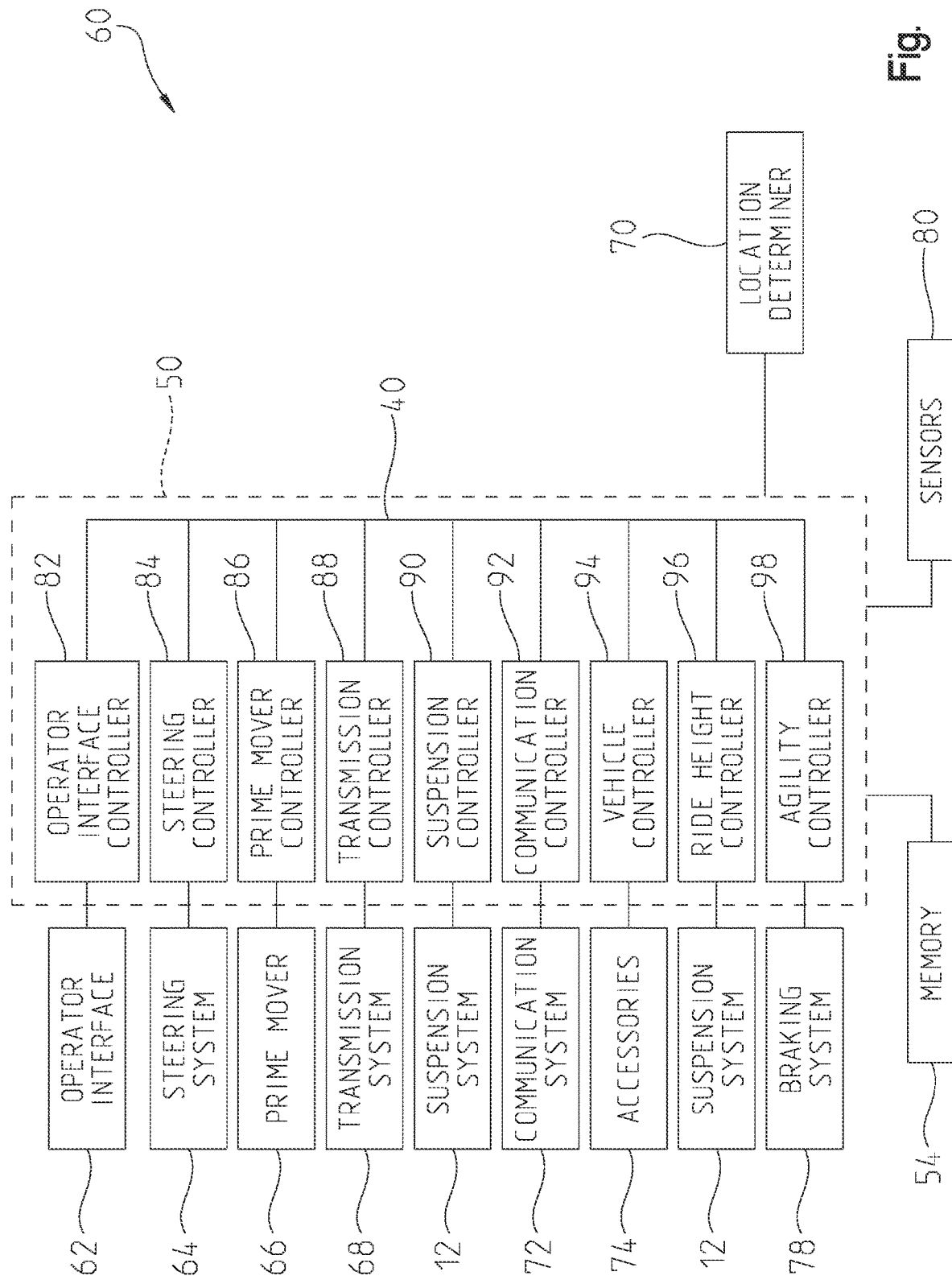
FIG. 2 illustrates a representative view of an exemplary controller of the exemplary recreational vehicle of FIG. 1.

Referring to FIG. 2, controller 50 is represented as including several controllers. These controllers may each be single devices or distributed devices or one or more of these controllers may together be part of a single device or distributed device. The functions of these controllers may be performed by hardware and/or as the execution of computer instructions stored on a non-transitory computer readable storage medium, such as memory 54, by one or more processors.

In embodiments, controller 50 includes at least two separate controllers which communicate over a network 40. In one embodiment, network 40 is a CAN network. Details regarding an exemplary CAN network are disclosed in U.S. patent application Ser. No. 11/218,163, filed Sep. 1, 2005, the disclosure of which is expressly incorporated by reference herein. In embodiments, any suitable type of network or data bus may be used in place of the CAN network including wired, wireless, or combinations thereof. In embodiments, two wire serial communication is used for some connections.

Referring to FIG. 2, controller 50 includes an operator interface controller 82 which controls communication with an operator through operator interface 62. Operator interface 62 includes one or more input devices 42 which receive inputs from an operator of vehicle 10 and one or more output devices 44 which provide information to the operator of vehicle 10. Exemplary input devices 42 for operator interface 62 include levers, buttons, switches, soft keys, and other suitable input devices. Exemplary output devices 44 include lights, displays, audio devices, tactile devices, and other suitable output devices. In embodiments, at least a portion of the user input devices 42 are positioned so that an operator may actuate the input without removing their hands from a vehicle steering input device. In embodiments, at least a portion of the user input devices 42 are positioned on a steering wheel, handle bar, or other operator steering input device of vehicle 10 to facilitate actuation of the input devices 42. In embodiments, at least a portion of the user input devices 42 are actuatable by a foot of the operator or by other operator movement. Exemplary user input devices may be multi-purpose input devices.

A steering controller 84 controls portions of a steering system 64. In embodiments, steering system 84 is a power steering system and includes one or more steering sensors. Exemplary sensors and electronic power steering units are provided in U.S. patent application Ser. No. 12/135,107, filed Jun. 6, 2008, titled VEHICLE, and U.S. Patent Application Ser. No. 63/071,855, filed Aug. 28, 2020, titled VEHICLE STEERING SYSTEMS AND METHODS, the disclosures of which is expressly incorporated by reference herein.

A prime mover controller 86 controls the operation of a prime mover 66. Exemplary prime movers provide motive power to a driveline of vehicle 10 and include two-cycle combustion engines, four-cycle combustion engines, electric motors, hybrid systems, and the associated energy providing systems, such as fuel and air control systems for internal combustion engines and battery systems for electric motors.

A transmission controller 88 controls the operation of transmission system 68. Exemplary transmission systems 68 include shiftable transmissions, automatic dual clutch transmissions, continuously variable transmissions, and combinations thereof.

A suspension controller 90 controls adjustable portions of suspension systems 12. Exemplary adjustable components include adjustable shocks 20, adjustable springs 18, and/or configurable torsion couplers 22, such as stabilizer bars including sway bars. Additional details regarding adjustable shocks, adjustable springs, and configurable torsion couplers are provided in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

Communication controller 92 controls communications between a communication system 72 of vehicle 10 and remote devices, such as other vehicles, personal computing devices, such as cellphones or tablets, a centralized computer system maintaining one or more databases, and other types of devices remote from vehicle 10 or carried by riders of vehicle 10 or otherwise supported by vehicle 10. In embodiments, communication controller 92 of vehicle 10 communicates with paired devices over a wireless network. An exemplary wireless network is a radio frequency network utilizing a BLUETOOTH protocol. In this example, communication system 72 includes a radio frequency antenna. Communication controller 92 controls the pairing of devices to vehicle 10 and the communications between vehicle 10 and the remote device. In embodiments, communication controller 92 of vehicle 10 communicates with remote devices over a cellular network. In this example, communication system 72 includes a cellular antenna and communication controller 92 receives and sends cellular messages from and to the cellular network. In embodiments, communication controller 92 of vehicle 10 communicates with remote devices over a satellite network. In this example, communication system 72 includes a satellite antenna and communication controller 88 receives and sends messages from and to the satellite network. In one embodiment, vehicle 92 is able to communicate with other vehicles 10 over a Radio Frequency mesh network and communication controller 92 and communication system 72 are configured to enable communication over the mesh network. Exemplary vehicle communication systems and associated processing sequences are disclosed in U.S. patent application Ser. No. 16/234,162, filed Dec. 27, 2018, titled RECREATIONAL VEHICLE INTERACTIVE TELEMETRY, MAPPING AND TRIP PLANNING SYSTEM; U.S. patent application Ser. No. 15/262,113, filed Sep. 12, 2016, titled VEHICLE TO VEHICLE COMMUNICATIONS DEVICE AND METHODS FOR RECREATIONAL VEHICLES; U.S. Pat. No. 10,764,729, titled COMMUNICATION SYSTEM USING VEHICLE TO VEHICLE RADIO AS AN ALTERNATE COMMUNICATION MEANS, filed Dec. 12, 2018; US Published Patent Application No. US20190200189, titled COMMUNICATION SYSTEM USING CELLULAR SYSTEM AS AN ALTERNATE TO A VEHICLE TO VEHICLE RADIO, filed Dec. 12, 2018; US Published Patent Application No. US20190200173, titled METHOD AND SYSTEM FOR FORMING A DISTANCED-BASED GROUP IN A VEHICLE TO VEHICLE COMMUNICATION SYSTEM, filed Dec. 12, 2018; US Published Patent Application No. US20190200188, titled VEHICLE-TO-VEHICLE COMMUNICATION SYSTEM, filed Dec. 12, 2018; U.S. patent application Ser. No. 16/811,865, filed Mar. 6, 2020, titled RECREATIONAL VEHICLE GROUP MANAGEMENT SYSTEM; U.S. Patent Application Ser. No. 63/016,684, filed Apr. 28, 2020, titled SYSTEM AND METHOD FOR DYNAMIC ROUTING; U.S. patent application Ser. No. 16/013,210, filed Jun. 20, 2018, titled VEHICLE HAVING SUSPENSION WITH CONTINUOUS DAMPING CONTROL; and U.S. patent application Ser. No. 15/816,368, filed Nov. 17, 2017, titled VEHICLE HAVING ADJUSTABLE SUSPENSION, the entire disclosures of which are expressly incorporated by reference herein.

A vehicle controller 94 controls accessories 74, such as lights, loads, chassis level functions, and other vehicle accessories.

A ride height controller 96 controls the preload and operational height of the vehicle. In embodiments, ride height controller 96 controls springs 16 and/or shocks 20 of suspension systems 12 to adjust a ride height of vehicle 10, either directly or through suspension controller 90. In embodiments, ride height controller 96 provides more ground clearance in a comfort ride mode compared to a sport ride mode. Additional details regarding exemplary ride height controllers are provided in US Published Application No. US2020/0156430, the entire disclosure of which is expressly incorporated by reference herein.

An agility controller 98 controls a braking system 78 of vehicle 10 and the stability of vehicle 10. Control methods of agility controller 98 may include integration into braking circuits (ABS) such that a stability control system can improve dynamic response (vehicle handling and stability) by modifying the shock damping of shocks 20 in conjunction with electronic braking control. Additional details regarding exemplary ride height controllers are provided in US Published Application No. US2019/0337497, titled OPERATING MODES USING A BRAKING SYSTEM FOR AN ALL TERRAIN VEHICLE, the entire disclosure of which is expressly incorporated by reference herein.

In embodiments, controller 20 either includes a location determiner 70 and/or communicates via communication system 72 to a location determiner 70. The location determiner 70 determines a current geographical location of vehicle 10. An exemplary location determiner 70 is a GPS unit which determines the position of vehicle 10 based on interaction with a global satellite system.

Figure 3:
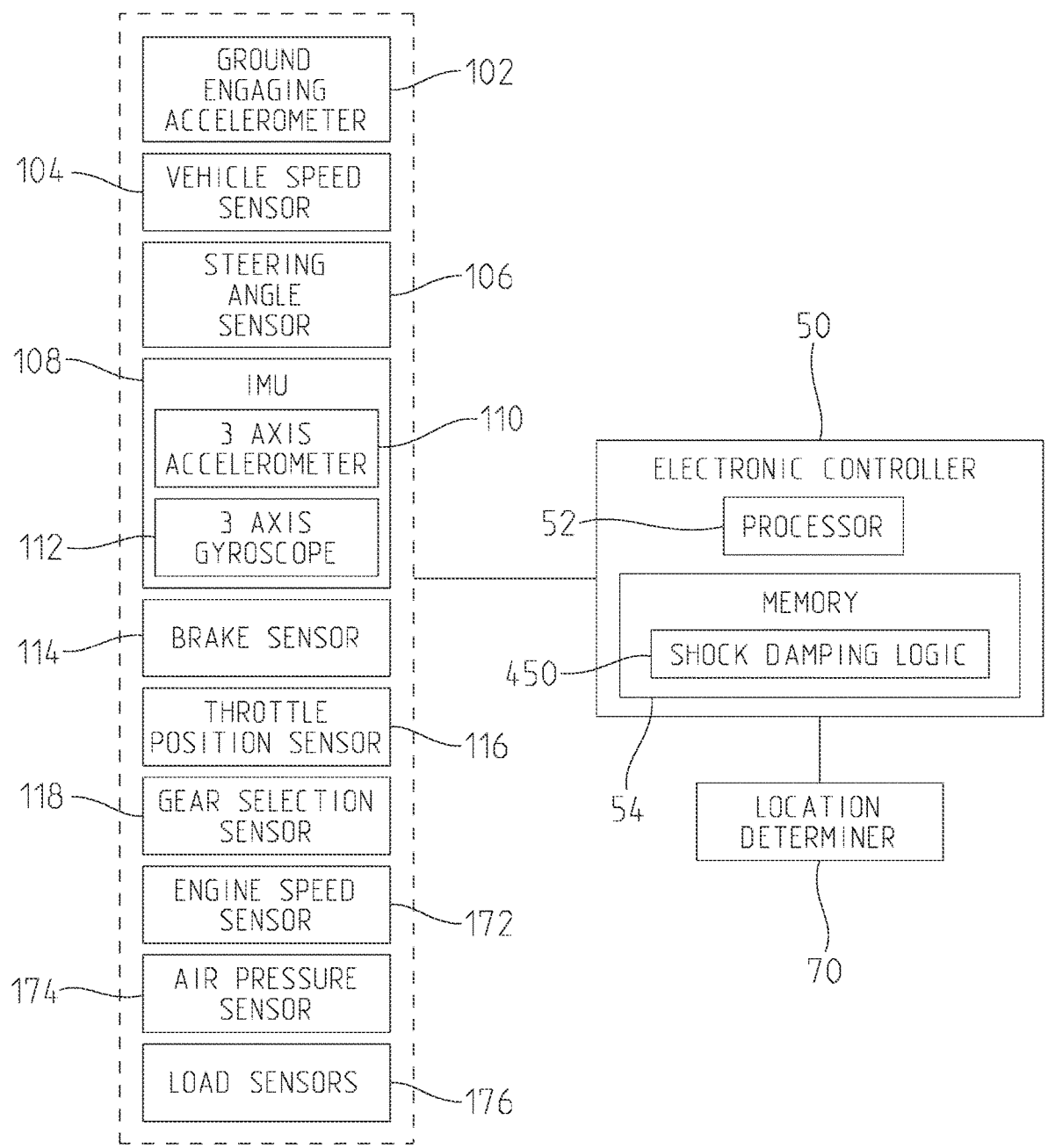
FIG. 3 illustrates a representative view of exemplary sensors of the exemplary recreational vehicle of FIG. 1.
Figure 4:
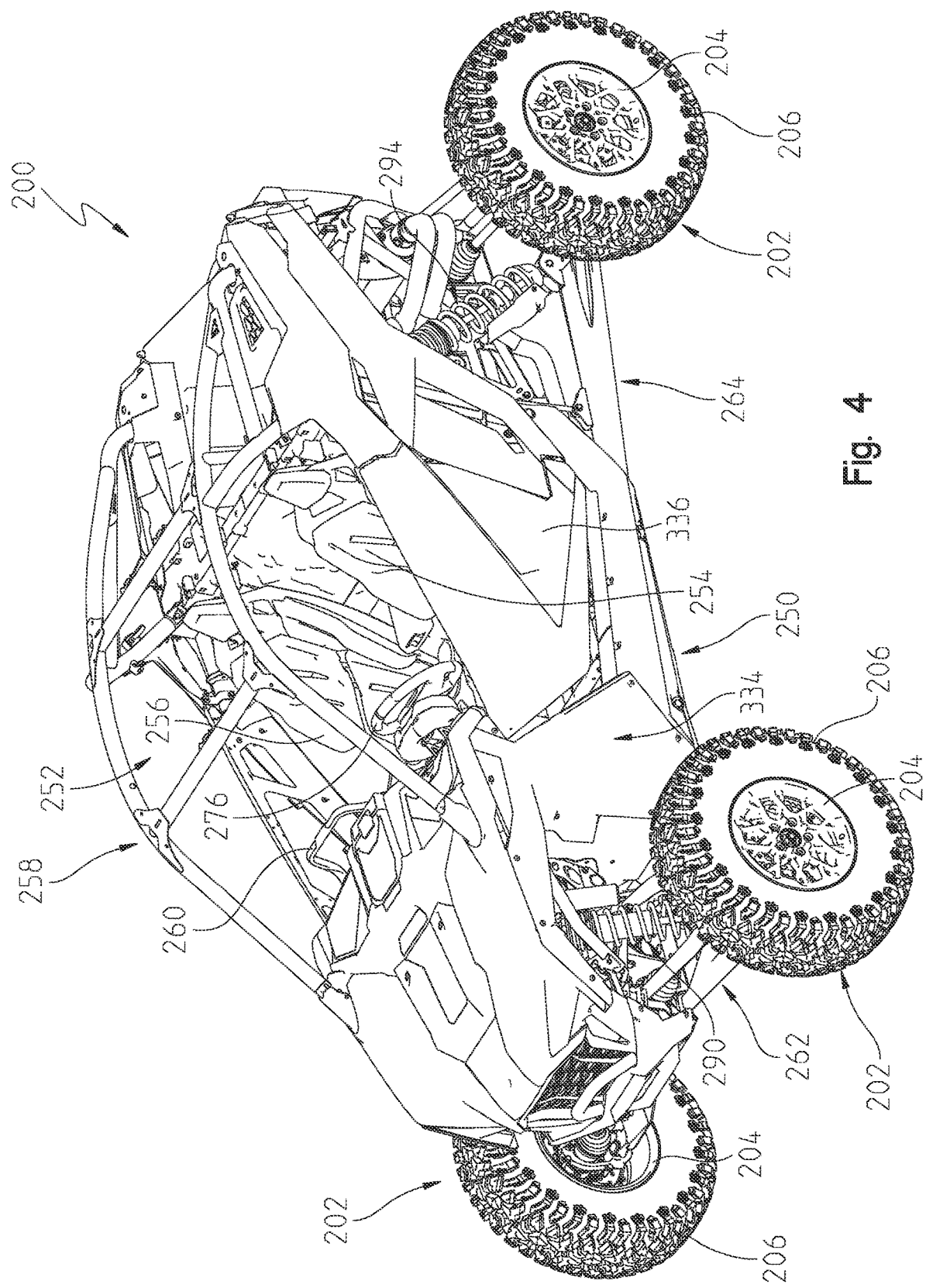
FIG. 4 illustrates a front, left perspective view of an exemplary side-by-side recreational vehicle of the exemplary recreational vehicle of FIG. 1.

Referring to FIG. 3, electronic controller 50 is illustrated along with various sensors of the plurality of sensors 80. Exemplary sensors include a ground engaging member accelerometer 102 associated with each ground engaging member 14. Electronic controller 50 communicates with or otherwise receives information from each of ground engaging member accelerometers 102. For instance, the ground engaging member accelerometers 82 provide information indicating movement of the ground engaging members 14, adjustable shocks 18, and/or suspension arms 30 as the vehicle traverses different terrain. Other ground engaging member sensors may also be included, such as one or more sensors monitoring an angle of a suspension arm, an extension of a shock, or other suitable characteristics that provide an indication of a position of the ground engaging member. Exemplary sensors are disclosed in U.S. patent application Ser. No. 16/013,210, filed Jun. 20, 2018, titled VEHICLE HAVING SUSPENSION WITH CONTINUOUS DAMPING CONTROL, the entire disclosure of which is expressly incorporated by reference herein.

Electronic controller 50 communicates with or otherwise receives vehicle speed information for vehicle 10 from a vehicle speed sensor 104.

Electronic controller 50 communicates with or otherwise receives steering information for vehicle 10 from a steering sensor 106. Exemplary steering sensors 106 include a sensor which monitors a position of an operator steering input, such as a steering wheel or handlebars, a sensor which monitors an acceleration of the operator steering wheel or handlebars, and a sensor associated with a power steering unit which provides an indication of a position of the operator steering input.

Electronic controller 50 communicates with or otherwise receives information regarding vehicle 10 from an inertial measurement unit (IMU) 108. IMU 108 includes a 3 axis accelerometer 110 to provide information indicating acceleration forces of the vehicle 10 during operation and a 3 axis gyroscope 112 to provide indications of inertial measurements, such as roll rates, pitch rates, and/or yaw rates, of the vehicle during operation. In embodiments, IMU 108 is located at or close to a center position (e.g., a center of gravity position) of vehicle 10. In other instances, IMU 108 is located at a position that is not near the center of gravity of the vehicle 10. In an exemplary embodiment, IMU 108 is located along a longitudinal centerline plane of vehicle 50.

Electronic controller 50 communicates with or otherwise receives information regarding vehicle 10 from a brake sensor 114.

Electronic controller 50 communicates with or otherwise receives information regarding vehicle 10 from a throttle position sensor 116.

Electronic controller 50 communicates with or otherwise receives information regarding vehicle 10 from a gear selection sensor 118.

Referring to FIGS. 4-18, an exemplary vehicle 200 including the control systems and suspension systems disclosed herein is illustrated. Vehicle 200 is an exemplary side-by-side off-road recreational vehicle. Vehicle 200, as illustrated, includes a plurality of ground engaging members 202. Illustratively, ground engaging members 202 are wheels 204 and associated tires 206. Ground engaging members 202 are operatively coupled to power system 210 (see FIG. 18) to power the movement of vehicle 200.

Figure 18:
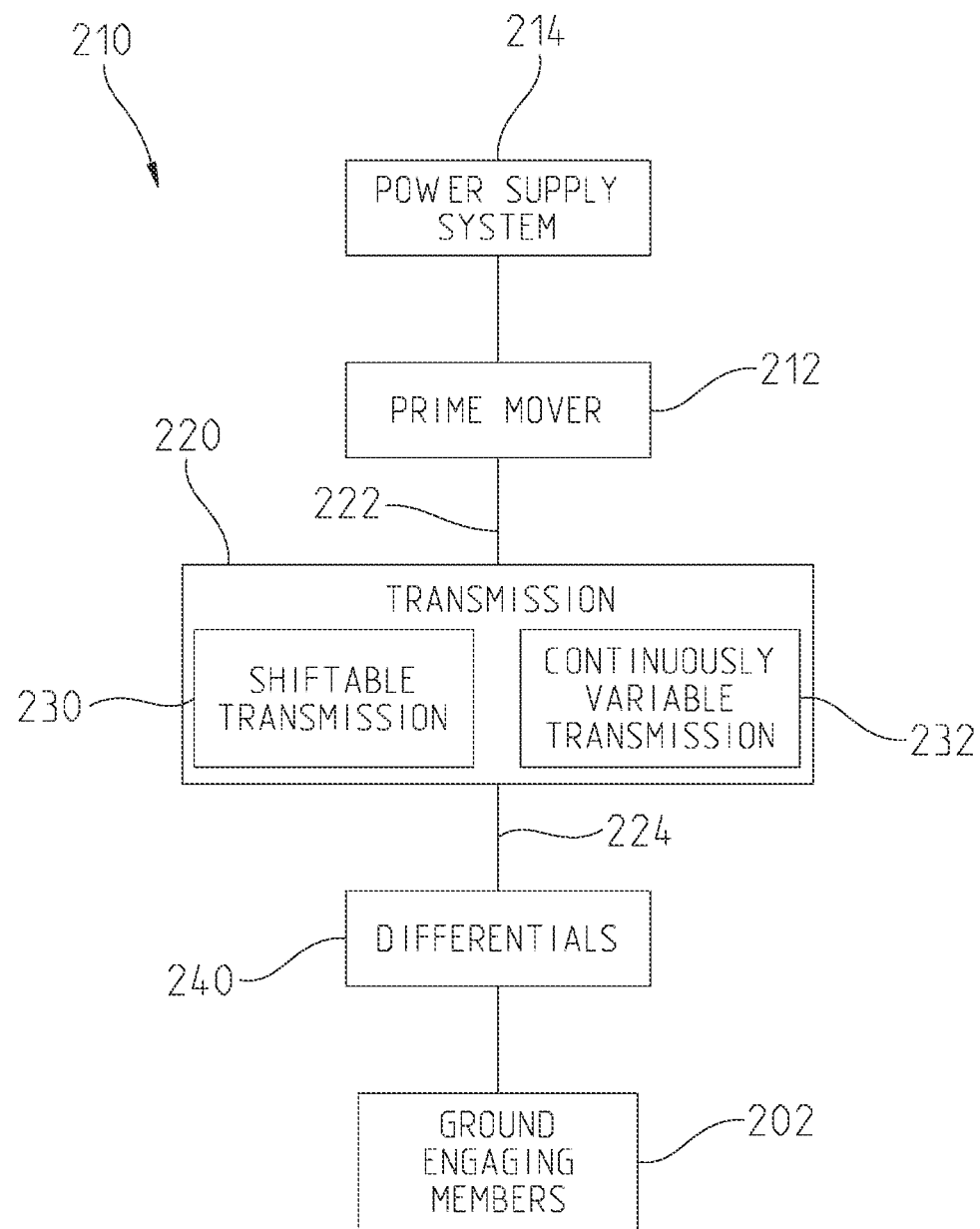
FIG. 18 illustrates a representative view of the power train of the exemplary side-by-side recreational vehicle of FIG. 4.

Referring to FIG. 18, power system 210 includes a prime mover 212. In embodiments, prime mover 212 is an internal combustion engine and receives fuel from a power supply system 214, such as a fuel pump positioned in a fuel tank 216 (see FIG. 8). Other exemplary prime movers include electric motors.

A transmission 220 is operatively coupled to prime mover 212. Transmission 220 converts a rotational speed of an output shaft 222 of prime mover 212 to one of a faster rotational speed or a slower rotational speed of an output shaft 224 of transmission 220. It is contemplated that transmission 220 may additionally rotate output shaft 224 at the same speed as output shaft 222.

In the illustrated embodiment, transmission 220 includes a shiftable transmission 230 and a continuously variable transmission ("CVT") 232. In one example, an input member of CVT 232 is coupled to prime mover 212. An input member of shiftable transmission 230 is in turn coupled to an output member of CVT 232. In embodiments, shiftable transmission 230 includes a forward high setting, a forward low setting, a neutral setting, a park setting, and a reverse setting. Gear selection sensor 118 monitors a gear setting of shiftable transmission 230. The power communicated from prime mover 212 to CVT 232 is provided to a drive member of CVT 232. The drive member in turn provides power to a driven member through a connecting member, such as a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 230. Although transmission 220 is illustrated as including both shiftable transmission 232 and CVT 230, transmission 220 may include only one of shiftable transmission 232 and CVT 230. Further, transmission 220 may include one or more additional components.

Transmission 220 is further coupled to at least one differential 240 which is in turn coupled to at least one ground engaging members 202. Differential 240 may communicate the power from transmission 220 to one of ground engaging members 202 or multiple ground engaging members 202. In an ATV embodiment, one or both of a front differential and a rear differential are provided. The front differential powering at least one of two front wheels of the ATV and the rear differential powering at least one of two rear wheels of the ATV. In a side-by-side vehicle embodiment having seating for at least an operator and a passenger in a side-by-side configuration, one or both of a front differential and a rear differential are provided. The front differential powering at least one of two front wheels of the side-by-side vehicle and the rear differential powering at least one of multiple rear wheels of the side-by-side vehicle. In one example, the side-by-side vehicle has three axles and a differential is provided for each axle.

Figure 12:
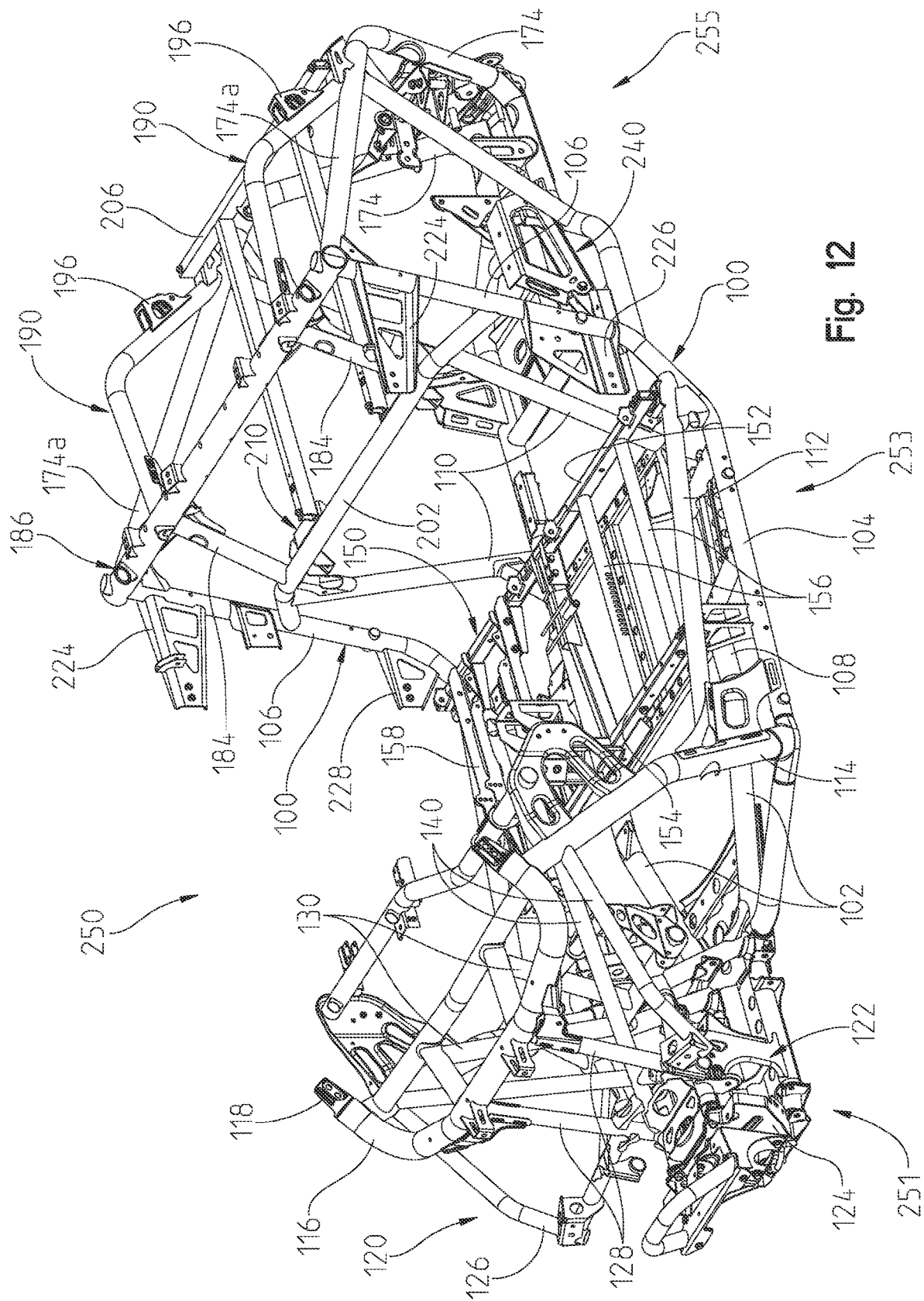
FIG. 12 illustrates a front, left perspective view of the frame of the exemplary side-by-side recreational vehicle of FIG. 4.
Figure 13:
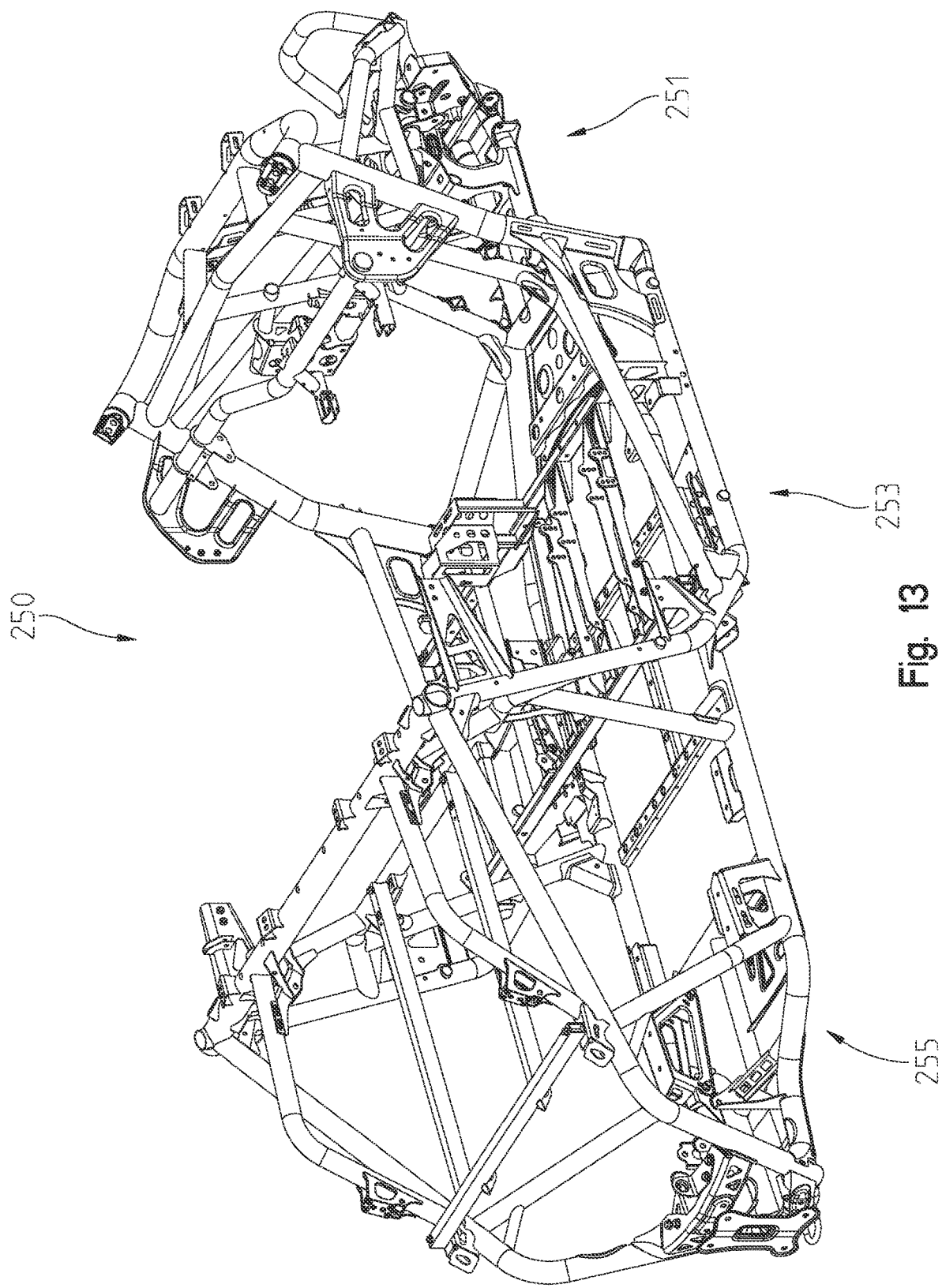
FIG. 13 illustrates a right, rear perspective view of the frame of the exemplary side-by-side recreational vehicle of FIG. 4.

Returning to FIG. 4, ground engaging members 202 support a vehicle frame 250 which in turn supports a seating area 252 comprised of a driver's seat 254 and a passenger seat 256. In the illustrated embodiment, seating area 252 is an open air seating area. Referring to FIGS. 12 and 13, vehicle frame 250 includes a front frame section 251, a mid-frame portion 253, and a rear frame portion 255. Seating area 252 is supported by mid frame portion 253. A cab frame 258 extends over seating area 252 to protect the passengers from such objects as tree branches, etc. A passenger grab bar 260 is provided for the passenger in seat 256.

Vehicle 200 further includes a front suspension 262 for each of the front ground engaging members 202 and a rear suspension 264 for each of the rear ground engaging members 202. Front suspensions 262 are coupled to front portion 251 of vehicle frame 250. Rear suspensions 264 are coupled to rear portion 255 of vehicle frame 250 and a rear side of mid frame portion 253.

Figure 14:
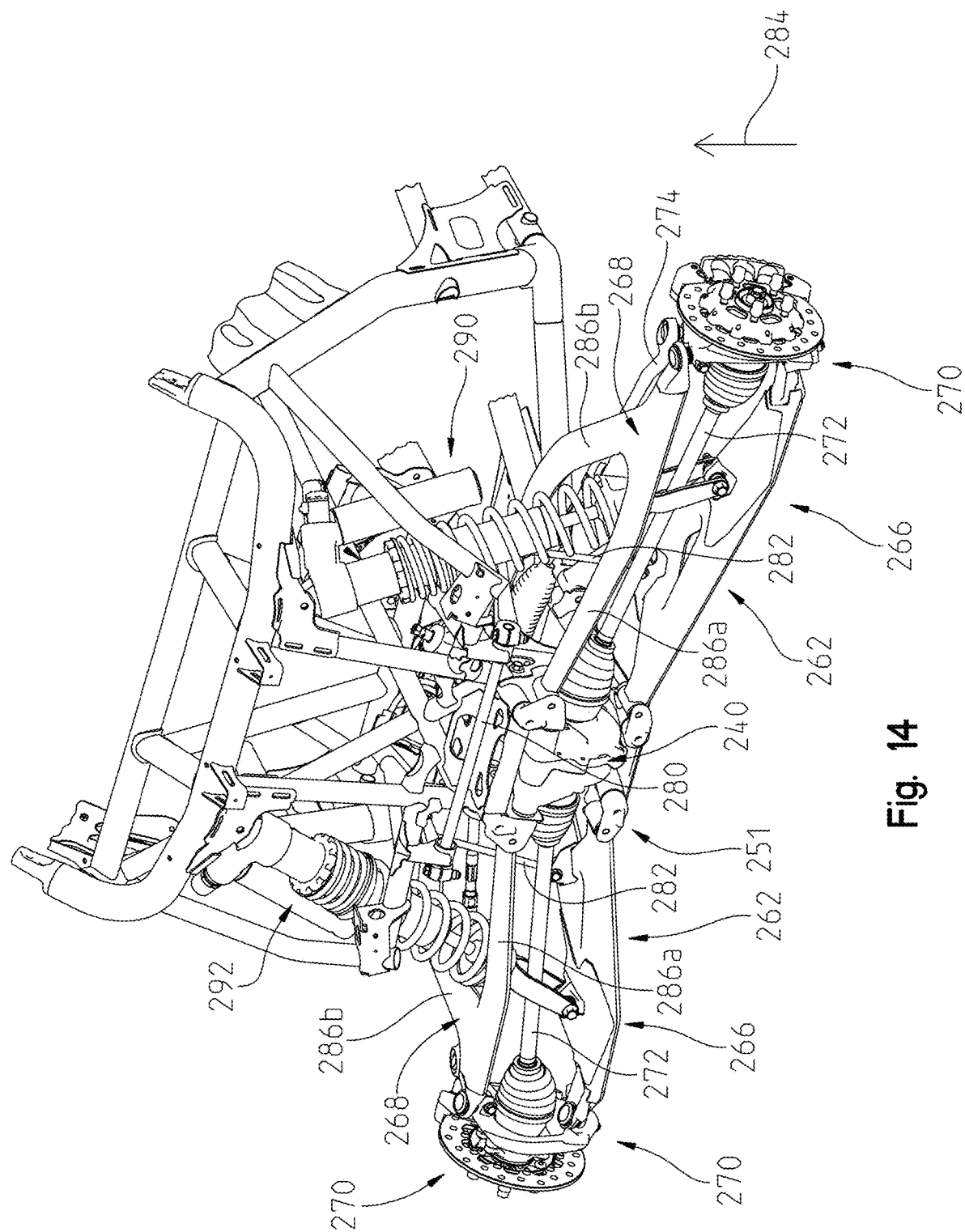
FIG. 14 illustrates a front, left perspective view of a driver side and passenger side front suspensions of the exemplary side-by-side recreational vehicle of FIG. 4.
Figure 15:
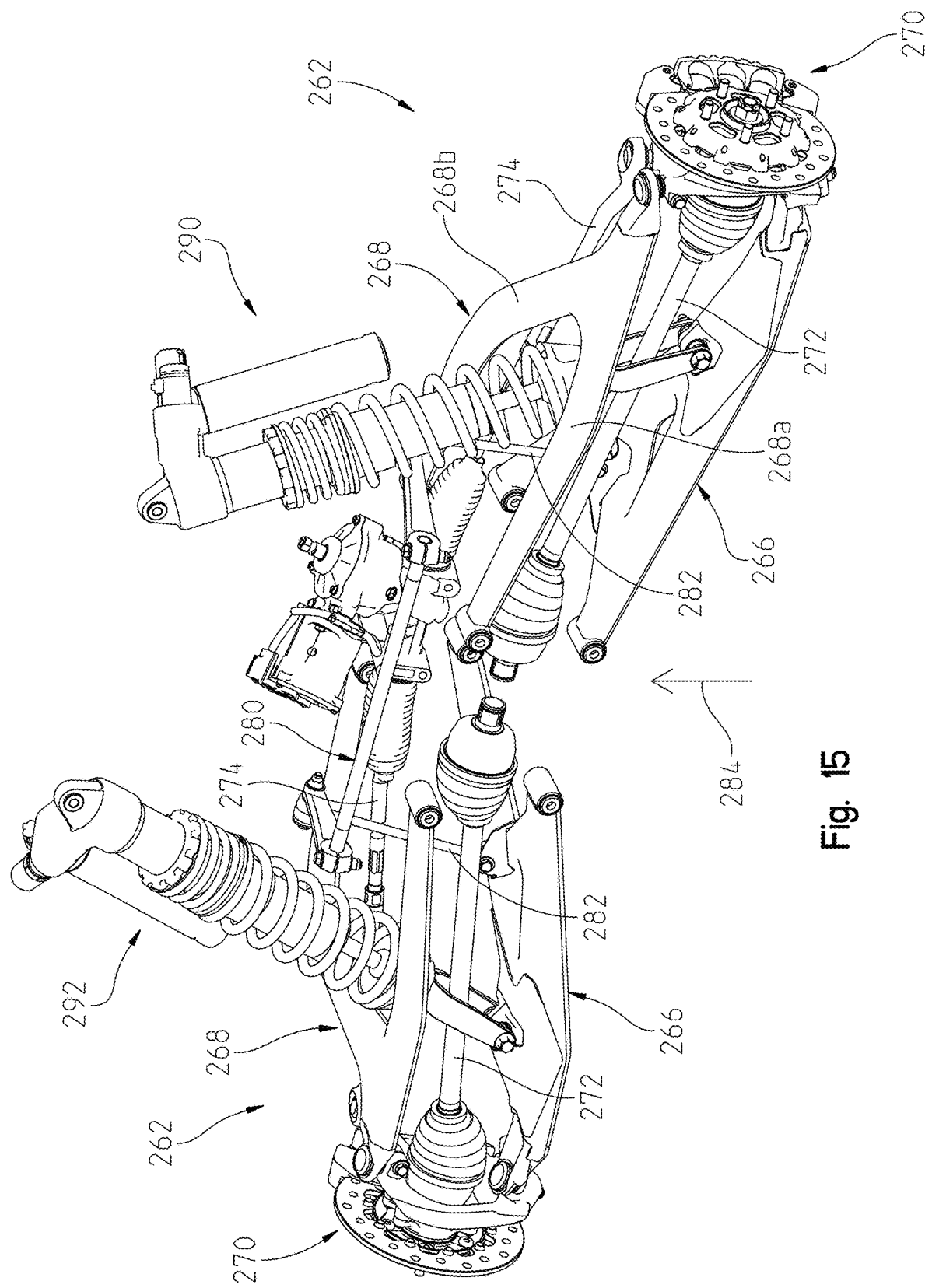
FIG. 15 illustrates a rear perspective view of the driver side and passenger side front suspensions of the exemplary side-by-side recreational vehicle of FIG. 4.

Referring to FIGS. 14 and 15, front suspensions 262 include lower A-arms 266 rotatably coupled to front portion 251 of vehicle frame 250 at a first end and upper A-arms 268 rotatably coupled to front portion 251 of vehicle frame 250 at a first end. The second ends of lower A-arms 266 and upper A-arms are rotatably coupled to respective wheel carriers 270. Tie rods 274 of steering system 64 are also coupled to wheel carriers 270 to control an angle of wheel carriers 270 and steer vehicle 200. A desired steering angle is input by the driver through actuation of an operator steering input, illustratively steering wheel 276 (see FIG. 4). A front differential 240 of power system 210 is also supported by front portion 251 of vehicle frame 250 and is operatively coupled to wheel carriers 270 through half shafts 272 which rotate a portion of wheel carriers 270 to propel vehicle 200 relative to the ground. A sway bar 280 is rotatably coupled to front portion 251 of vehicle frame 250 through links 282 (see FIG. 15) which are coupled to lower A-arms 266 and to sway bar 280 to couple the front suspensions 262, such that a vertical movement of one of front suspensions 262 will initially cause a twisting of sway bar 280 and further movement thereafter will cause a movement of the other of the front suspensions 262 due to the interconnection through sway bar 280.

Front suspensions 262 further include adjustable shocks, illustratively left front electronically adjustable shock 290 on the operator side of centerline vertical plane 284 (see FIG. 9) of vehicle 200 and right front electronically adjustable shock 292 on the passenger side of centerline vertical plane 284. Left front electronically adjustable shock 290 and right front electronically adjustable shock 292 are rotatably coupled at a lower end to lower A-arms 266 of the respective front suspensions 262 and rotatably coupled at an upper end to front portion 251 of vehicle frame 250. Each of left front electronically adjustable shock 290 and right front electronically adjustable shock 292 are operatively coupled to electronic controller 50 which controls the compression damping characteristic and rebound damping characteristic of each of left front electronically adjustable shock 290 and right front electronically adjustable shock 292.

Referring again to FIGS. 5 and 7-10, front wheels 202 and front suspensions 262 are positioned forwardly of seating area 252 and rear wheels 202 are positioned rearwardly of seating area 252. Each of links 282, lower control arms 266, upper control arms 268, left front electronically adjustable shock 290, and right front electronically adjustable shock 292 of front suspensions 262 are positioned forwardly of the seating area 252. Further, referring to FIG. 10, each upper control arm 268 overlaps in front of each link 282, respectively, when viewed from a front of the vehicle.

Referring to FIGS. 14-15, upper arms 268 include a forward portion 268a and a rearward portion 268b. Further, each of links 282 extends downwardly between the forward portion 268a and the rearward portion 268b and couple to each of lower control arms 266 such that at least a portion of links 282 are positioned intermediate lower arms 266 and upper arms 268. Additionally, each of links 282 are positioned longitudinally forwardly of tie rods 274 and each of links 282 are positioned longitudinally rearwardly of halfshafts 272. Further, links 282 are positioned longitudinally rearwardly of forward portion 268a of upper arms 268.

Figure 51:
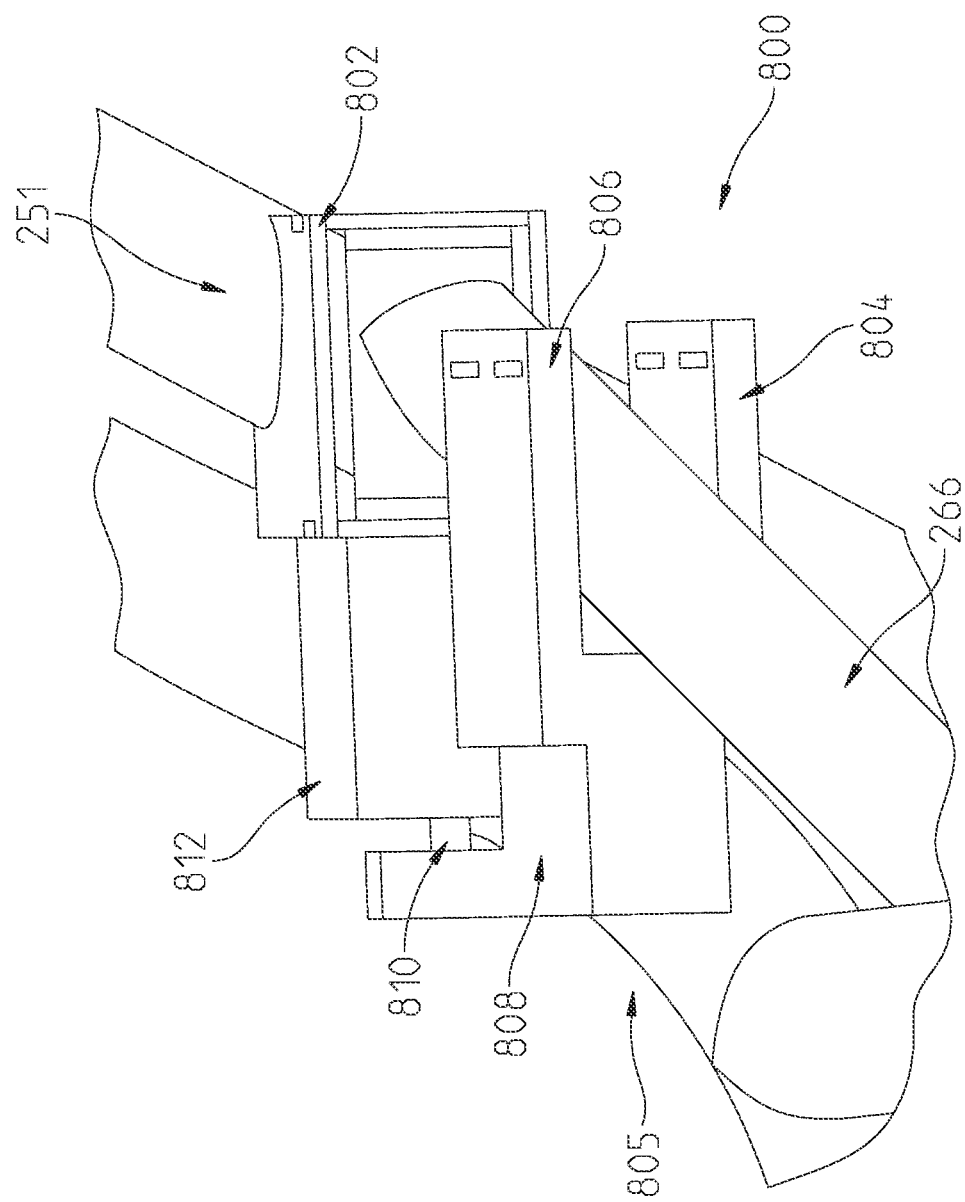
FIG. 51 illustrates an exemplary suspension position sensor.

A suspension position sensor 800 is shown in FIG. 51. Suspension position sensor 800 may provide for real time measuring of shock length and wheel location in suspension travel. Suspension position sensor 800 is operatively coupled to electronic controller 50.

Referring to FIG. 51, suspension position sensor 800 includes a frame mounting bracket 802 which is coupled to front portion 251 of frame 250. Suspension position sensor 800 further includes an a-arm bracket 805 which is coupled to a-arm 266. A-arm bracket 805 includes a base 808, a lower arm 804 coupled to base 808, and an upper arm 806 coupled to base 808. A-arm 266 is received between lower arm 804 and upper arm 806. A-arm bracket 805 moves with A-arm 266. Base 808 is further coupled to a rotatable shaft 810 of a rotary potentiometer, encoder, or hall effect sensor positioned inside housing 812 of frame mounting bracket 802. As A-arm 266 moves the pot, encoder, or hall effect sensor detects the rotation between A-arm 266 and frame 251. Based on those readings the position and velocity of ground engaging member 102 may be determined. Although illustrated coupled to A-arm 266, suspension position sensor 800 may be attached to other types of suspension arms or suspension components which rotate with suspension travel.

Figure 7:
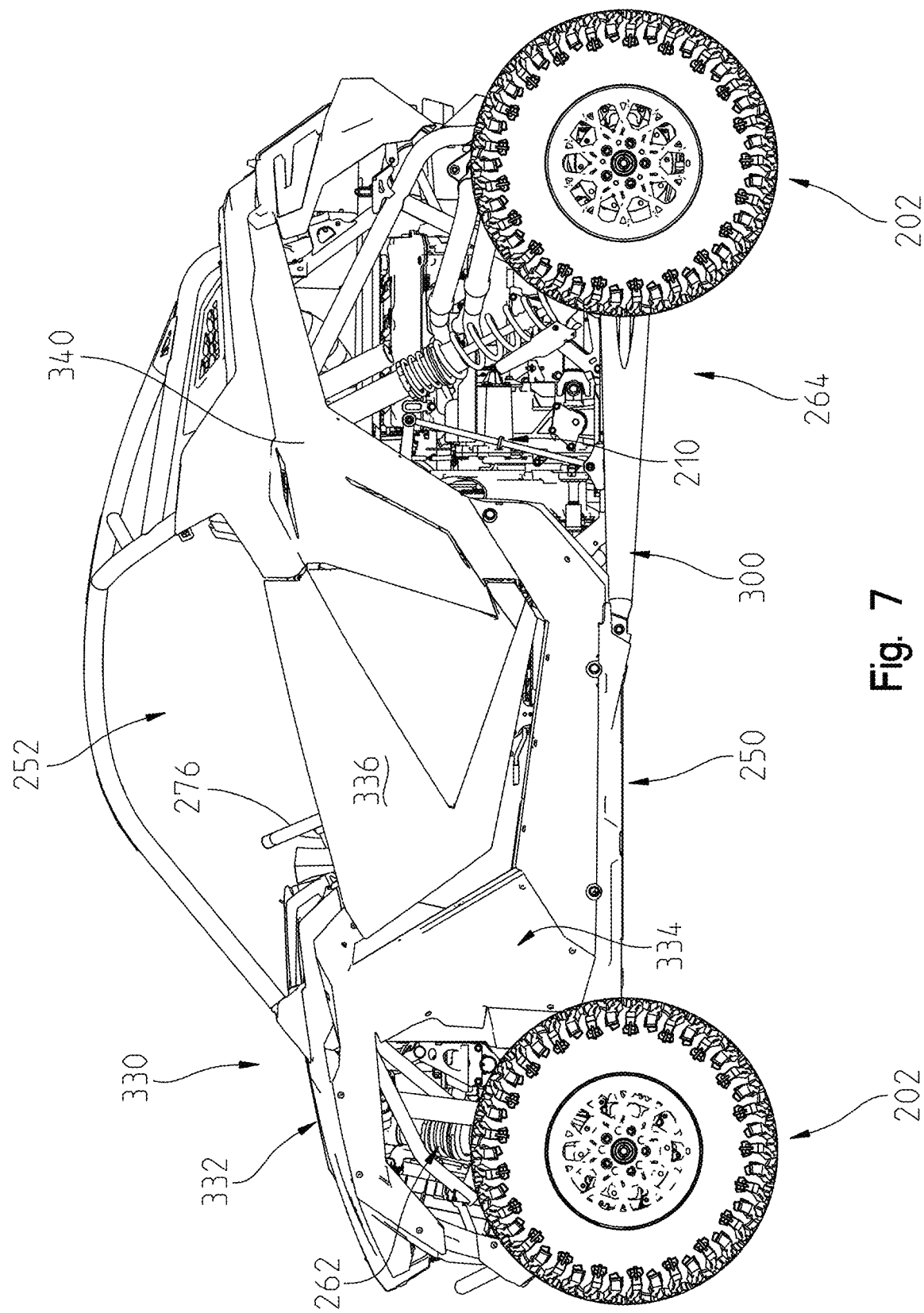
FIG. 7 illustrates a left or driver side view of the exemplary side-by-side recreational vehicle of FIG. 4.
Figure 8:
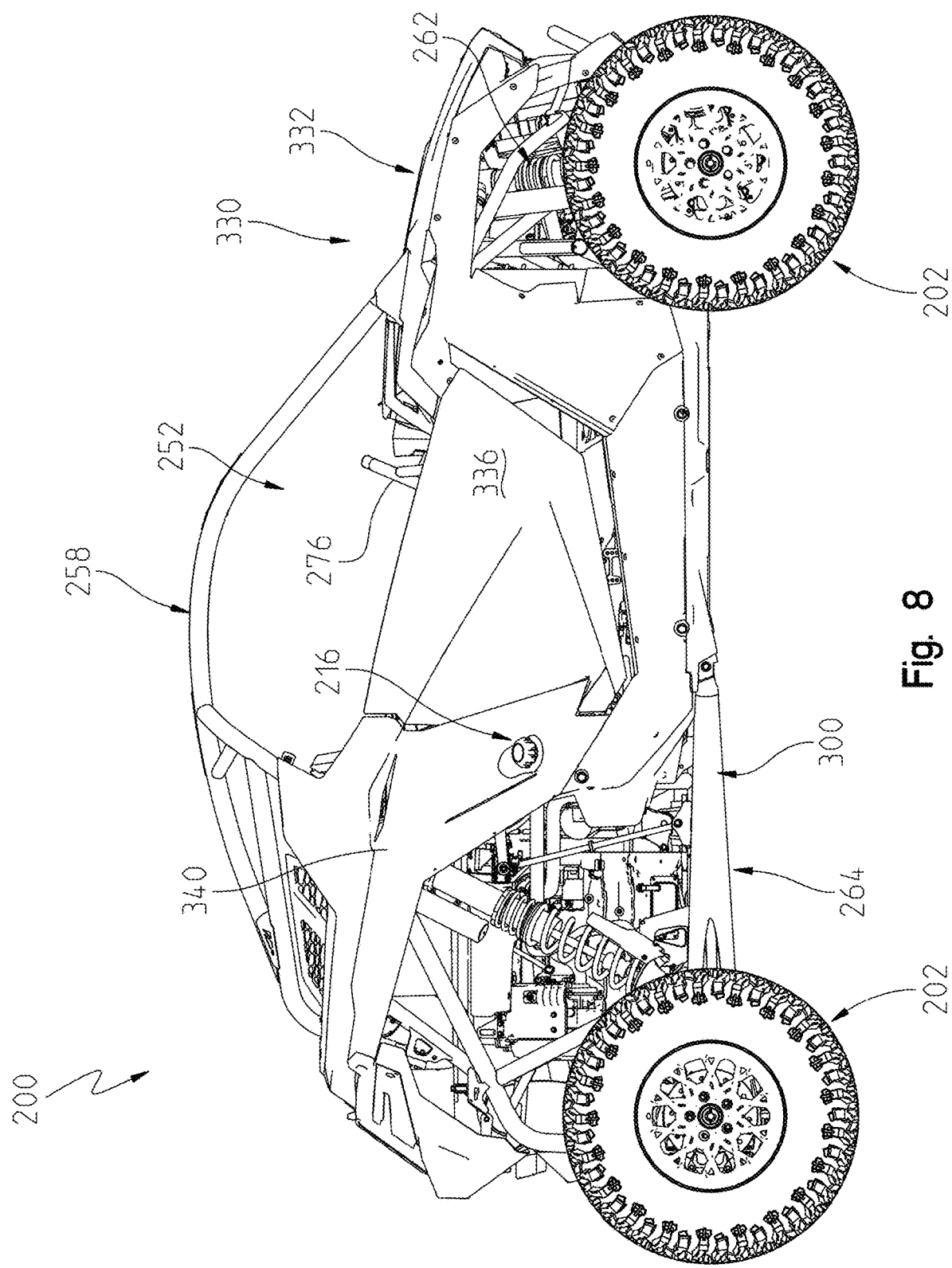
FIG. 8 illustrates a right or passenger side view of the exemplary side-by-side recreational vehicle of FIG. 4.
Figure 9:
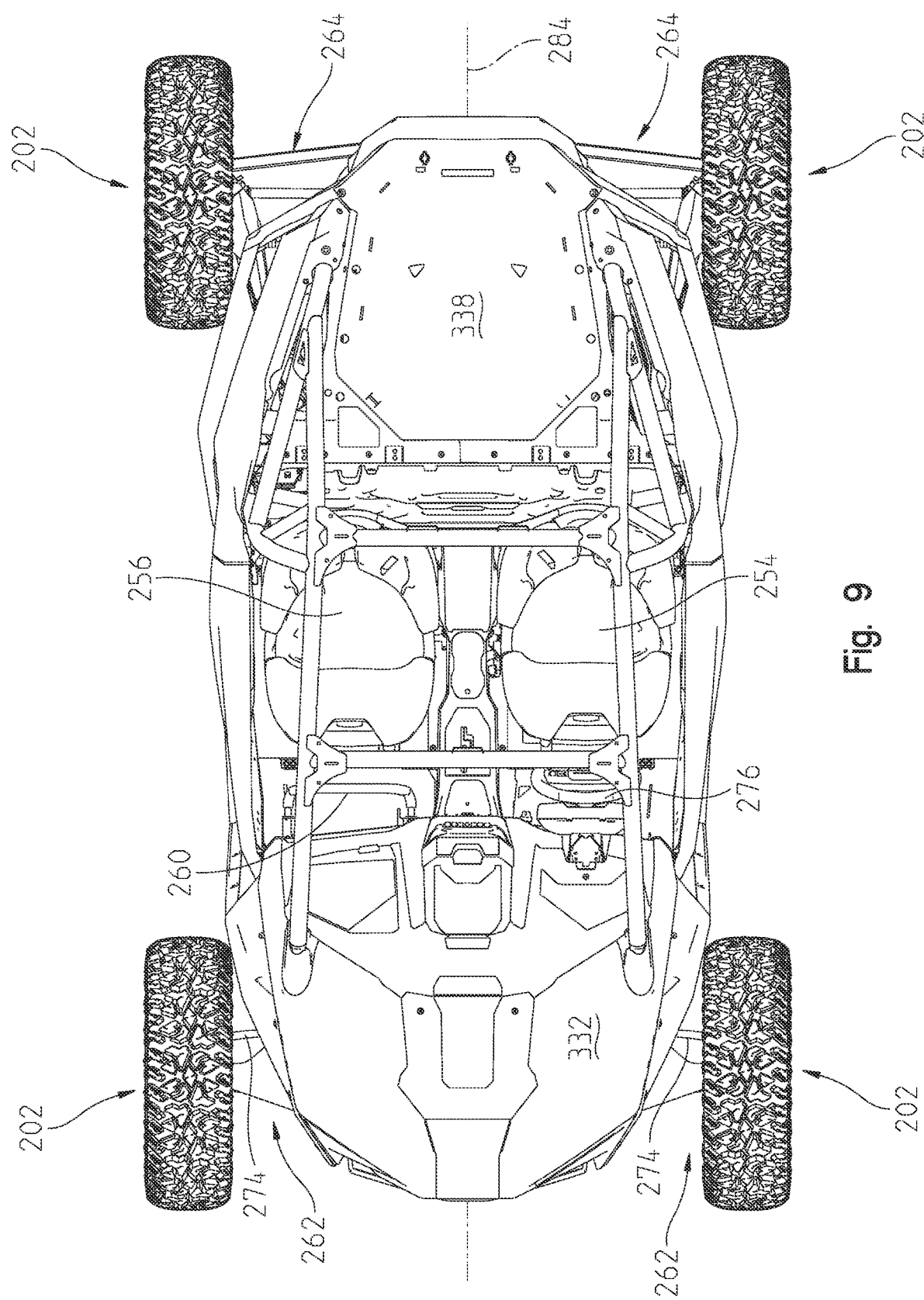
FIG. 9 illustrates a top view of the exemplary side-by-side recreational vehicle of FIG. 4.
Figure 11:
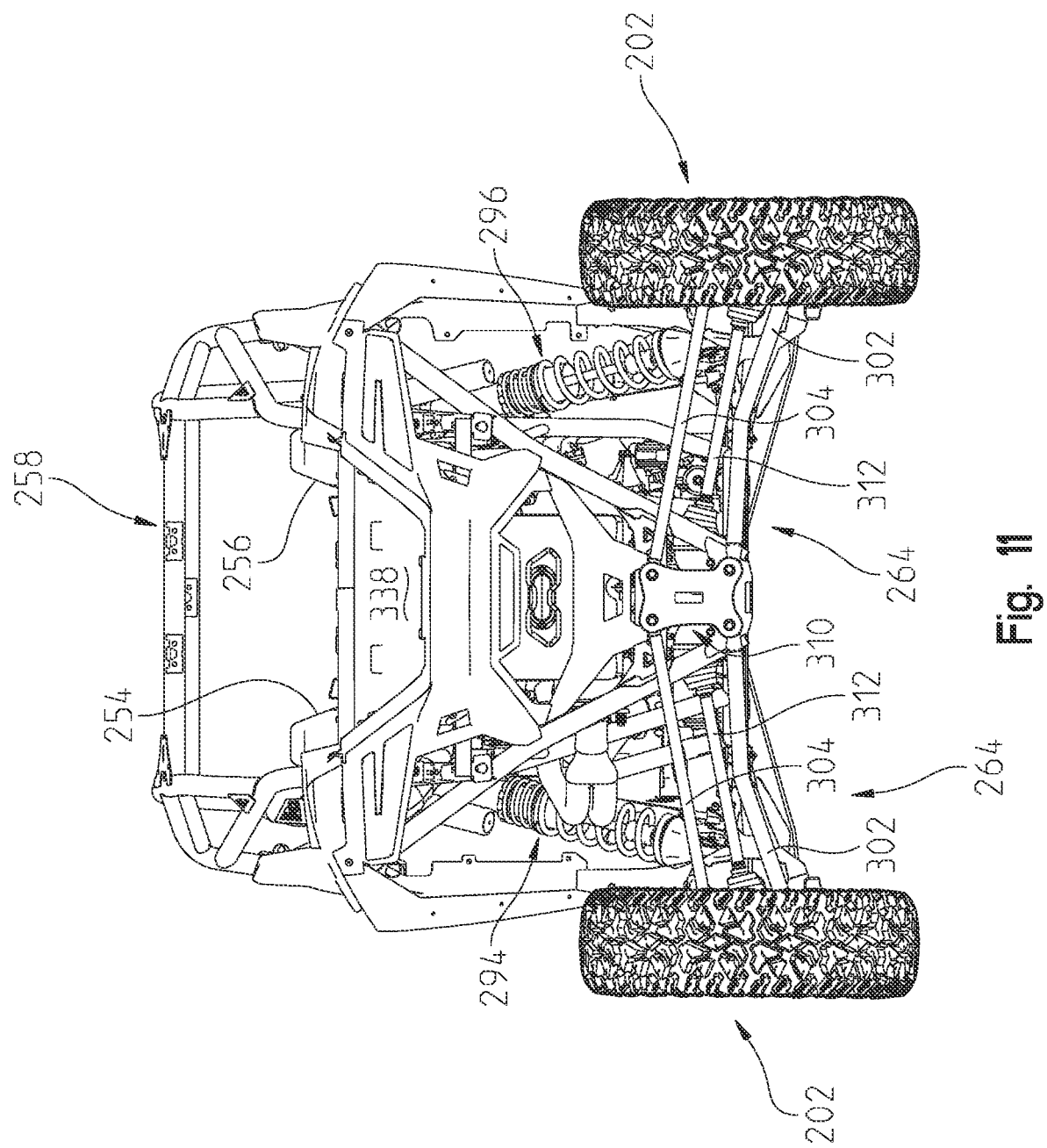
FIG. 11 illustrates a rear view of the exemplary side-by-side recreational vehicle of FIG. 4.

Referring to FIGS. 7, 8, and 11, rear suspensions 264 include trailing arms 300 rotatably coupled to a rear side of mid portion 253 of vehicle frame 250 at a first end and coupled to a wheel carrier (not shown) at a second end. Rear suspensions 264 further include lower control arms 302 and upper control arms 304 rotatably coupled to rear frame portion 255 of vehicle frame 250 at a first end and rotatably coupled to the wheel carrier at a second end. A rear differential 310 of power system 210 is also supported by rear portion 255 of vehicle frame 250 and is operatively coupled to the wheel carriers through half shafts 312 which rotate a portion of the wheel carriers to propel vehicle 200 relative to the ground.

Figure 16:
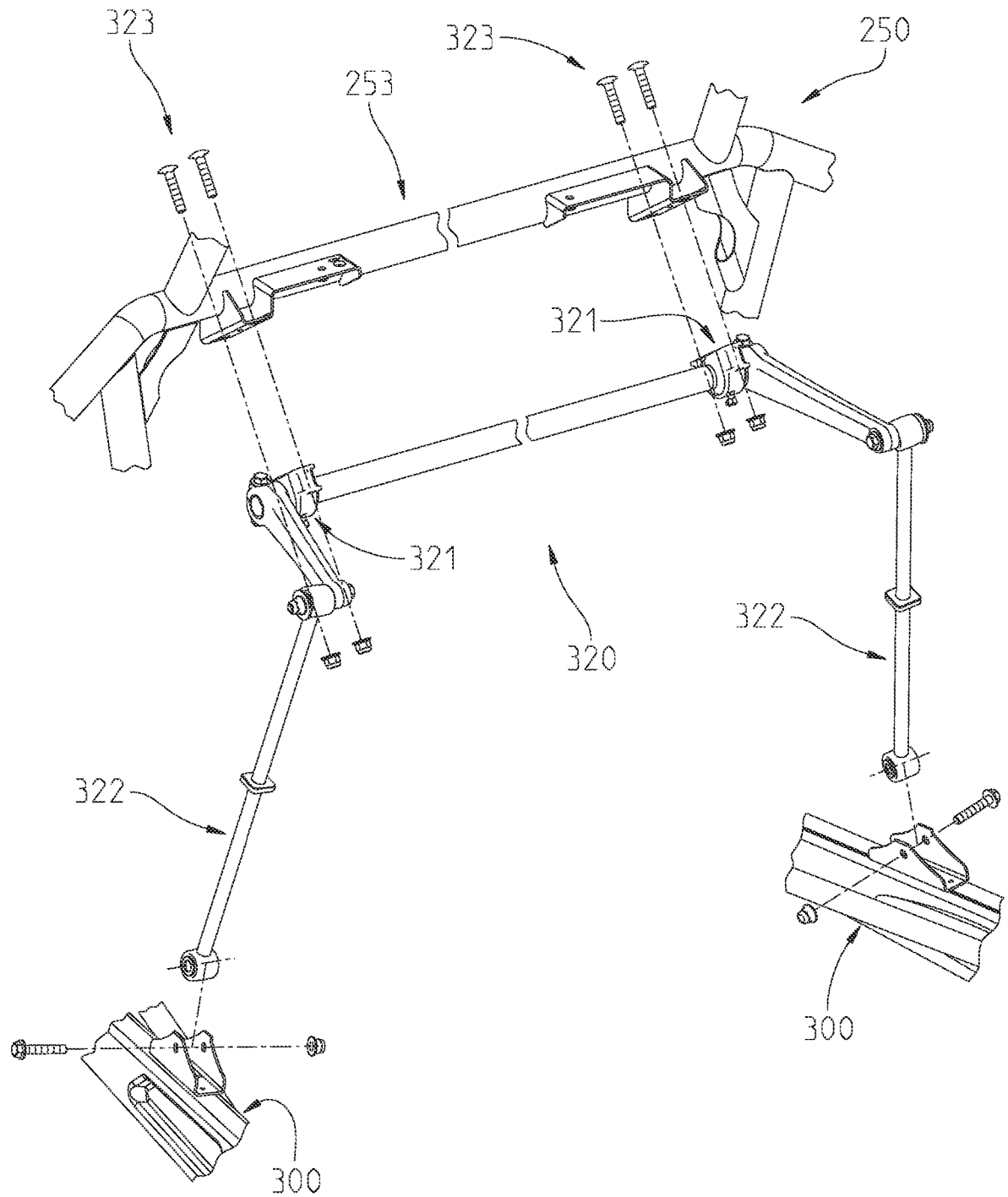
FIG. 16 illustrates an exploded view of portions of a driver side and a passenger side rear suspensions of the exemplary side-by-side recreational vehicle of FIG. 4 including a rear sway bar.
Figure 17:
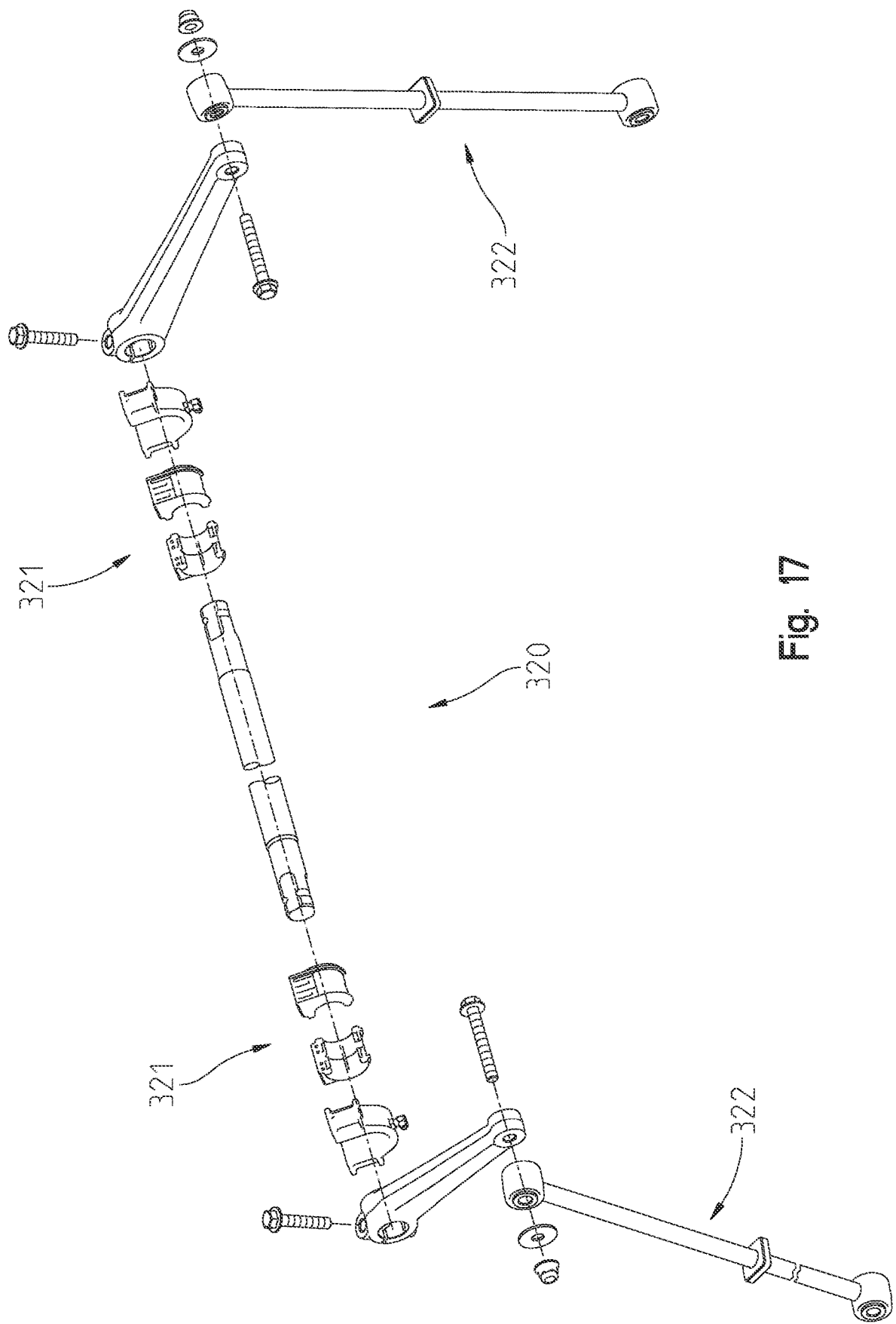
FIG. 17 illustrates an exploded view of the rear sway bar of FIG. 16 of the exemplary side-by-side recreational vehicle of FIG. 4.

Referring to FIGS. 16 and 17, sway bar 320 is rotatably coupled to a rear side of middle portion 253 of vehicle frame 250 through mounts 321 secured to vehicle frame 250 with fasteners 323. Links 322 are rotatably coupled to trailing arms 300 on a first end and are rotatably coupled to sway bar 320 on a second end to couple rear suspensions 264, such that a vertical movement of one of rear suspensions 264 will initially cause a twisting of sway bar 320 and further movement thereafter will cause a movement of the other of the rear suspensions 264 through the interconnection of sway bar 320.

Rear suspensions 264 further include adjustable shocks, illustratively left rear electronically adjustable shock 294 on the operator side of centerline vertical plane 284 (see FIG. 11) of vehicle 200 and right rear electronically adjustable shock 296 on the passenger side of centerline vertical plane 284. Left rear electronically adjustable shock 294 and right rear electronically adjustable shock 296 are rotatably coupled at a lower end to trailing arms 300 of the respective rear suspensions 264 and rotatably coupled at an upper end to rear portion 255 of vehicle frame 250. Each of left rear electronically adjustable shock 294 and right rear electronically adjustable shock 296 are operatively coupled to electronic controller 50 which controls the compression damping characteristic and rebound damping characteristic of each of left rear electronically adjustable shock 294 and right rear electronically adjustable shock 296.

As shown vehicle 200 may also include an outer body 330 including a hood 332, side panels 334, doors 336, a utility cargo bed 338 (see FIG. 6) and rear panels 340. Vehicle 200, as described herein, may be further configured as shown in U.S. Pat. No. 8,827,028; U.S. patent application Ser. No. 16/458,797, published as US20200164742A1; U.S. patent application Ser. No. 16/244,462, published as US20190210668A1; and/or U.S. patent application Ser. No. 16/861,859, the entire disclosures of which are expressly incorporated by reference herein.

Figure 5:
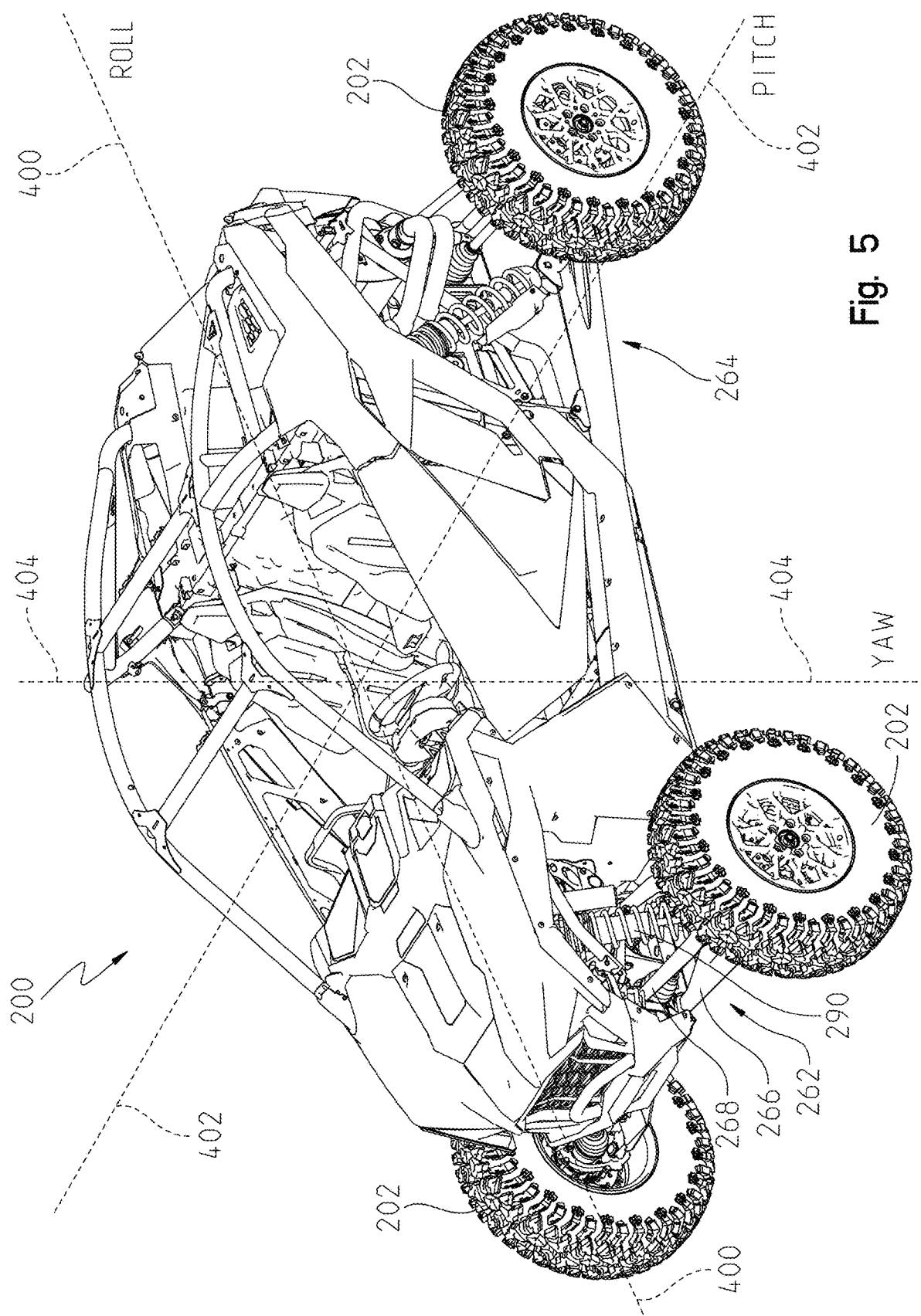
FIG. 5 illustrates the pitch, roll, and yaw axes of the exemplary side-by-side recreational vehicle of FIG. 4.
Figure 6:
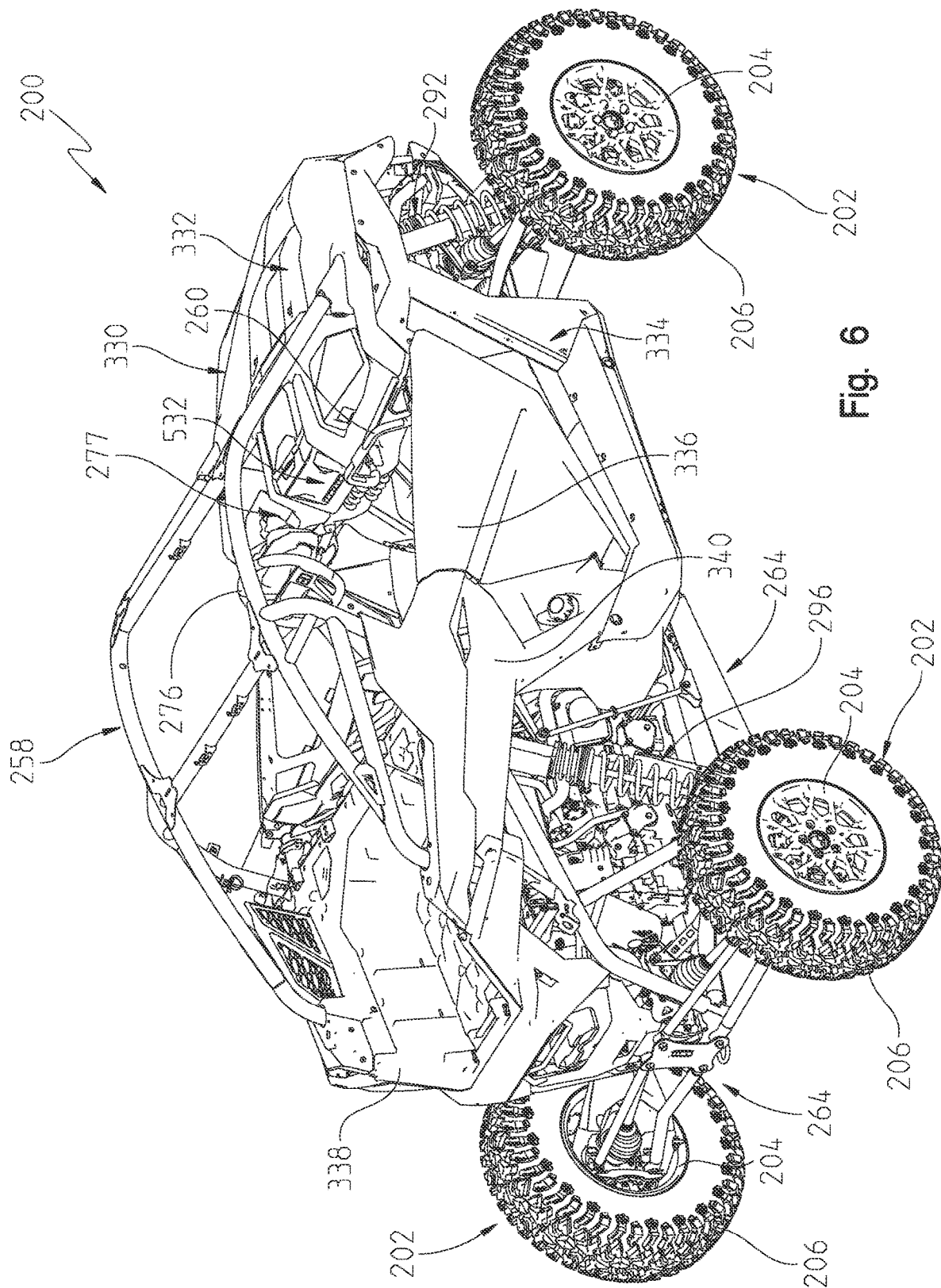
FIG. 6 illustrates a rear, right perspective view of the exemplary side-by-side recreational vehicle of FIG. 4.

Referring to FIG. 5, a roll axis 400, a pitch axis 402, and a yaw axis 404 of vehicle 200 are shown. IMU 108 provides information to electronic controller 50 of the movement characteristics of vehicle 200 along and about roll axis 400 (longitudinal acceleration and roll angle rate), pitch axis 402 (lateral acceleration and pitch angle rate), and yaw axis 404 (vertical acceleration and yaw angle rate).

Figure 19:
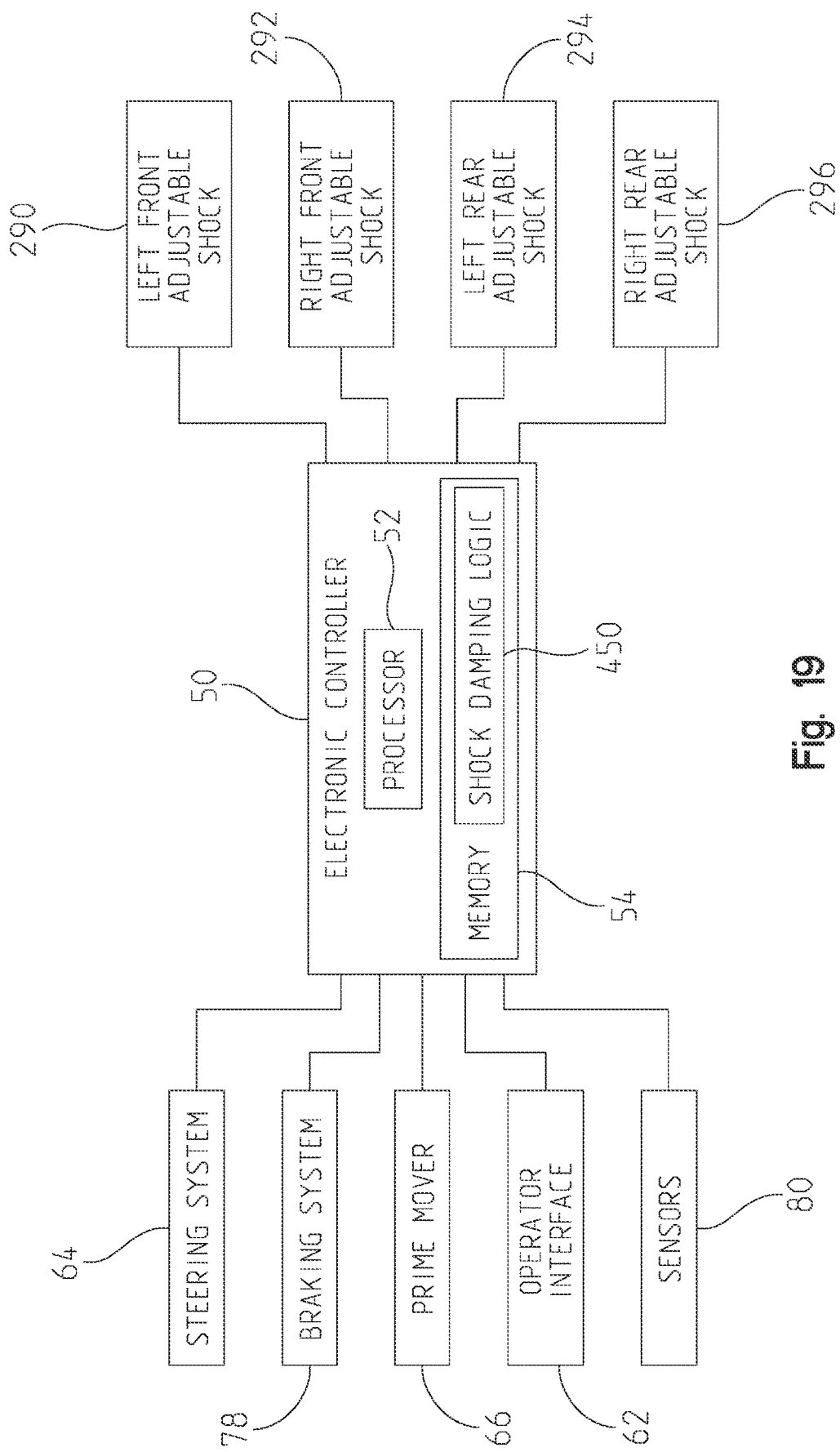
FIG. 19 illustrates an exemplary suspension control system of the exemplary side-by-side recreational vehicle of FIG. 4.

Referring to FIG. 19, electronic controller 50 includes shock damping logic 450 which controls the damping characteristics of left front electronically adjustable shock 290, right front electronically adjustable shock 292, left rear electronically adjustable shock 294, and right rear electronically adjustable shock 296. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium, such as memory 54, comprising logic 450 can additionally be considered to be embodied within any tangible form of a computer-readable carrier, such as solid-state memory, magnetic disk, and optical disk containing an appropriate set of computer instructions and data structures that would cause a processor 52 to carry out the processing sequences described herein. This disclosure contemplates other embodiments in which electronic controller 50 is not microprocessor-based, but rather is configured to control operation of left front electronically adjustable shock 290, right front electronically adjustable shock 292, left rear electronically adjustable shock 294, and right rear electronically adjustable shock 296 based on one or more sets of hardwired instructions. In embodiments, shock damping logic 450 is executed by suspension controller 90 of electronic controller 50.

Electronic controller 50 provides the electronic control of and/or monitors the various components of vehicle 200, illustratively steering system 64, braking system 78, prime mover 66, operator interface 62, and sensors 80. Exemplary sensors 80 are provided in FIG. 3 and throughout this disclosure.

Figure 20:
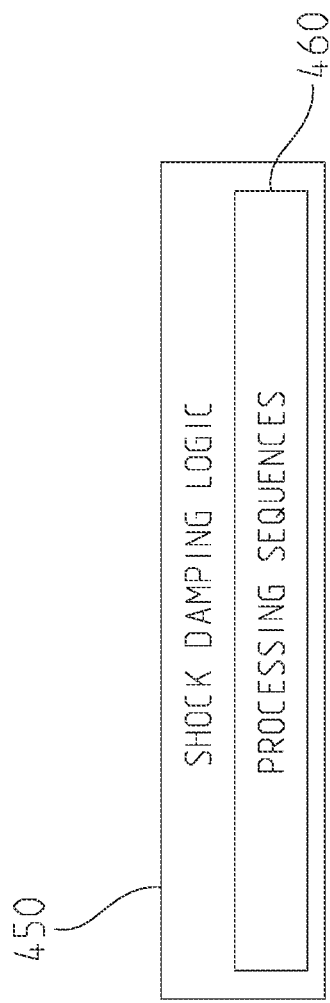
FIG. 20 illustrates an exemplary shock damping logic of the exemplary control system of FIG. 19.

Referring to FIG. 20, shock damping logic 450 includes one or more processing sequences 460 which control the damping characteristics of one or more of left front electronically adjustable shock 290, right front electronically adjustable shock 292, left rear electronically adjustable shock 294, and right rear electronically adjustable shock 296. In embodiments, shock damping logic 450 includes one or more functions which based on one or more inputs output desired damping characteristics for each of left front electronically adjustable shock 290, right front electronically adjustable shock 292, left rear electronically adjustable shock 294, and right rear electronically adjustable shock 296. The desired damping characteristics may be the same for two or more or left front electronically adjustable shock 290, right front electronically adjustable shock 292, left rear electronically adjustable shock 294, and right rear electronically adjustable shock 296 or different for each of left front electronically adjustable shock 290, right front electronically adjustable shock 292, left rear electronically adjustable shock 294, and right rear electronically adjustable shock 296. The exemplary processing sequences, in embodiments, have varying arbitration priorities based on inputs received and the desired performance of vehicle 200.

Figure 21:
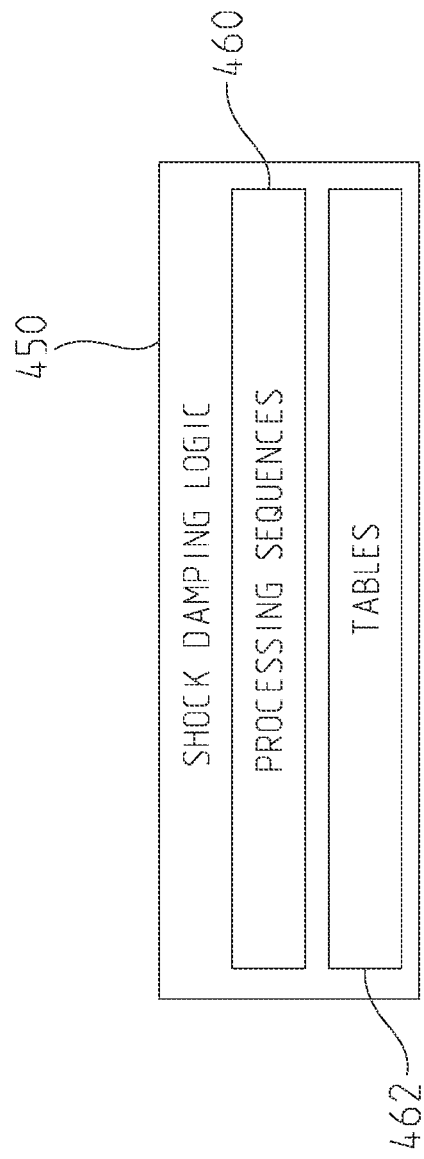
FIG. 21 illustrates another exemplary shock damping logic of the exemplary control system of FIG. 19.

Referring to FIG. 21, shock damping logic 450 includes one or more processing sequences 460 which control the damping characteristics of one or more of left front electronically adjustable shock 290, right front electronically adjustable shock 292, left rear electronically adjustable shock 294, and right rear electronically adjustable shock 296 and one or more look-up tables 462 which based on one or more inputs provides damping characteristics for each of left front electronically adjustable shock 290, right front electronically adjustable shock 292, left rear electronically adjustable shock 294, and right rear electronically adjustable shock 296. The exemplary processing sequences, in embodiments, have varying arbitration priorities based on inputs received and the desired performance of vehicle 200.

In embodiments, electronic controller 50 updates the damping characteristics of left front electronically adjustable shock 290, right front electronically adjustable shock 292, left rear electronically adjustable shock 294, and right rear electronically adjustable shock 296 during movement of vehicle 200. Electronic controller 50 continuously controls left front electronically adjustable shock 290, right front electronically adjustable shock 292, left rear electronically adjustable shock 294, and right rear electronically adjustable shock 296 by updating the desired damping characteristics of left front electronically adjustable shock 290, right front electronically adjustable shock 292, left rear electronically adjustable shock 294, and right rear electronically adjustable shock 296 based on monitored sensor values, received operator inputs, and/or other inputs at discrete instances of time. An exemplary time interval is about 1 milli-seconds to about 5 milliseconds. For example, electronic controller 50 updates targets for each of left front electronically adjustable shock 290, right front electronically adjustable shock 292, left rear electronically adjustable shock 294, and right rear electronically adjustable shock 296 about every 5 milliseconds and updates the current control loop about every milli-second.

Shock damping logic 450, based on inputs from operator interface 62 and one or more sensors 80 adjusts the damping characteristics of left front electronically adjustable shock 290, right front electronically adjustable shock 292, left rear electronically adjustable shock 294, and right rear electronically adjustable shock 296 based on various conditions. In embodiments, shock damping logic 450 adjusts the compression and/or rebound damping characteristics for one or more of left front electronically adjustable shock 290, right front electronically adjustable shock 292, left rear electronically adjustable shock 294, and right rear electronically adjustable shock 296 based on a determination that vehicle 200 is cornering, braking, accelerating, airborne, landing, sliding, traveling on flat ground, traveling uphill, traveling downhill, traveling over whoops, rock crawling, counter steering, selected vehicle modes, based on monitored sensor values, and other monitored conditions. Exemplary processing sequences for the above and other conditions are provided in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

In embodiments, shock damping logic 450 predicts acceleration of vehicle 200 along one or more of roll axis 400 (longitudinal acceleration), pitch axis 402 (lateral acceleration), and yaw axis 404 (vertical acceleration) and/or predicts an angular motion of vehicle 200 about one or more of roll axis 400, pitch axis 402, and yaw axis 404 and updates the damping characteristics of one or more of left front electronically adjustable shock 290, right front electronically adjustable shock 292, left rear electronically adjustable shock 294, and right rear electronically adjustable shock 296 based thereon or in combination with other inputs and sensed values.

In embodiments, a longitudinal acceleration of vehicle 200 is measured based on one or more inputs, such as IMU 132, estimated based on one or more inputs, such as a monitored throttle position and/or a monitored engine rpm, or predicted based on one or more inputs as described herein.

In embodiments, for the predicted longitudinal acceleration of vehicle 200, electronic controller 50 actively reviews the engine torque and/or throttle position and adjusts the compression and rebound damping characteristics of left front electronically adjustable shock 290, right front electronically adjustable shock 292, left rear electronically adjustable shock 294, and right rear electronically adjustable shock 296 to counter predicted motion of vehicle 200, such as diving (pitching forward about pitch axis 402) or squatting (pitching rearward about pitch axis 402). In an example, vehicle 200 is traveling at a higher speed (open throttle) and the operator drops the throttle to 0%. In response, electronic controller 50 increases the compression damping in left front electronically adjustable shock 290 and right front electronically adjustable shock 292 to counter a front end dive of vehicle 200 and increases the rebound damping in left rear electronically adjustable shock 294 and right rear electronically adjustable shock 296 to counter the lifting of the rear end of vehicle 200.

Figure 22:
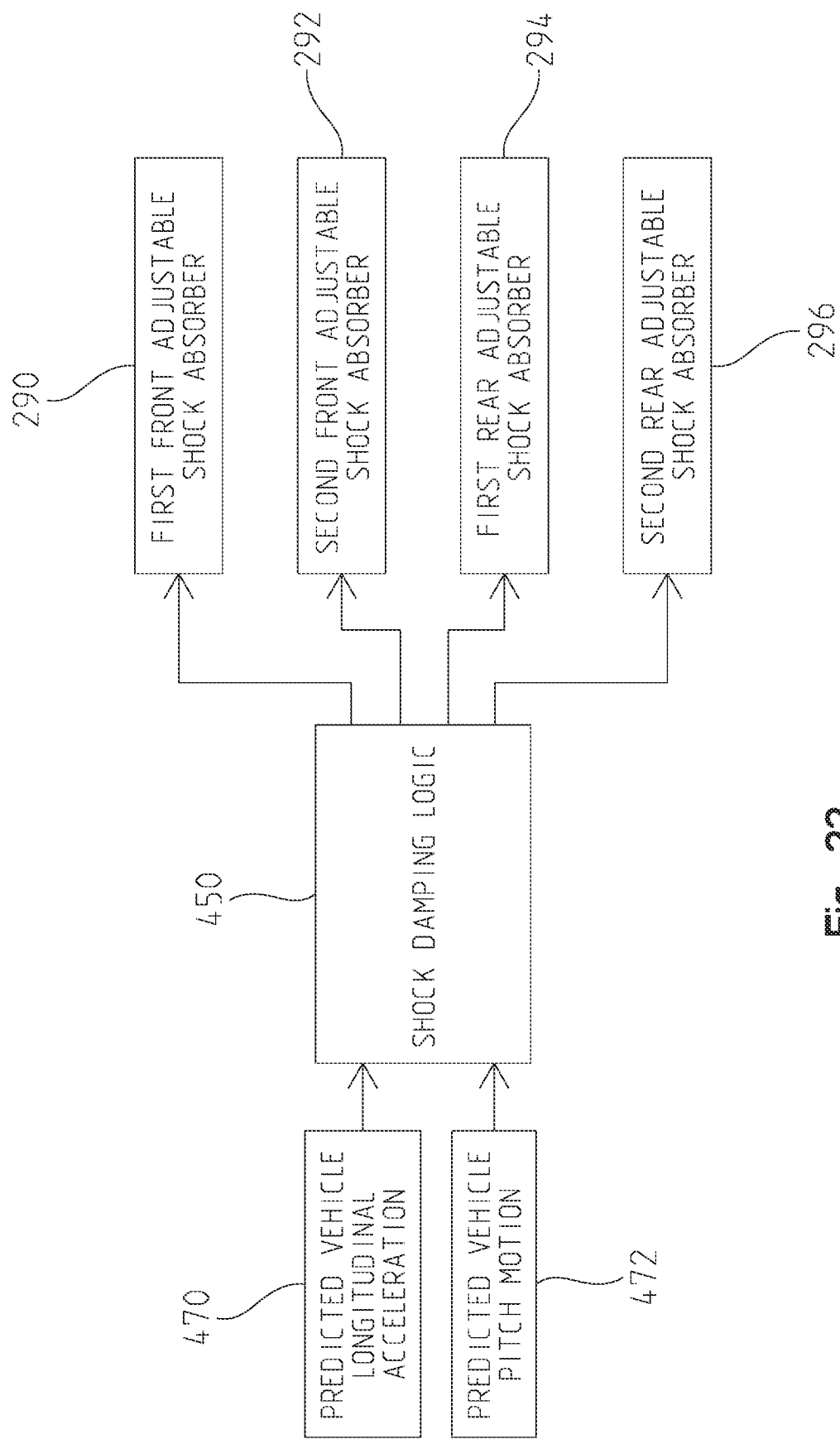
FIG. 22 illustrates an exemplary shock damping logic of the exemplary control system of FIG. 19.

Referring to FIG. 22, in embodiments, shock damping logic 450 receives a predictive longitudinal acceleration 470 of vehicle 200 and a predictive pitch motion 472 of vehicle 200 and assigns damping characteristics for one or more of left front electronically adjustable shock 290, right front electronically adjustable shock 292, left rear electronically adjustable shock 294, and right rear electronically adjustable shock 296 based on one or both of the predicted longitudinal acceleration 470 of vehicle 200 and the predictive pitch motion 472 of vehicle 200. Shock damping logic 450, in embodiments, includes a damping characteristic table (compression damping only, rebound damping only, or both compression and rebound damping) for each of left front electronically adjustable shock 290, right front electronically adjustable shock 292, left rear electronically adjustable shock 294, and right rear electronically adjustable shock 296 based on predicted vehicle longitudinal acceleration 470 of vehicle 200 and/or predicted vehicle pitch 472 of vehicle 200.

Figure 23:
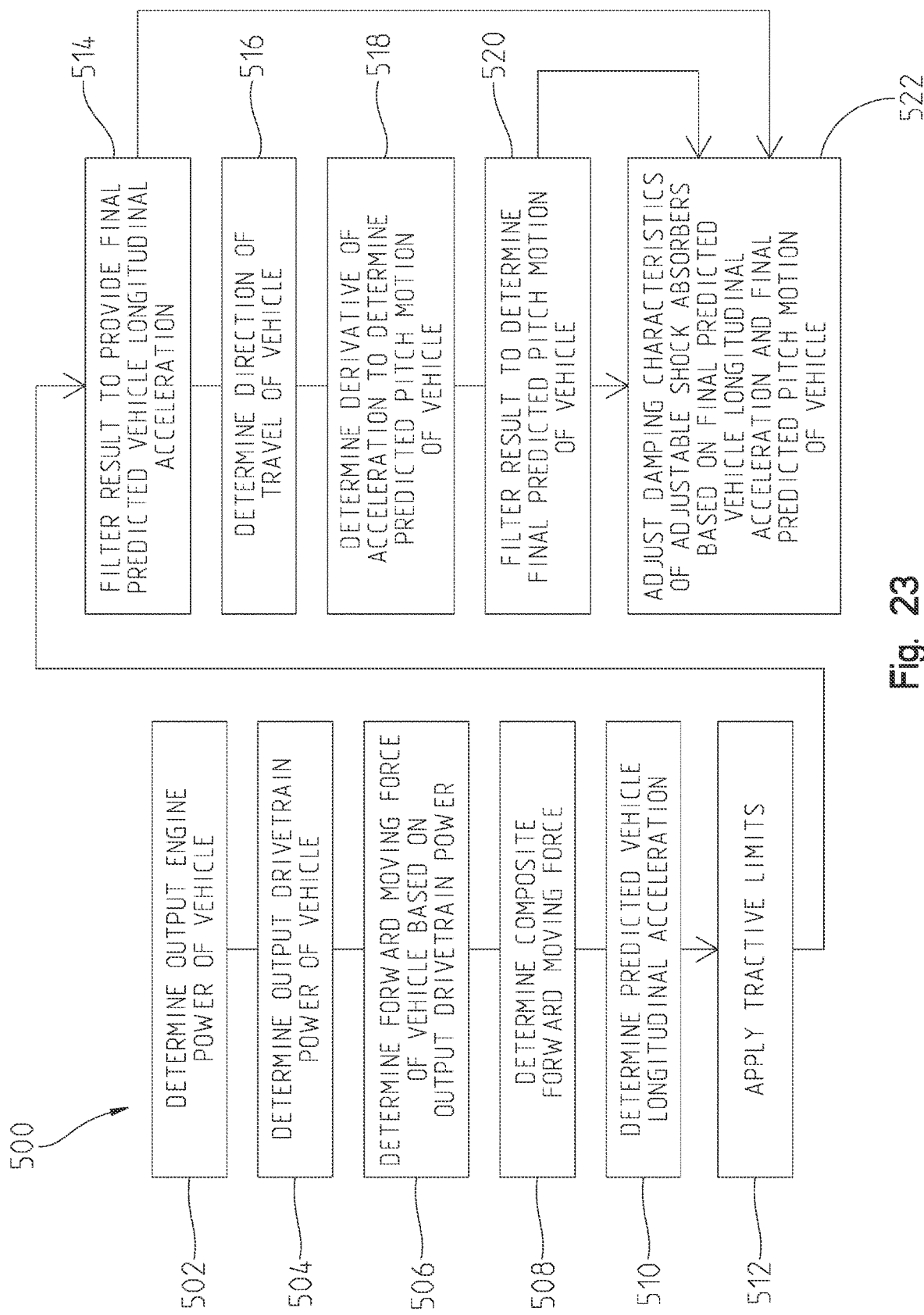
FIG. 23 illustrates an exemplary processing sequence of the shock damping logic of the exemplary control system of FIG. 19.

Referring to FIG. 23, an exemplary processing sequence 500 of electronic controller 50 for determining a predicted longitudinal acceleration 470 and a predicted vehicle pitch motion 472 of vehicle 200 is illustrated. A predicted power for prime mover 66, for example an internal combustion engine, is determined, as represented by block 502. In one example, an engine torque is provided from an engine controller 86 of vehicle 200. The engine torque is multiplied by a measured engine speed measured by engine speed sensor 172 to determine a power output of the engine. In another example, a throttle position is measured with throttle position sensor 116 and with a look-up table a corresponding engine torque is provided. Again, the engine torque is multiplied by an engine speed to obtain the output power of the engine. In embodiments, a value is measured by air pressure sensor 174 and the look-up table used to determine engine torque is multi-dimensional and includes torque values for different air pressures. In one example, air pressure sensor 174 measures an air pressure associated with an air intake of vehicle 200. In another example, air pressure is measured indirectly by location determiner 70 which determines a location of vehicle 200 and based on a look-up table provides an ambient air pressure reading for that elevation either actual from a third party service or typical based on a look-up table.

The determined engine power is then multiplied by an efficiency factor for the transmission of vehicle 200 to provide an output power for the drivetrain 210, as represented by block 504. In one example, the efficiency factor accounts for losses associated with the CVT transmission 232. The output power of the drivetrain 210 is converted to a forward moving force of vehicle 200 by dividing the output power of the drivetrain 210 by the vehicle speed measured by vehicle speed sensor 104, as represented by block 506.

A resultant or composite forward moving force is determined by subtracting from the determined forward moving force of block 506 a coast down force of vehicle 200 and a braking force, as represented by block 508. The coast down force of vehicle 200 is determined through a look-up table as a function of a measured vehicle speed measured by vehicle speed sensor 104. The braking force is determined through a look-up table of braking force as a function of a measured brake pressure measured by brake pressure sensor 114 or based on another model of the brake system.

A predicted vehicle longitudinal acceleration is determined by dividing the resultant forward moving force by the mass the vehicle, as represented by block 510. In one example, a standard mass of the vehicle is used. In another example, a mass of the vehicle is estimated based on the number of people riding in vehicle 200 which may be measured by load sensors 176 associated with the seats. In another example, a mass of the vehicle is estimated based on a standard mass of the vehicle, the number of people riding in vehicle 200 which may be measured by load sensors 176 associated with the seats, and an amount of cargo being carried which may be measured by load sensors 176 associated with the cargo carrying portion of vehicle 200, such as the cargo bed.

The predicted vehicle longitudinal acceleration is compared to tractive limits and set equal to the respective tractive limit (a negative tractive limit for a negative acceleration (deceleration) of vehicle 200 and a positive tractive limit for an acceleration of vehicle 200) if the predicted longitudinal acceleration exceeds the respective tractive limit, as represented by block 512. In embodiments, the tractive limit is based on one or more of surface friction, wheel normal forces, a load transfer model, or calculations at each individual wheel or axle.

In embodiments, the predicted vehicle acceleration from block 512 is filtered, as represented by block 514, to provide a smoother response. The filtering is helpful to account for the time difference between a determined engine output power and an acceleration of vehicle 200 and to account for different sampling rates of the various sensors.

The filtered predicted vehicle longitudinal acceleration is used to determine a predicted pitch motion of vehicle 200. A direction of travel of vehicle 200 is determined, as represented block 516. Once a direction of travel is known, forward or reverse, the effect of the acceleration on the front and rear of the vehicle may be considered. In one example, a gear selection sensor 118 is provided as part of the shiftable transmission 230 of vehicle 200 and provides an indication of whether the shiftable transmission 230 is in a forward gear or a reverse gear. In embodiments, rotation sensors are associated with one or more ground engaging members 102 and/or rotatable shafts of the driveline 210 downstream from the shiftable transmission 230 to provide an indication of a direction of travel of vehicle 200. In embodiments, BOTH an indication of an intended direction of travel and an actual direction of travel are used to verify the direction of travel to account for situations wherein the CVT is not engaged. When the indicator or the intended direction of travel and the indicator of the actual direction of travel match, the direction of travel is confirmed. Exemplary intended direction of travel indicators include a gear selection sensor. Exemplary actual direction of travel indicators include rotational sensors on a shaft of the driveline 210 or ground engaging members 102. In embodiments, tractive limits may be applied for each ground engaging member to distinguish between situations wherein a given ground engaging member has traction versus slippage, such as on ice or operating in two wheel drive versus all wheel drive. Further, in embodiments, the brake pressure is monitored to with a pressure sensor to provide greater accuracy on the level of brake pressure being applied by the operator. Both the tractive limits and monitoring of brake pressure provides a more accurate estimation of vehicle acceleration.

The predicted magnitude of the pitch motion is determined by taking the derivative of the filtered predicted vehicle longitudinal acceleration, as represented by block 518. This predicted vehicle pitch motion value is filtered to provide a smoother result over time, as represented by block 520. The predicted vehicle pitch motion 472 and/or the predicted vehicle longitudinal acceleration 470 are used by shock damping logic 450 to adjust the damping characteristics of left front electronically adjustable shock 290, right front electronically adjustable shock 292, left rear electronically adjustable shock 294, and right rear electronically adjustable shock 296, as represented by block 522.

In embodiments, the predicted vehicle longitudinal acceleration 470 and the predicted vehicle pitch motion 472 are used to alter the base damping of left front electronically adjustable shock 290, right front electronically adjustable shock 292, left rear electronically adjustable shock 294, and right rear electronically adjustable shock 296 which may be set by the selected vehicle mode (comfort, handling, rough trail, and other suitable modes). The damping characteristic tables for compression of each of left front electronically adjustable shock 290, right front electronically adjustable shock 292, left rear electronically adjustable shock 294, and right rear electronically adjustable shock 296 and the damping characteristics tables for rebound of each of left front electronically adjustable shock 290, right front electronically adjustable shock 292, left rear electronically adjustable shock 294, and right rear electronically adjustable shock 296 may be two-dimensional (one input, one output damping characteristic), three-dimensional (two inputs, one output damping characteristic), or x dimensional (x−1 inputs, one output damping characteristic).

In embodiments, the base damping tables (damping profile) are two-dimensional maps for each of left front electronically adjustable shock 290, right front electronically adjustable shock 292, left rear electronically adjustable shock 294, and right rear electronically adjustable shock 296 and each of compression damping characteristic and rebound characteristic (two inputs, one output). The two inputs are vehicle speed and predicted longitudinal vehicle acceleration and the output depending on the table is one of a desired compression damping and a desired rebound damping. In one example, vehicle speed is measured by vehicle speed sensor 104 and the predicted longitudinal vehicle acceleration is determined by processing sequence 500.

Figure 32:
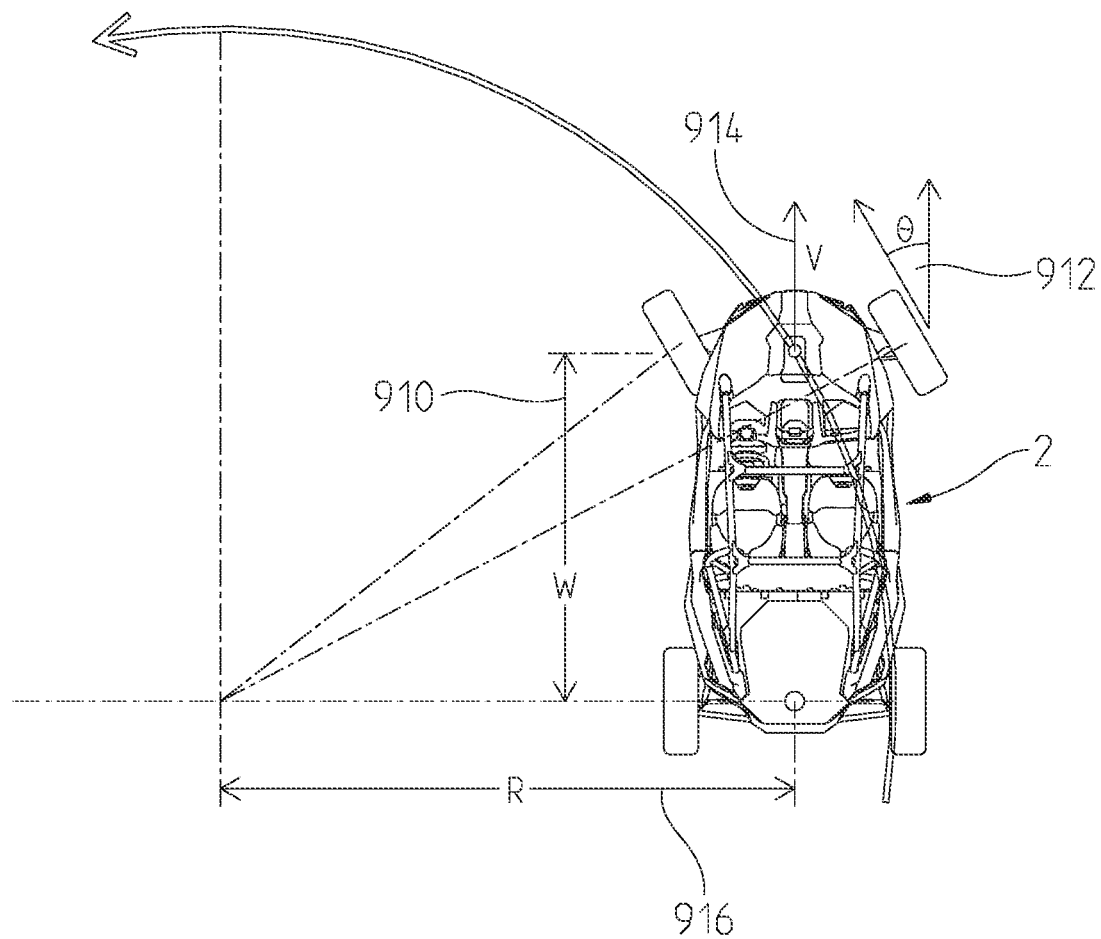
FIG. 32 illustrates an overhead representation of the exemplary side-by-side recreational vehicle of FIG. 4 turning to the left.

In some embodiments, the inertial magnitudes sensed by the IMU 108 are unintentionally distorted when vehicle 200 is accelerating in a forward direction or a reverse direction (i.e., longitudinally) and/or when vehicle 200 is cornering, as shown in FIG. 32. In embodiments, the inertial magnitudes sensed by IMU 108 are corrected by electronic controller 50 using the processing sequences 900, 920 illustrated in FIGS. 33 and 34, respectively. For example, the IMU 108 is used to sense a fast-acting angle, which is then corrected using the computed longitudinal and/or lateral accelerations, as described below.

Figure 33:
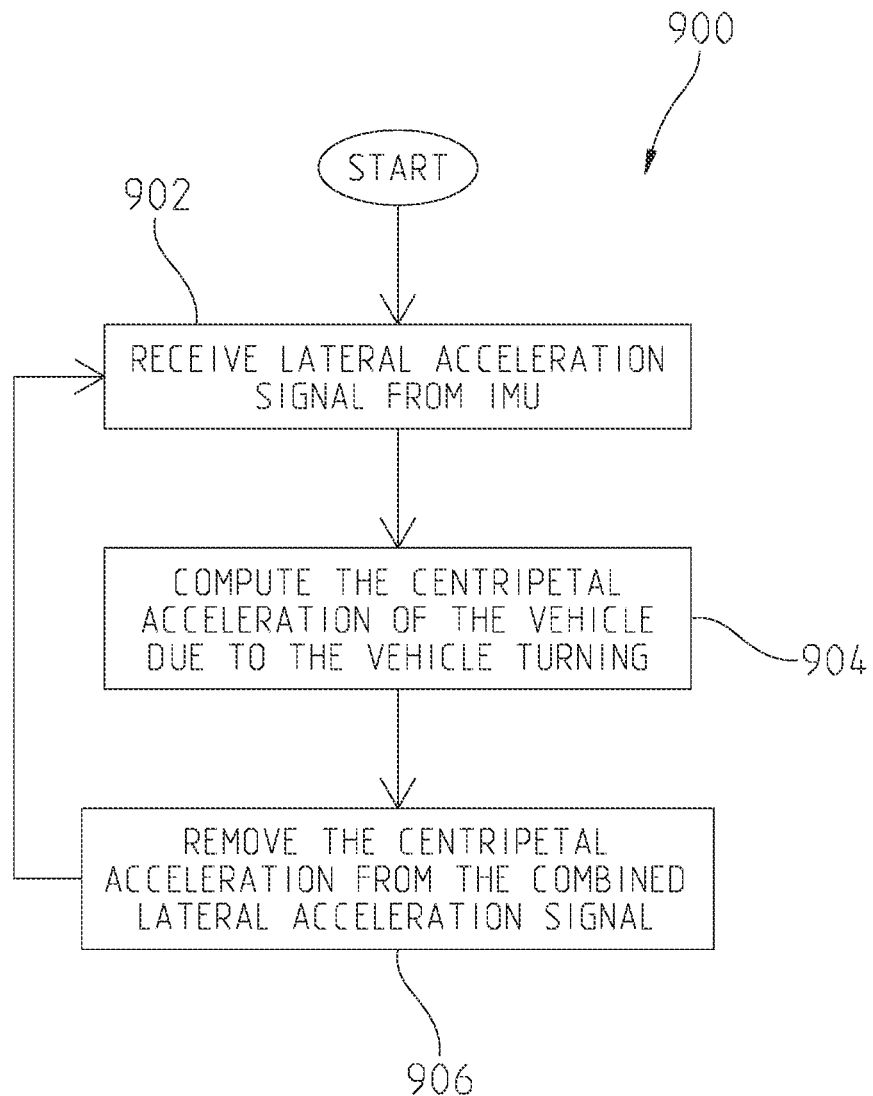
FIG. 33 illustrates a further exemplary processing sequence of the shock damping logic of the exemplary control system of FIG. 19.

Referring to FIG. 33, a processing sequence 900 for determining the lateral acceleration due to vehicle 200 being at a roll angle α greater than zero about axis 400 (see FIG. 5). A lateral acceleration signal from IMU 108 is received, as represented by block 902. In at least one example, the lateral acceleration signal includes the acceleration signal sensed along axis 402 (see FIG. 5) due to, for example, the vehicle being at an angle α. However, in certain examples, the lateral acceleration signal sensed by IMU 108 also includes an acceleration signal because vehicle 200 is cornering, as illustrated in FIG. 32. Accordingly, in certain embodiments, processing sequence 900 computes the lateral acceleration due to vehicle 200 cornering, as represented by block 904. The sensed lateral acceleration signal of IMU 108 may then be conditioned to determine the lateral acceleration due to the roll angle α by accounting for the lateral acceleration due to vehicle 200 cornering in the sensed lateral acceleration signal of the IMU 108. In embodiments, the lateral acceleration signals from the IMU 108 is smoothed (e.g., by applying a filter to the lateral acceleration signals) before performing the following computations.

In embodiments, to compute the lateral acceleration due to vehicle 200 cornering, electronic controller 50 receives a signal corresponding to the wheel base distance W 910 (see FIG. 32). In some instances, electronic controller 50 also receives the steering angle (e.g., a steering wheel angle) from steering sensor 106. Using the steering angle value, the turning angle θ 912 (see FIG. 32) of the front ground engaging members 14 may be determined by electronic controller 50 using, for example, a lookup table. In some examples, electronic controller 50 also receives the linear vehicle speed V 914 (see FIG. 32) from the wheel speed sensors associated with ground engaging members 14, the GPS sensor(s) 70, and/or the vehicle speed sensor 104. Using these inputs, the turning radius R 916 (see FIG. 32) of vehicle 200 may be determined according to the following formula R=W/sin(θ). Using the turning radius R 216, the angular velocity of vehicle 200 may be determined according to the following formula ω=V/R. And, using the angular velocity ω of vehicle 200, which is measured as the yaw rate via IMU 108, the centripetal acceleration "a" of vehicle 200 may be determined according to the following formula a=V*ω. In embodiments, the processing sequence 900 removes the centripetal acceleration from the lateral acceleration signal sensed by IMU 108, as represented by block 906, to determine the inertial magnitude due to the roll angle α. From the inertial magnitude due to the roll angle α, the roll angle α may be determined using a lookup table, a sensor fusion type of filter, and/or a feedback system filter. In embodiments, the absolute value of the lateral acceleration signal is computed before removing the centripetal acceleration from the lateral acceleration signal sensed by IMU 108. Additionally, or alternatively, the measurements from IMU 108 and vehicle speed sensor 104 are time aligned so that the difference between a vehicle speed acceleration "a" and the IMU 108 measured acceleration is the lateral acceleration due to the roll angle α 225.

Figure 34:
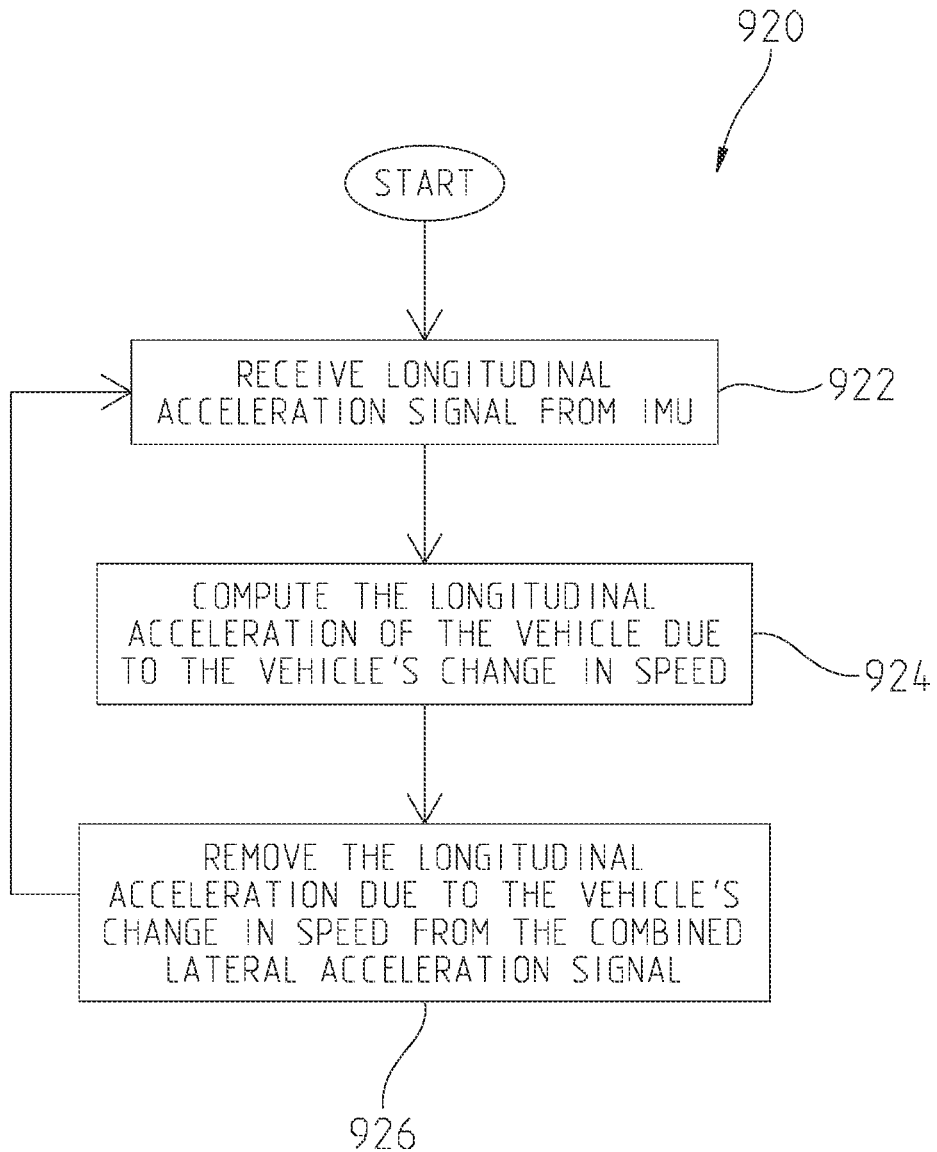
FIG. 34 illustrates a further yet exemplary processing sequence of the shock damping logic of the exemplary control system of FIG. 19.

Referring to FIG. 34, a processing sequence 920 to determine the longitudinal acceleration due to vehicle 200 at a pitch angle γ about axis 402 (see FIG. 5) is illustrated. In embodiments, processing sequence 920 includes receiving CVT clutch status and/or gear position to determine whether vehicle 200 is moving forwards or backwards. In embodiments, both an indication of an intended direction of travel and an actual direction of travel are used to verify the direction of travel to account for situations that the CVT is not engaged. In embodiments, a bidirectional vehicle speed sensor may be used to provide an indication of an intended direction of travel. When the indicator or the intended direction of travel and the indicator of the actual direction of travel match, the direction of travel is confirmed. In embodiments, the processing sequence 920 also includes receiving the longitudinal acceleration signal from IMU 108. In embodiments, the longitudinal acceleration signal includes the acceleration signal sensed along axis 400 (see FIG. 5) due to, for example, the vehicle being at an angle γ about axis 402 (see FIG. 5). However, in certain examples, the longitudinal acceleration signal sensed by IMU 108 also includes an acceleration signal because vehicle 200 is accelerating forward or backward along axis 400. Accordingly, in certain embodiments, the processing sequence 920 computes the longitudinal acceleration due to vehicle 200 changing longitudinal speed, as represented by block 924. The sensed longitudinal acceleration signal of IMU 108 may then be conditioned to determine the longitudinal acceleration due to the pitch angle γ about axis 402 (see FIG. 5) by accounting for the longitudinal acceleration due to vehicle 200 changing longitudinal speed in the sensed longitudinal acceleration signal of IMU 108. According to certain embodiments, the longitudinal acceleration signals from IMU 108 is smoothed (e.g., by applying a filter to the longitudinal acceleration signals) before performing the following computations. In some examples, to compute the longitudinal acceleration due to vehicle 200 accelerating forward or backward, electronic controller 50 receives measurements from the wheel speed sensors, the GPS sensor(s) 70, and/or the vehicle speed sensor 104. From these measurements, electronic controller 50 determines a speed and direction of vehicle 200, in at least some embodiments. Then, in certain examples, electronic controller 50 computes the derivative of the speed of vehicle 200 to determine whether vehicle 200 is accelerating forward or backward along axis 400. In some embodiments, processing sequence 920 then removes the acceleration from vehicle 200 accelerating forward or backward from the longitudinal acceleration signal sensed by IMU 108, as represented by block 926, to determine the inertial magnitude due to the pitch angle γ about axis 402 (see FIG. 5). From the inertial magnitude due to the pitch angle γ about axis 402 (see FIG. 5), the pitch angle γ about axis 402 (see FIG. 5) may be determined using a sensor fusion filter, a lookup table, or computing of basic trigonometry relationships. In embodiments, an absolute value of the derivative of the speed of vehicle 200 is computed by electronic controller 50 before removing the acceleration from vehicle 200 accelerating forward or backward from the longitudinal acceleration signal sensed by IMU 108. According to certain embodiments where the wheel speed sensors are used to determine the vehicle 200 speed, electronic controller 50 applies a rate limiter to reduce the calculated vehicle speed from the wheel speed sensor to account for any slip in the ground engaging members 14, such as when the vehicle is traveling over low friction surfaces such as ice.

Figure 24:
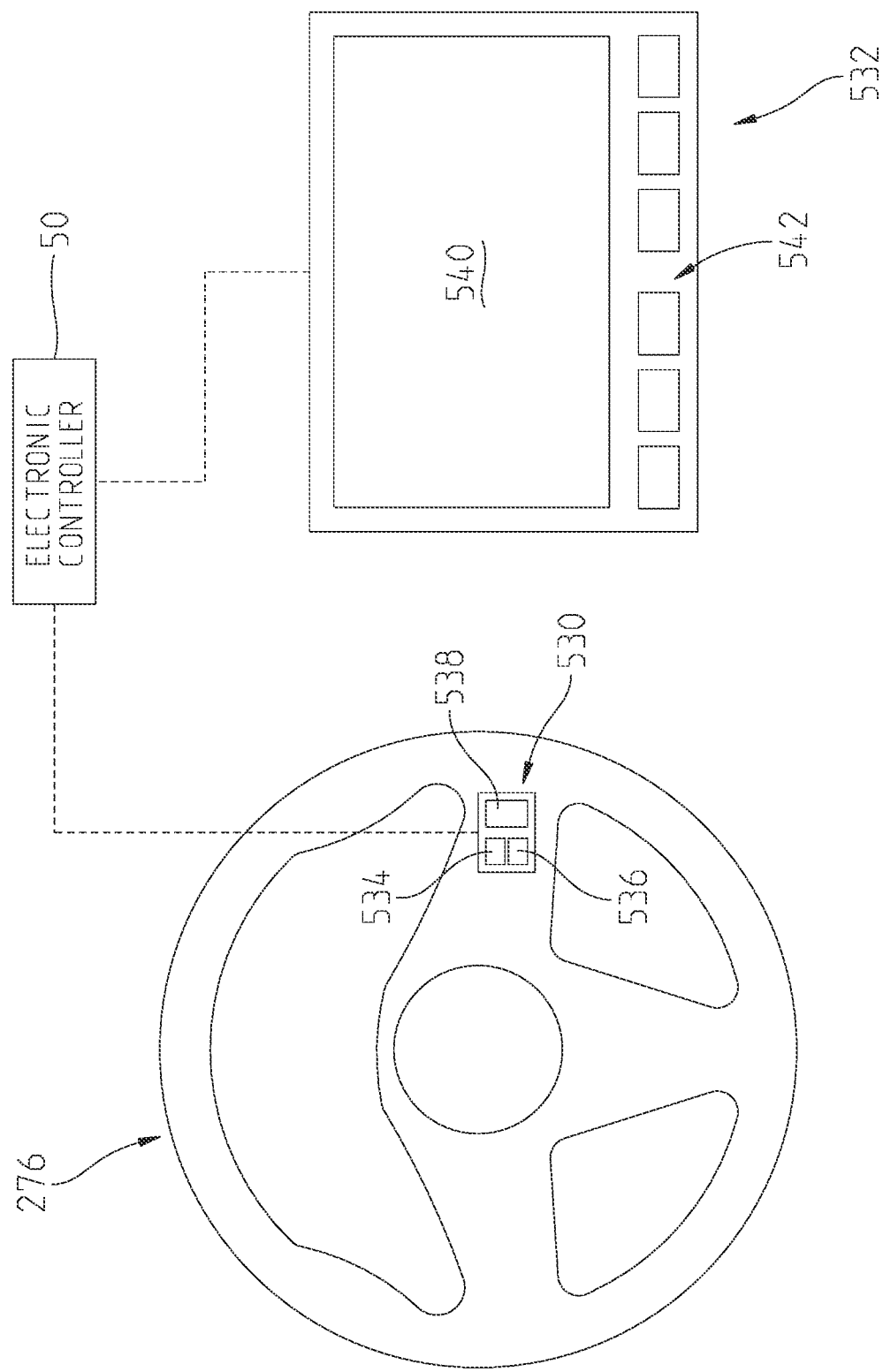
FIG. 24 illustrates exemplary portion of an operator interface of the exemplary side-by-side recreational vehicle of FIG. 4.

In embodiments, vehicle ride modes and hence base damping tables (damping profiles) are selected through operator interface 62. In embodiments, operator interface 62 is provided in a location easily accessible to the driver operating the vehicle 200. In embodiments, operator interface 62 is not a single interface, but a plurality of interfaces each positioned in locations easily accessible to the driver operating the vehicle 200. Referring to FIG. 24, a first operator interface 530 may be supported by steering wheel 276 of vehicle 200 and a second operator interface 532 positioned on a dash 277 of vehicle 200 (see FIG. 6).

Operator interface 62 includes user input devices to allow the driver or a passenger to manually adjust the damping characteristics of left front electronically adjustable shock 290, right front electronically adjustable shock 292, left rear electronically adjustable shock 294, and right rear electronically adjustable shock 296 during operation of vehicle 200 based on terrain conditions that are encountered or to select a preprogrammed active damping profile for left front electronically adjustable shock 290, right front electronically adjustable shock 292, left rear electronically adjustable shock 294, and right rear electronically adjustable shock 296 by selecting a ride mode. In embodiments, a selected ride mode (e.g., a selected driver mode) alters characteristics of suspension system 12 alone, such as the damping profile for left front electronically adjustable shock 290, right front electronically adjustable shock 292, left rear electronically adjustable shock 294, and right rear electronically adjustable shock 296. In embodiments, a selected ride mode alters characteristics of suspension system 12 and other vehicle systems, such as steering system 64, prime mover 66, transmission system 68, active descent control, and brake system 78.

Referring to FIG. 24, first operator interface 530 includes a mode up input 534, a mode down input 536, and a driver actuatable suspension adjust input 538. Each of inputs 534, 536, and 538 are buttons. The mode up input 534 and the mode down input 536 allow a driver to cycle through vehicle ride modes without removing their hands from steering wheel 276. In embodiments, each vehicle mode has a corresponding base damping profile for left front electronically adjustable shock 290, right front electronically adjustable shock 292, left rear electronically adjustable shock 294, and right rear electronically adjustable shock 296.

Driver actuatable suspension adjust input 538, in one example, requests that the compression damping of left front electronically adjustable shock 290, right front electronically adjustable shock 292, left rear electronically adjustable shock 294, and right rear electronically adjustable shock 296 are increased. For example, a depression of driver actuatable suspension adjust input 538 indicates to electronic controller 50 to increase the compression damping of left front electronically adjustable shock 290, right front electronically adjustable shock 292, left rear electronically adjustable shock 294, and right rear electronically adjustable shock 296 to a maximum value. Additionally, multiple actuations of driver actuatable suspension adjust input 538 provide additional instructions recognizable by electronic controller 50.

Figure 25:
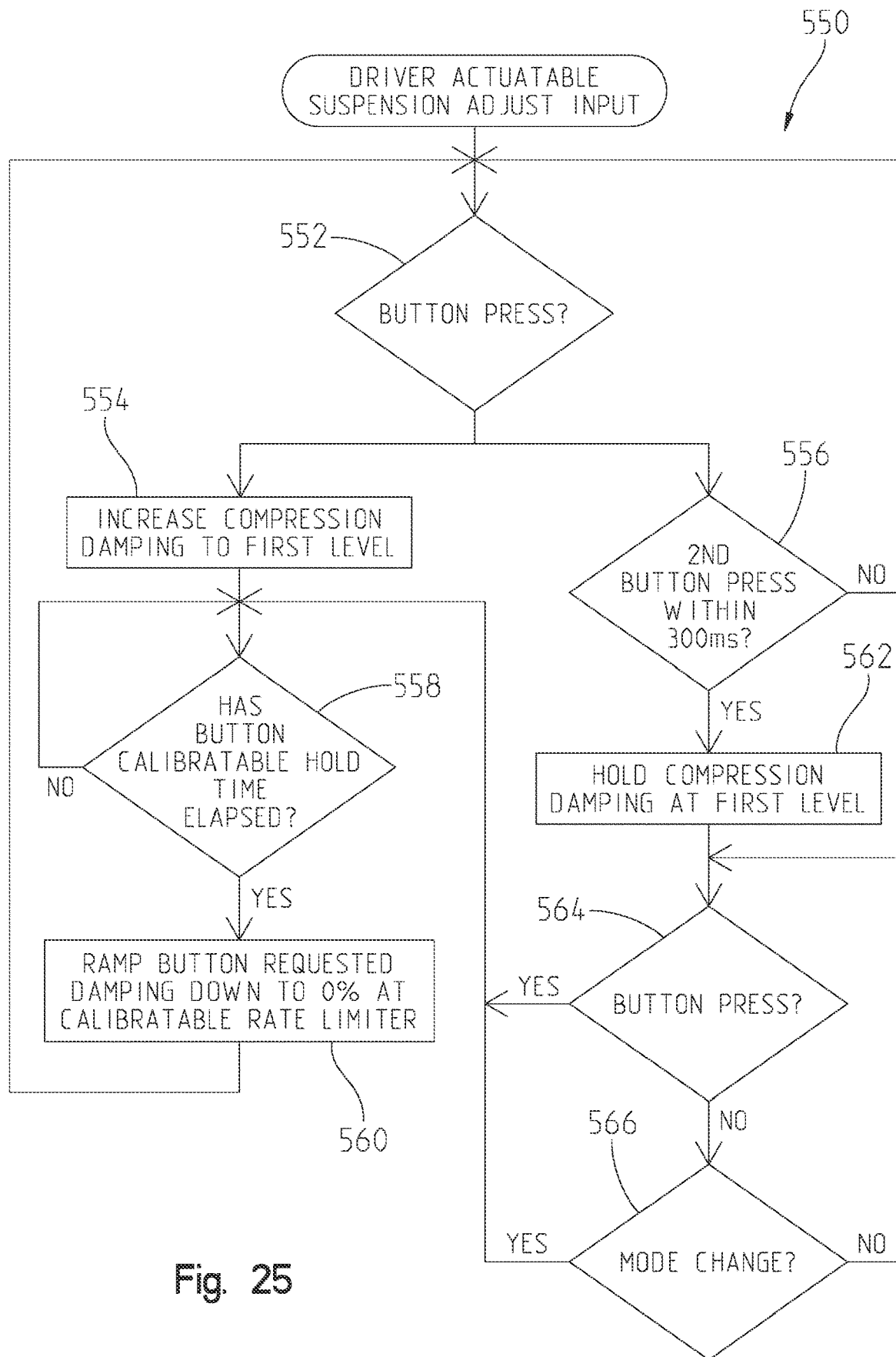
FIG. 25 illustrates another exemplary processing sequence of the shock damping logic of the exemplary control system of FIG. 19.

Referring to FIG. 25, a processing sequence 550 of electronic controller 50 is shown. In processing sequence 550, a depression of driver actuatable suspension input 538 is detected, as represented by block 552. Electronic controller 50 increases the compression damping of left front electronically adjustable shock 290, right front electronically adjustable shock 292, left rear electronically adjustable shock 294, and right rear electronically adjustable shock 296 to a first level, as represented by block 554. In one example the first level is 100%. Processing sequence 550 also monitors if a second depression of driver actuatable suspension input 538 has occurred within a first time window of the first depression, as represented by block 556. If not, processing sequence 550 determines if a first timer has expired, as represented by block 558. In embodiments, satisfaction of the condition in block 564 (e.g. single tap, double tap, . . . ) results in the compression damping of left front electronically adjustable shock 290, right front electronically adjustable shock 292, left rear electronically adjustable shock 294, and right rear electronically adjustable shock 296 being returned back to current baseline damping for left front electronically adjustable shock 290, right front electronically adjustable shock 292, left rear electronically adjustable shock 294, and right rear electronically adjustable shock 296 either immediately or through a ramp down, but in both cases without a calibrated hold time like in block 558. Once the first timer has expired, processing sequence 550 ramps the compression damping of left front electronically adjustable shock 290, right front electronically adjustable shock 292, left rear electronically adjustable shock 294, and right rear electronically adjustable shock 296 back to current baseline damping for left front electronically adjustable shock 290, right front electronically adjustable shock 292, left rear electronically adjustable shock 294, and right rear electronically adjustable shock 296, as represented by block 560. If a second depression of driver actuatable suspension input 538 has occurred within a first time window of the first depression, then processing sequence 550 holds the compression damping of left front electronically adjustable shock 290, right front electronically adjustable shock 292, left rear electronically adjustable shock 294, and right rear electronically adjustable shock 296 at the first level until a third depression of driver actuatable suspension input 538 is received, as represented by blocks 562 and 564 or a vehicle ride mode change has been received, as represented by block 566. Once one of a third depression of driver actuatable suspension input 538 (block 564) or a mode change (block 566) is received, processing sequence 550 returns the compression damping of left front electronically adjustable shock 290, right front electronically adjustable shock 292, left rear electronically adjustable shock 294, and right rear electronically adjustable shock 296 to current baseline damping for left front electronically adjustable shock 290, right front electronically adjustable shock 292, left rear electronically adjustable shock 294, and right rear electronically adjustable shock 296, as represented by blocks 558 and 560. An advantage, among others, of processing sequence 550 is the continued elevation of the compression damping of left front electronically adjustable shock 290, right front electronically adjustable shock 292, left rear electronically adjustable shock 294, and right rear electronically adjustable shock 296 for situations wherein the operator plans for vehicle 200 to be in rough terrain for an extended period of time. In embodiments, both a third depression and a fourth depression within a preset time window of the third depression are required for block 564.

Figure 26:
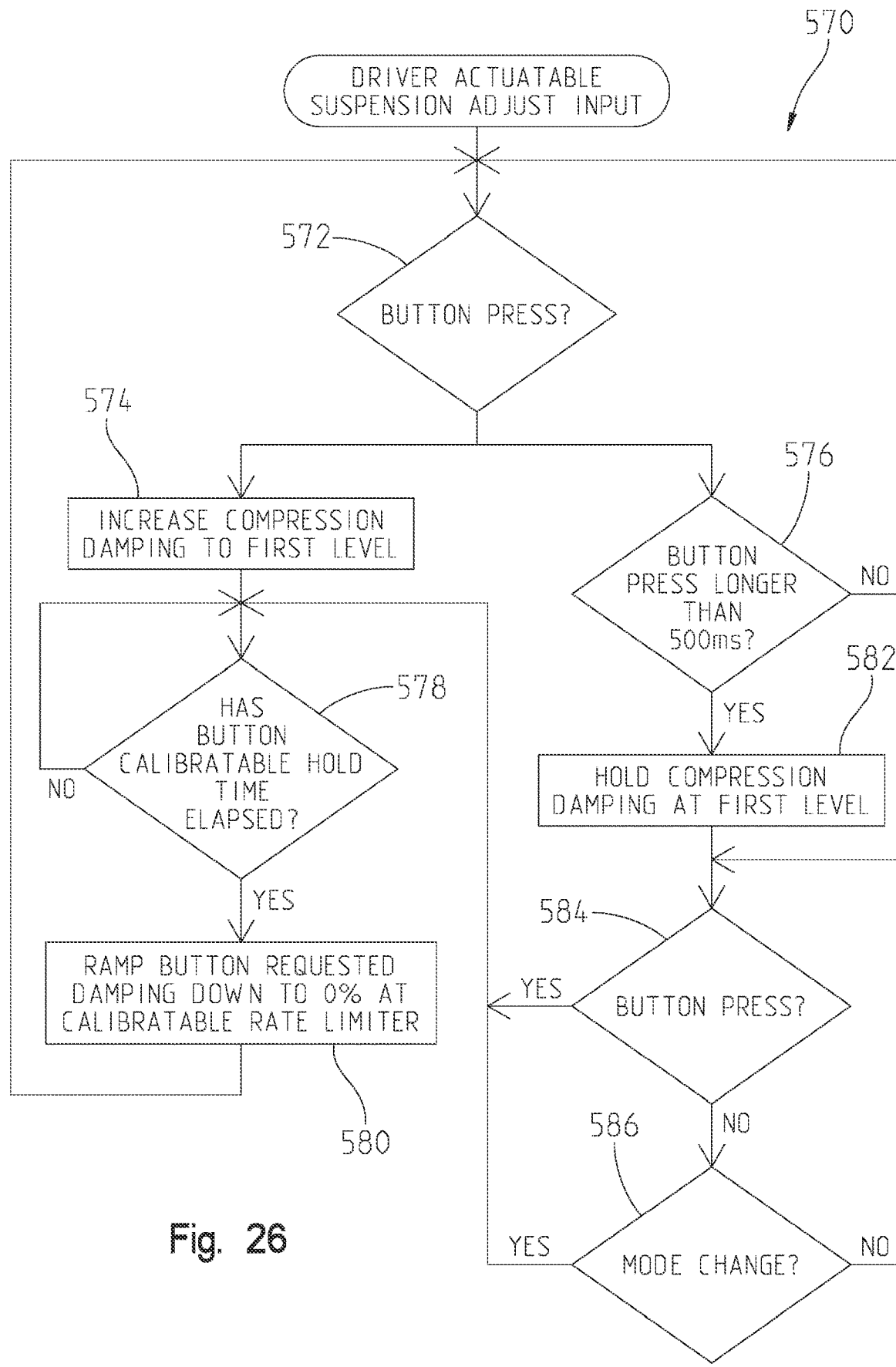
FIG. 26 illustrates yet another exemplary processing sequence of the shock damping logic of the exemplary control system of FIG. 19.

Referring to FIG. 26, another processing sequence 570 of electronic controller 50 is shown. In processing sequence 570, a depression of driver actuatable suspension input 538 is detected, as represented by block 572. Electronic controller 50 increases the compression damping of left front electronically adjustable shock 290, right front electronically adjustable shock 292, left rear electronically adjustable shock 294, and right rear electronically adjustable shock 296 to a first level, as represented by block 574. In one example the first level is 100%. Processing sequence 570 also monitors if driver actuatable suspension input 538 is being depressed for at least an extended first time window, as represented by block 576. If not, processing sequence 570 determines if a first timer has expired, as represented by block 578. Once the first timer has expired, processing sequence 570 ramps the compression damping of left front electronically adjustable shock 290, right front electronically adjustable shock 292, left rear electronically adjustable shock 294, and right rear electronically adjustable shock 296 back to current baseline damping for left front electronically adjustable shock 290, right front electronically adjustable shock 292, left rear electronically adjustable shock 294, and right rear electronically adjustable shock 296, as represented by block 580. If driver actuatable suspension input 538 is being depressed for at least an extended first time window, then processing sequence 570 holds the compression damping of left front electronically adjustable shock 290, right front electronically adjustable shock 292, left rear electronically adjustable shock 294, and right rear electronically adjustable shock 296 at the first level until a second depression of driver actuatable suspension input 538 is received, as represented by blocks 582 and 584 or a vehicle ride mode change has been received, as represented by block 586. Once one of a second depression of driver actuatable suspension input 538 (block 584) or a mode change (block 586) is received, processing sequence 570 returns the compression damping of left front electronically adjustable shock 290, right front electronically adjustable shock 292, left rear electronically adjustable shock 294, and right rear electronically adjustable shock 296 to current baseline damping for left front electronically adjustable shock 290, right front electronically adjustable shock 292, left rear electronically adjustable shock 294, and right rear electronically adjustable shock 296, as represented by blocks 578 and 580. In embodiments, satisfaction of the condition in block 584 (e.g. single tap, double tap, . . . ) results in the compression damping of left front electronically adjustable shock 290, right front electronically adjustable shock 292, left rear electronically adjustable shock 294, and right rear electronically adjustable shock 296 being returned back to current baseline damping for left front electronically adjustable shock 290, right front electronically adjustable shock 292, left rear electronically adjustable shock 294, and right rear electronically adjustable shock 296 either immediately or through a ramp down, but in both cases without a calibrated hold time like in block 578. An advantage, among others, of processing sequence 550 is the continued elevation of the compression damping of left front electronically adjustable shock 290, right front electronically adjustable shock 292, left rear electronically adjustable shock 294, and right rear electronically adjustable shock 296 for situations wherein the operator plans for vehicle 200 to be in rough terrain for an extended period of time. In embodiments, a depression of a preset extended first time window is required for block 584. In embodiments, both a third depression and a fourth depression within a preset time window of the third depression are required for block 584.

Figure 27:
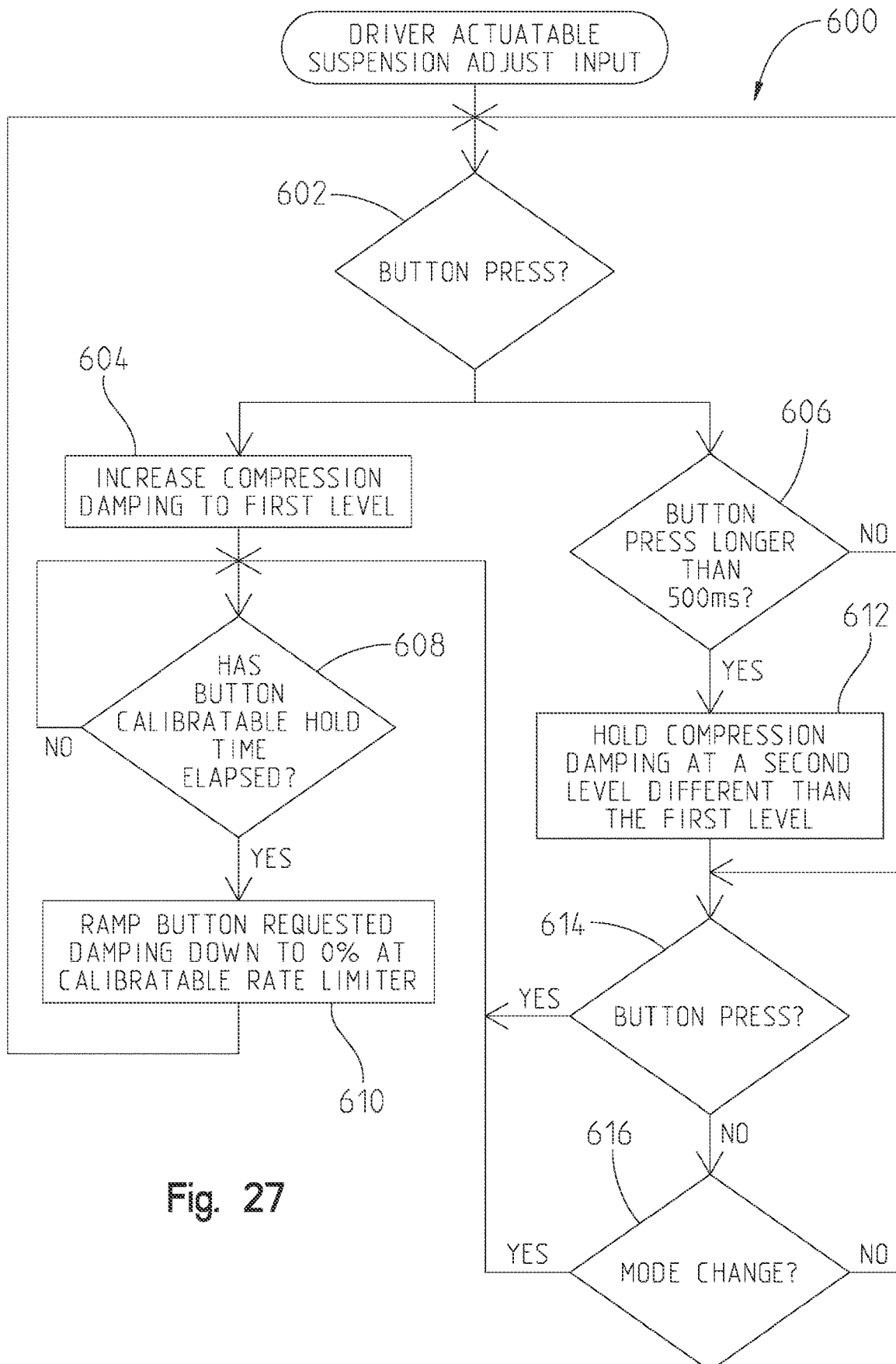
FIG. 27 illustrates still another exemplary processing sequence of the shock damping logic of the exemplary control system of FIG. 19.

Referring to FIG. 27, another processing sequence 600 of electronic controller 50 is shown. In processing sequence 600, a depression of driver actuatable suspension input 538 is detected, as represented by block 602. Electronic controller 50 increases the compression damping of left front electronically adjustable shock 290, right front electronically adjustable shock 292, left rear electronically adjustable shock 294, and right rear electronically adjustable shock 296 to a first level, as represented by block 604. In one example the first level is 100%. Processing sequence 600 also monitors if driver actuatable suspension input 538 is being depressed for at least an extended first time window, as represented by block 606 (or alternatively if a second depression of driver actuatable suspension input 538 occurs within a first time window). If not, processing sequence 600 determines if a first timer has expired, as represented by block 608. Once the first timer has expired, processing sequence 600 ramps the compression damping of left front electronically adjustable shock 290, right front electronically adjustable shock 292, left rear electronically adjustable shock 294, and right rear electronically adjustable shock 296 back to current baseline damping for left front electronically adjustable shock 290, right front electronically adjustable shock 292, left rear electronically adjustable shock 294, and right rear electronically adjustable shock 296, as represented by block 610. If driver actuatable suspension input 538 is being depressed for at least an extended first time window (alternatively a second depression is received within a preset time window), then processing sequence 600 holds the compression damping of left front electronically adjustable shock 290, right front electronically adjustable shock 292, left rear electronically adjustable shock 294, and right rear electronically adjustable shock 296 at a second level until a subsequent depression of driver actuatable suspension input 538 is received, as represented by blocks 612 and 614 or a vehicle ride mode change has been received, as represented by block 616. Once one of a second depression of driver actuatable suspension input 538 (block 614) or a mode change (block 616) is received, processing sequence 600 ramps the compression damping of left front electronically adjustable shock 290, right front electronically adjustable shock 292, left rear electronically adjustable shock 294, and right rear electronically adjustable shock 296 back to current baseline damping for left front electronically adjustable shock 290, right front electronically adjustable shock 292, left rear electronically adjustable shock 294, and right rear electronically adjustable shock 296, as represented by blocks 608 and 610. In embodiments, satisfaction of the condition in block 614 (e.g. single tap, double tap, . . . ) results in the compression damping of left front electronically adjustable shock 290, right front electronically adjustable shock 292, left rear electronically adjustable shock 294, and right rear electronically adjustable shock 296 being returned back to current baseline damping for left front electronically adjustable shock 290, right front electronically adjustable shock 292, left rear electronically adjustable shock 294, and right rear electronically adjustable shock 296 either immediately or through a ramp down, but in both cases without a calibrated hold time like in block 608. An advantage, among others, of processing sequence 600 is the operator can select between increased compression damping of left front electronically adjustable shock 290, right front electronically adjustable shock 292, left rear electronically adjustable shock 294, and right rear electronically adjustable shock 296 for situations wherein the operator plans for vehicle 200 to be in rough terrain for an extended period of time and a decreased compression damping of left front electronically adjustable shock 290, right front electronically adjustable shock 292, left rear electronically adjustable shock 294, and right rear electronically adjustable shock 296 for situations wherein the operator plans for vehicle 200 to be traversing chatter bumps (small bumps on trail). In other embodiments, an extended depression of driver actuatable suspension input 538 or a second depression of driver actuatable suspension input 538 may signal to electronic controller 50 other damping arrangements, such as increased damping (compression, rebound, or both) for only a portion of left front electronically adjustable shock 290, right front electronically adjustable shock 292, left rear electronically adjustable shock 294, and right rear electronically adjustable shock 296.

Returning to FIG. 24, when in response to input from driver actuatable suspension input 538, the damping profile is locked on, such as in response to block 556 in FIG. 25, block 576 in FIG. 26, block 606 in FIG. 27, an indicator is provided to the operator of the vehicle. Exemplary indicators include visual indicators, audio indicators, tactile indicators, or combinations thereof. In embodiments, the indicator includes a visual indicator displayed on screen 540. Referring to FIG. 55, a first exemplary screen 1500 displayed on display 540. Display screen 1500 provides various vehicle indicators to indicate the damping profile is locked on. Exemplary indicators include a locked icon 1502 in the upper left corner of the screen and a locked icon 1504 on the right side of the screen which covers a majority of a vertical extent of the display 540.

Figure 35:
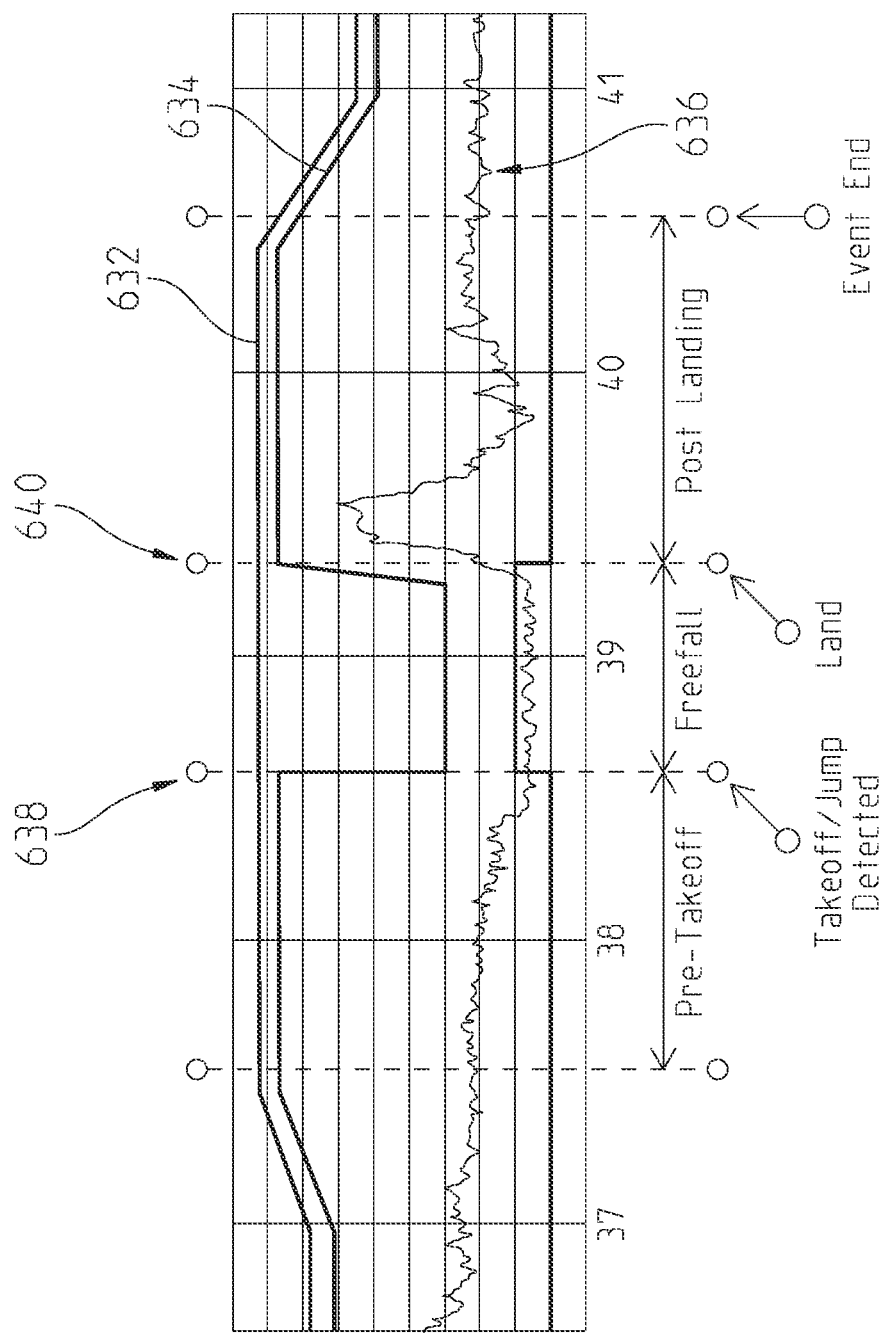
FIG. 35 illustrates a driver requested throttle input, engine output torque, and vertical acceleration of the exemplary side-by-side recreational vehicle of FIG. 4 over time for the processing sequence of FIG. 36.
Figure 36:
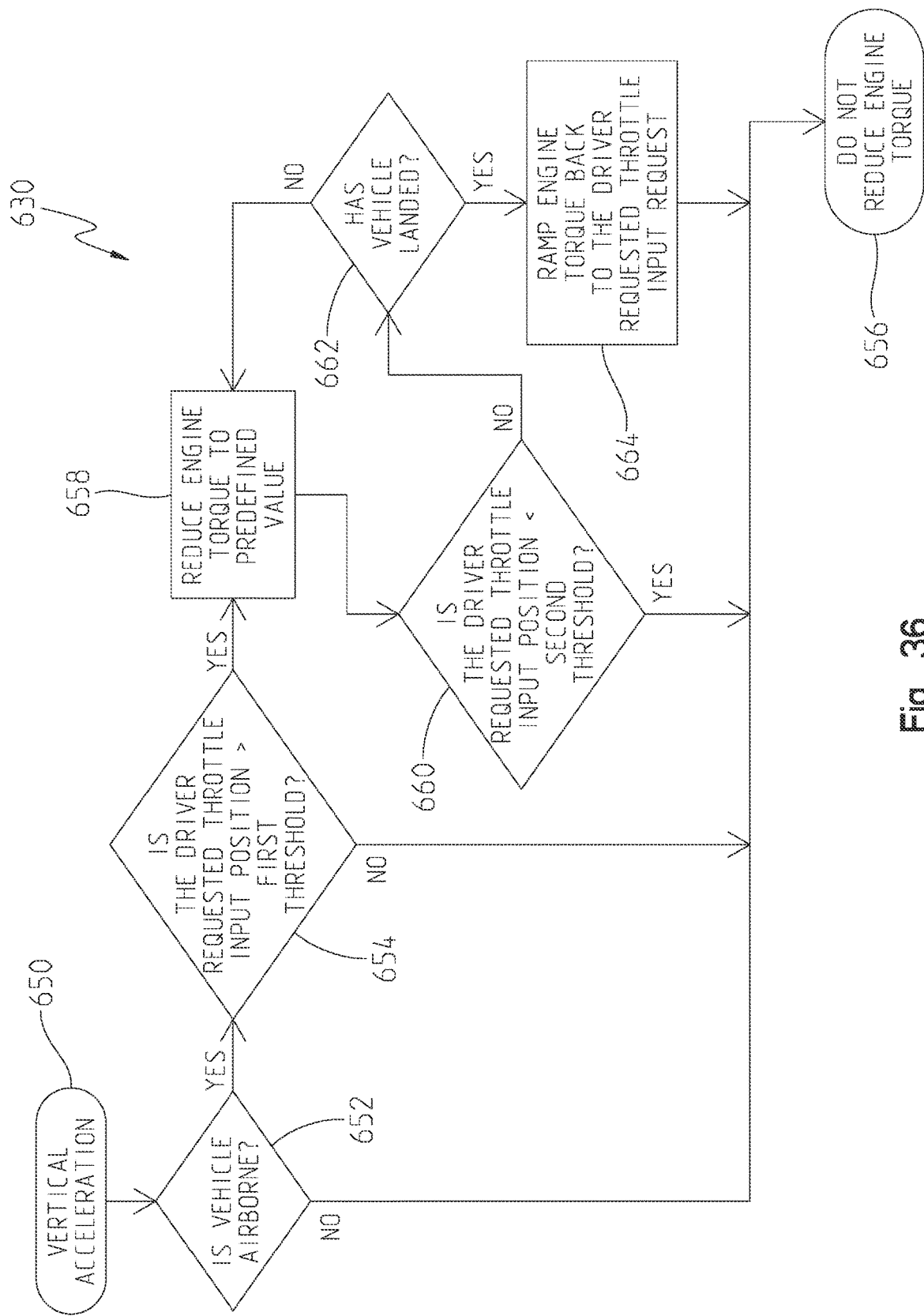
FIG. 36 illustrates a still further yet exemplary processing sequence of the shock damping logic of the exemplary control system of FIG. 19.

Referring to FIGS. 35 and 36, an exemplary processing sequence 630 is illustrated wherein electronic controller 50 alters the operation of a driveline system 210 of vehicle 200 from a driver requested operation based on vehicle 200 being airborne or based on a vertical acceleration value of vehicle 200 along axis 404 (see FIG. 5) or based on all vehicle accelerations along axes 400, 402, 404 (see FIG. 5). Referring to FIG. 35, a vertical acceleration 636 along axis 404 is monitored by IMU 108. By monitoring vertical acceleration 636, electronic controller 50 may determine when vehicle 200 is airborne (see reference line 638) and when vehicle 200 lands (see reference line 640). Additional methods of detecting when vehicle 200 is airborne and when vehicle 200 lands are provided in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM: U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

With processing sequence 630, a driver of vehicle 200 may maintain a depression of a throttle input, such as an acceleration pedal, up to and through a jump with vehicle 200. The driver requested engine torque, such as an actuation of a pedal or throttle input, is represented by line 632. Engine output torque is represented by line 634. The vertical acceleration of vehicle 200 is represented by line 636. Processing sequence 630, based on a detection of vehicle 200 being airborne reduces engine output torque to limit the amount that an output speed of prime mover 66 and a rotation speed of ground engaging members 102 are increased due to the lack of contact with the ground, as represented by line 634. Electronic controller 50 therefore reduces the throttle input to prime mover 66 even though the requested throttle input from the driver through the acceleration pedal remains at a higher level. Further, as electronic controller 50 detects vehicle 200 has landed, vehicle 200 is no longer in freefall, electronic controller 50 once again adjusts the throttle input to prime mover 66 back towards the driver requested throttle input, as represented by line 632. Thus, a driver of vehicle 200 may stay on the acceleration pedal throughout a jump while electronic controller 50 acts to protect the driveline 210 of vehicle 200 during the jump. In embodiments, the throttle input to prime mover 66 is adjusted by electronic controller 50 linearly, stepwise, non-linearly, or a combination thereof.

Referring to FIG. 36, an exemplary embodiment of processing sequence 630 is provided. Acceleration information along axis 404 is provided to electronic controller 50, as represented by block 650. Electronic controller 50 determines if vehicle 200 is airborne, as represented by block 652. Electronic controller 50, based on throttle position sensor 116, determines if the driver requested throttle input position exceeds a first threshold, as represented by block 654. In one example, the first threshold is 75% of the potential requested throttle input maximum. In another example, the first threshold is 90% of the potential requested throttle input maximum. If not, electronic controller 50 does not adjust the output torque of prime mover 66, as represented by block 656. In embodiments, the determination of whether the vehicle is airborne is based on all of the vertical, longitudinal, and lateral accelerations. In embodiments, the operator of the vehicle may select an input to disable the functionality of FIG. 36. In embodiments, the system reduces the torque to different values based on the amount of vehicle airborne time. In embodiments, the system ramps the engine torque back at different rates based on vehicle airborne time and throttle position.

If so, electronic controller 50 reduces the engine torque to a predefined value, as represented by block 658. The predefined value is lower than the engine torque corresponding to the driver requested throttle input value. Electronic controller 50 continues to monitor the driver requested throttle input. As represented by block 660, electronic controller 50 determines if the driver requested throttle input is less than a second threshold. In one example, the second threshold is equal to the first threshold. In another example, the second threshold is different than the first threshold. If the driver requested throttle input is less than the second threshold, indicating that the driver has backed off of the acceleration pedal, electronic controller 50 does not further reduce engine torque, as represented by block 656. Further, if the driver requested throttle input subsequently exceeds the second threshold, electronic controller 50 will provide the requested throttle input. An advantage, among others, is this permits the driver to get back into the engine torque while airborne, if needed.

Electronic controller 50 maintains the reduction in engine torque until a determination that vehicle 200 has landed, as represented by block 662. If electronic controller 50 determines that vehicle 200 has landed, electronic controller 50 returns the engine torque back to the level indicated by the driver requested throttle input, as represented by block 664.

Returning to FIG. 24, operator interface 532 includes a display 540 and a plurality of buttons 542. In embodiments, display 540 is a touch display and functions as both an input device 42 of operator interface 62 and an output device 44 of operator interface 62.

Figure 28:
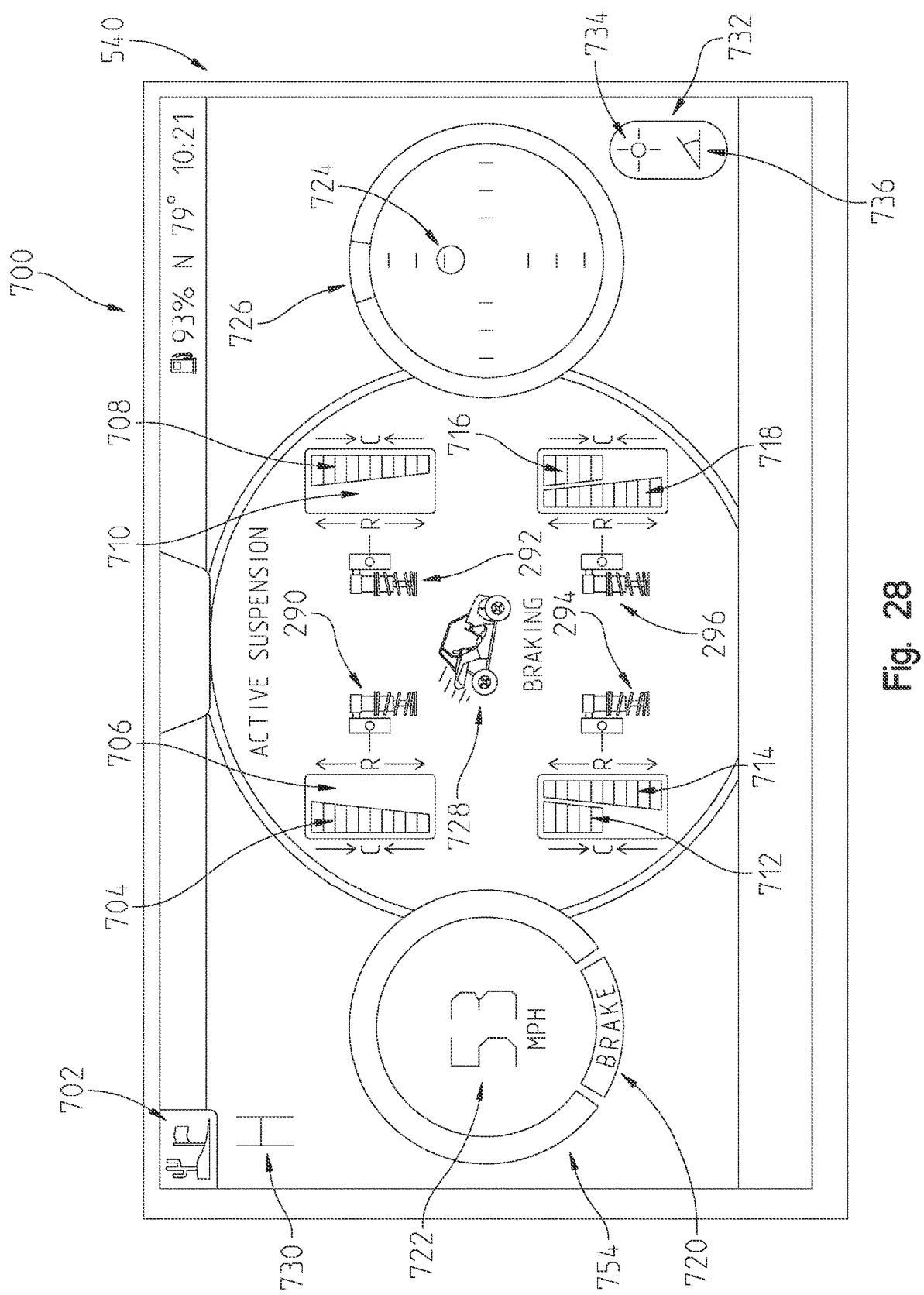
FIG. 28 illustrates an exemplary display screen of the operator interface of the exemplary side-by-side recreational vehicle of FIG. 4.
Figure 31:
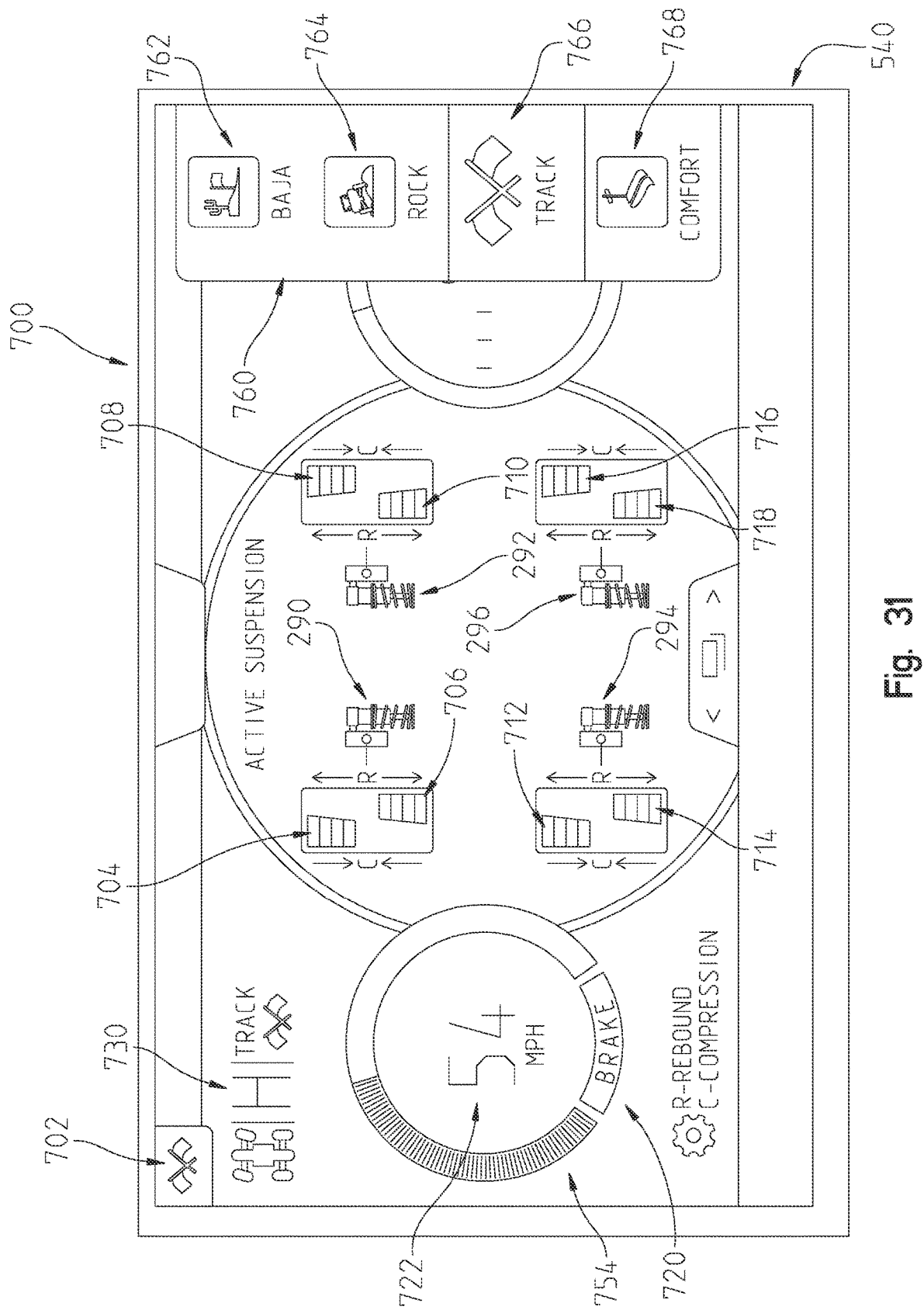
FIG. 31 illustrates an exemplary display screen of the operator interface of the exemplary side-by-side recreational vehicle of FIG. 4.

Referring to FIG. 28, a first exemplary screen 700 displayed on display 540. Display screen 540 provides various vehicle indicators including indicators regarding the suspension systems of vehicle 200. Exemplary indicators include a mode indicator 702 (illustrating a desert or baja mode) providing an indication of a selected driving mode selected by the operator of vehicle 200. Referring to FIG. 31, a sub-menu 760 is presented on display 540 listing a plurality of vehicle modes, illustratively a baja mode input 762, a rock crawler mode input 764, a track mode input 766, and a comfort mode input 768. Sub-menu 760 is displayed in response to an operator input. Exemplary operator inputs include actuation of a button, actuation of a switch, and a gesture on display 540 when display is a touch screen. Exemplary gestures include a swipe. Sub-menu 760 is removed from display 540 either in response to actuation of an operator input, a gesture on display 540, or a time period. In FIG. 31, track mode indicator 766 has been selected and mode indicator 702 has been updated to reflect the new vehicle mode.

Figure 30:
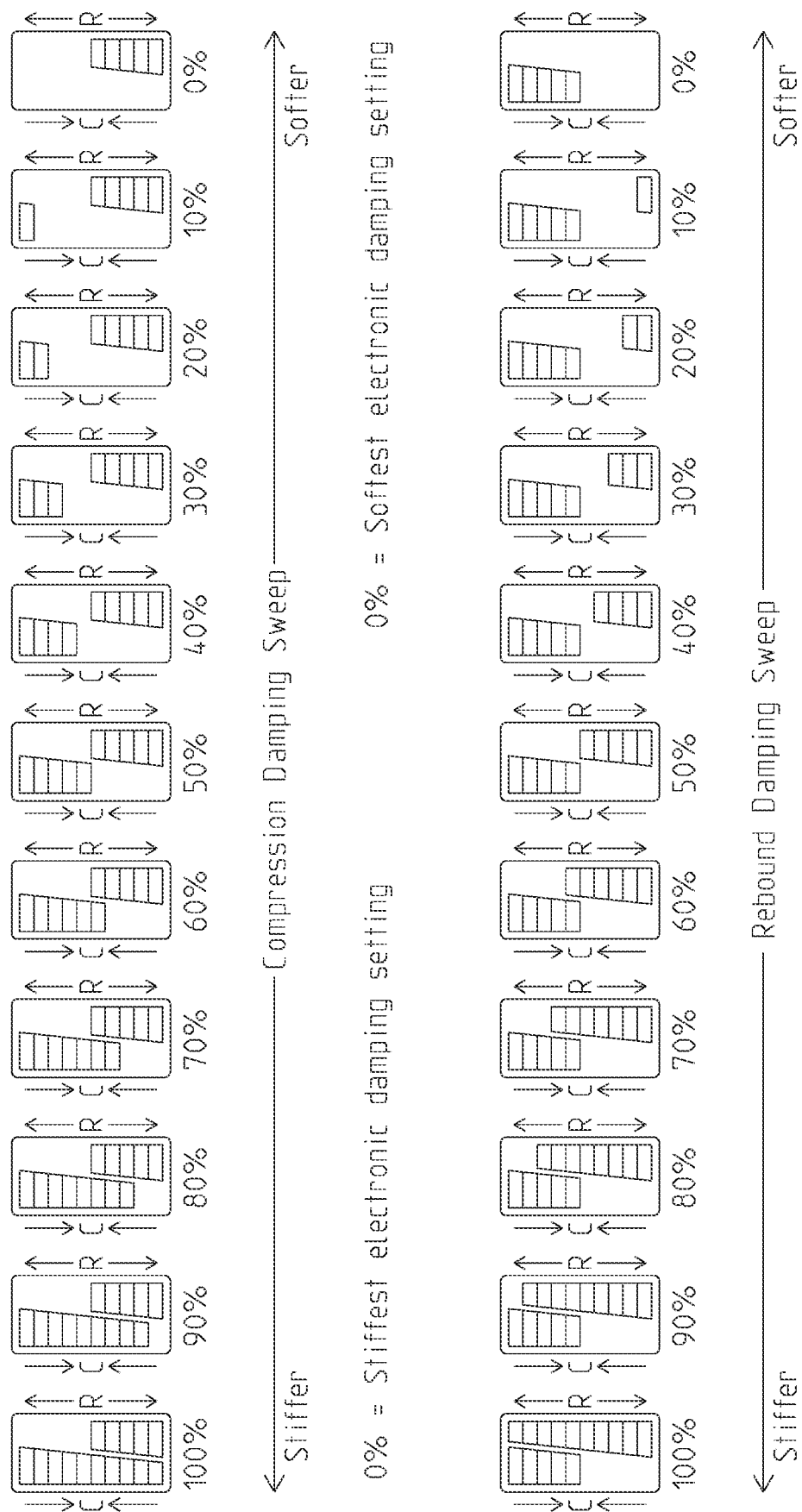
FIG. 30 illustrates exemplary display features of the operator interface to communicate damping settings of the adjustable shock absorbers of the exemplary side-by-side recreational vehicle of FIG. 4.

Returning to FIG. 28, display 700 includes a compression damping indicator 704 and a rebound damping indicator 706 both associated with left front electronically adjustable shock 290, a compression damping indicator 708 and a rebound damping indicator 710 both associated with right front electronically adjustable shock 292, a compression damping indicator 712 and a rebound damping indicator 714 both associated with left rear electronically adjustable shock 294, and a compression damping indicator 716 and a rebound damping indicator 718 both associated with right rear electronically adjustable shock 296. FIG. 30 illustrates exemplary indicators for 10% increments of compression damping and exemplary indicators for 10% increments of rebound damping for left front electronically adjustable shock 290 and left rear electronically adjustable shock 294 (the indicators for right front electronically adjustable shock 292 and right rear electronically adjustable shock 296 are mirror images).

Display 700 further includes a brake switch indicator 720 which has a first color when vehicle 200 is braking and a second color when vehicle 200 is not braking. A vehicle speed indicator 722 and a throttle input position indicator 754 (currently throttle input is not depressed) are provided. A gear setting indicator 730 is further provided.

Additionally, g-ball indicator 724 and a steering angle indicator 726 are provided. G-ball indicator 724 indicates the resultant acceleration on vehicle 200 (longitudinal and lateral acceleration). Steering angle indicator 726 indicates a position of the operator steering input device, such as a steering wheel. When steering angle indicator 726 is centered vertically the steering input device is positioned to drive vehicle 200 straight.

Figure 29:
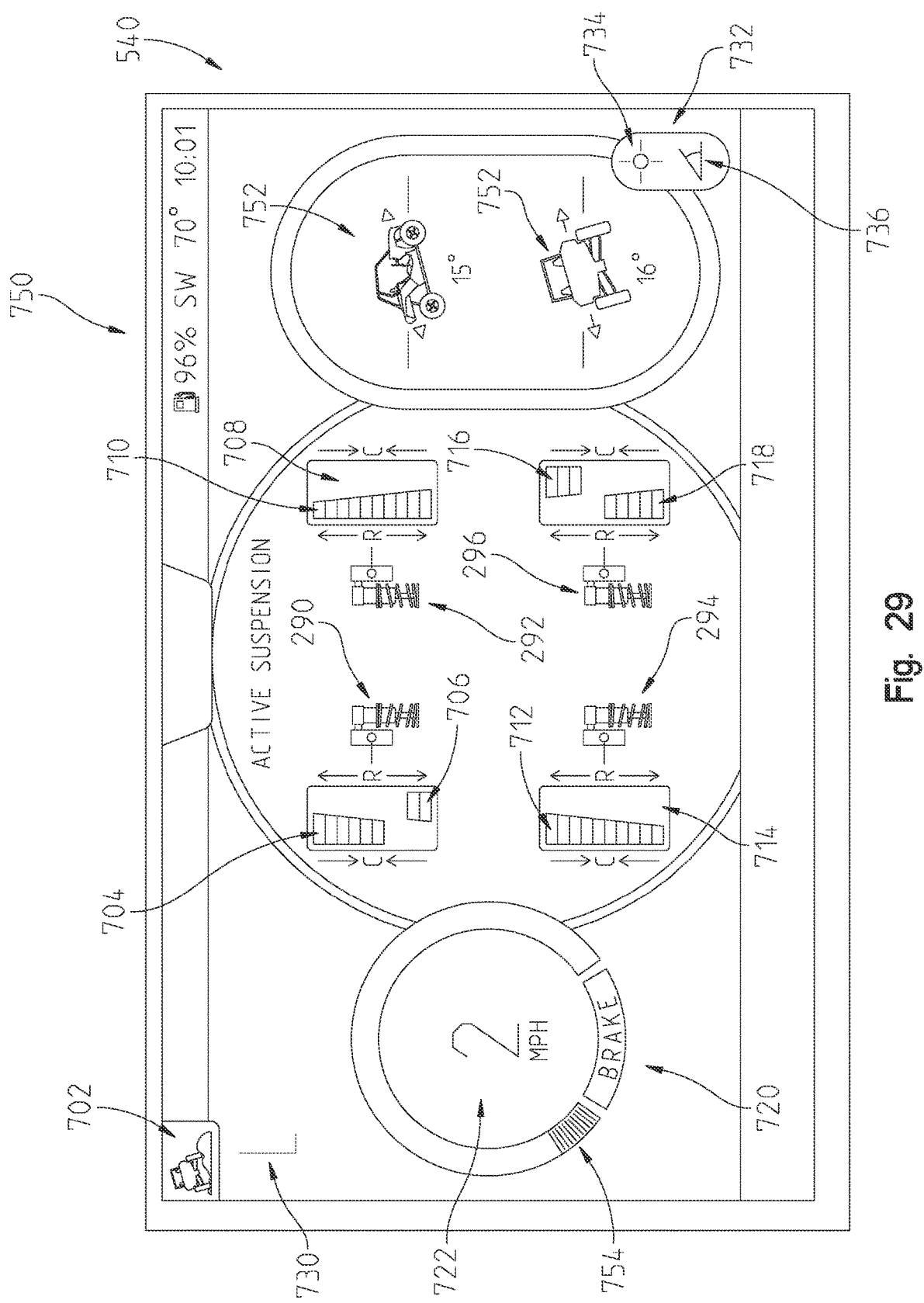
FIG. 29 illustrates an exemplary display screen of the operator interface of the exemplary side-by-side recreational vehicle of FIG. 4.

An operator selector input 732 is provided on display 700. A g-ball input 734 and an angle input are provided. FIG. 28 illustrates display 700 corresponding to the selection of g-ball input 734. FIG. 29 illustrates display 750 corresponding to the selection of angle input 736. Display 750 includes a pitch angle indicator 752 and a roll angle indicator 752.

In embodiments, display screen 700 and/or display screen 750 also provide an indication of a temperature of left front electronically adjustable shock 290, right front electronically adjustable shock 292, left rear electronically adjustable shock 294, and right rear electronically adjustable shock 296 measured by a temperature sensor associated with each of left front electronically adjustable shock 290, right front electronically adjustable shock 292, left rear electronically adjustable shock 294, and right rear electronically adjustable shock 296. FOX 3.0 Live Valve X2 shocks include sensors for monitoring the temperature of the valve of the shock. Electronic controller receives information regarding the temperature of each of left front electronically adjustable shock 290, right front electronically adjustable shock 292, left rear electronically adjustable shock 294, and right rear electronically adjustable shock 296 and provides an indication thereof on display screen 700 and/or display screen 750 or other output device of operator interface 62. The display feedback could be color gradient (blue when cold—orange when warm—red when hot—flashing red when overheated), or a simple on/off indicator that turns on when the shock temperature exceeds a threshold. The color gradient may be a color of the icons used for each of left front electronically adjustable shock 290, right front electronically adjustable shock 292, left rear electronically adjustable shock 294, and right rear electronically adjustable shock 296 on display screen 700 and/or display screen 750.

As mentioned herein, the suspension systems may further include one or more torsion couplers which couple individual suspension systems together such that a movement of a first suspension system influences the movement of a second suspension system. As shown in FIGS. 14 and 15, a front sway bay 280 couples the two front suspensions 262 together and, in particular, sway bar 280 is coupled to lower A-arms 266 of front suspensions 262 through links 282. Similarly, as shown in FIGS. 16 and 17, a rear sway bay 320 couples the two rear suspensions 264 together and, in particular, sway bar 320 is coupled to trailing arms 300 of rear suspensions 264 through links 322.

Figure 10:
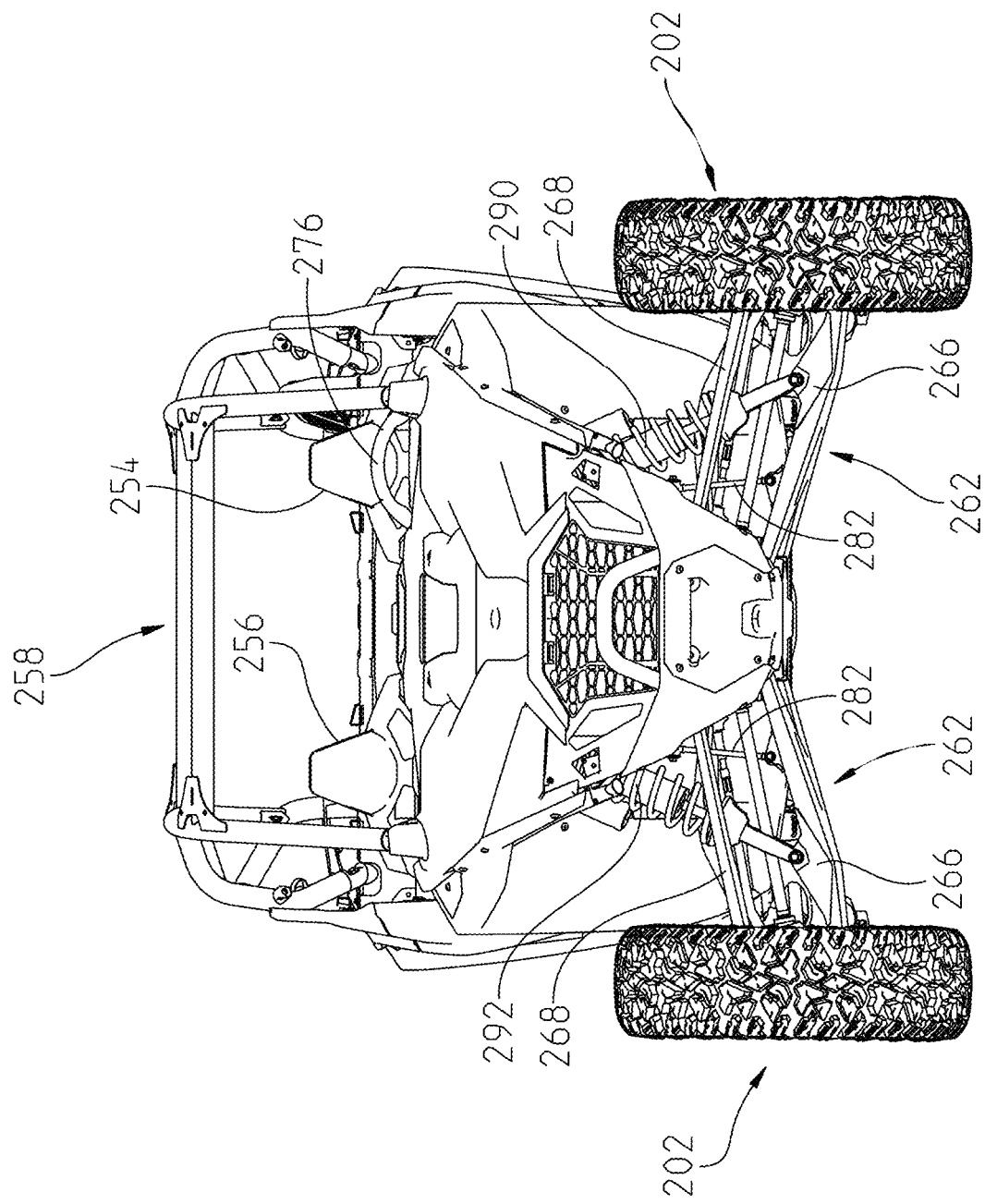
FIG. 10 illustrates a front view of the exemplary side-by-side recreational vehicle of FIG. 4.
Figure 10A:
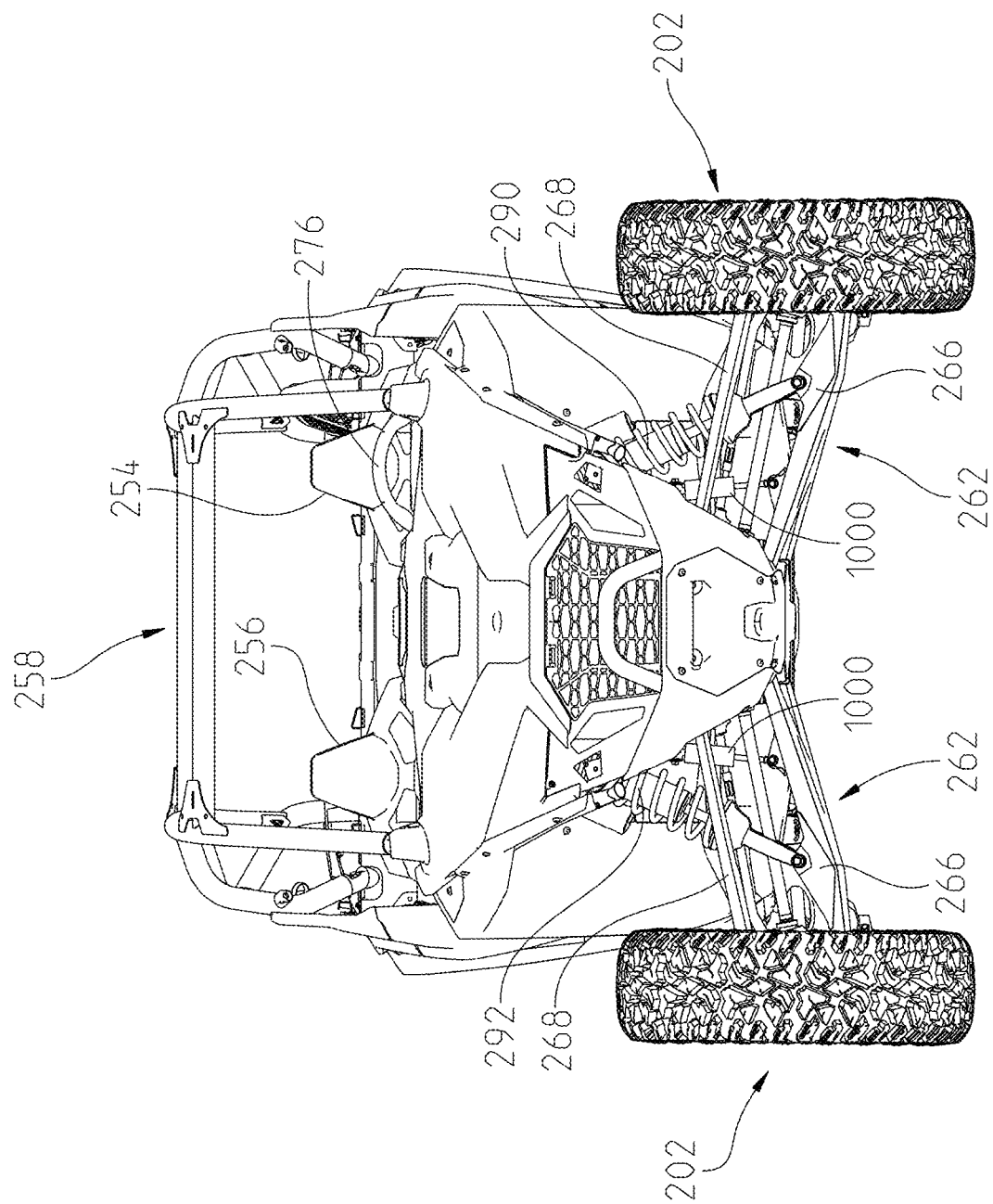
FIG. 10A illustrates a front view of the exemplary side-by-side recreational vehicle of FIG. 4.
Figure 37:
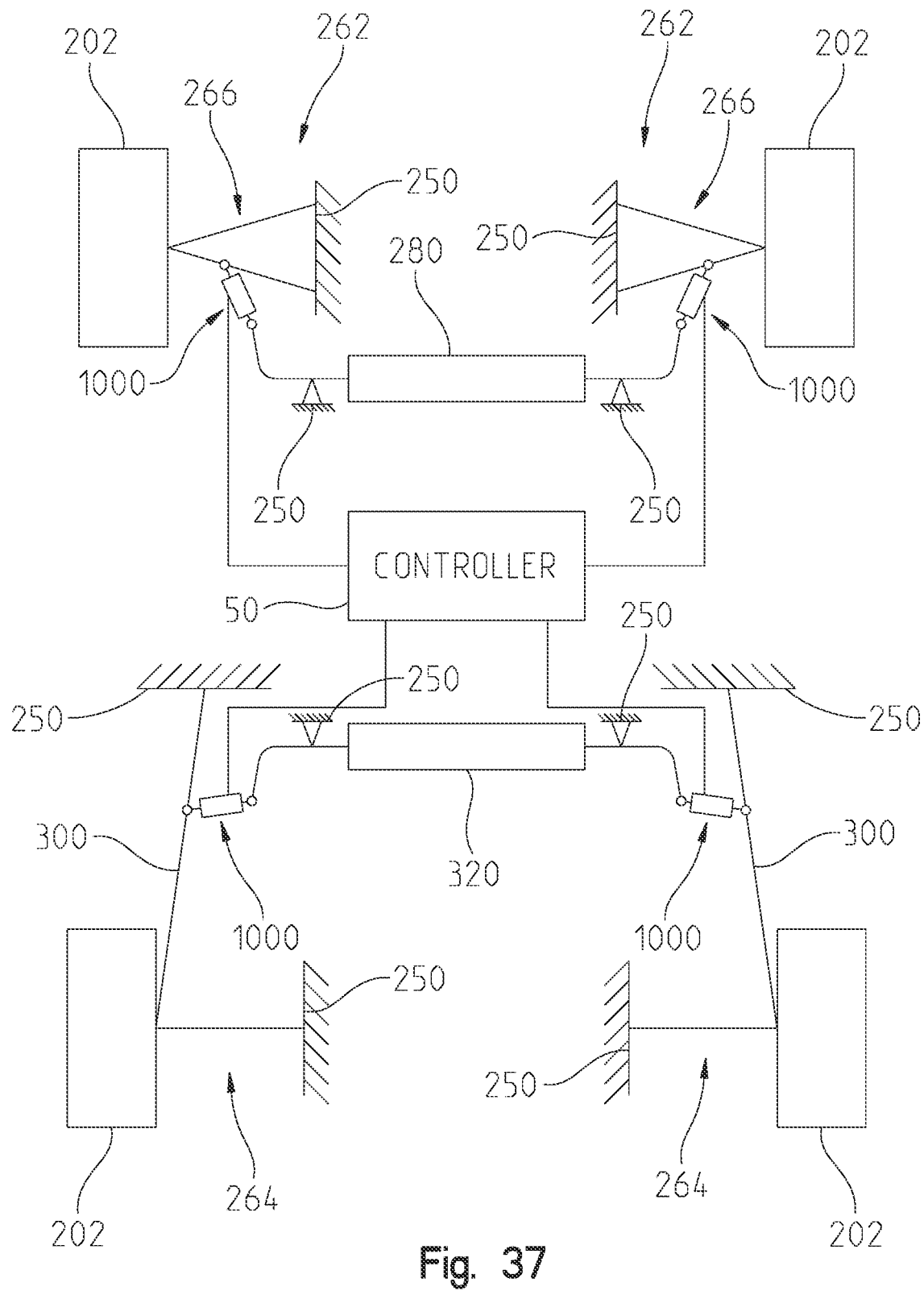
FIG. 37 illustrates a representative view of portions of the suspension of the exemplary side-by-side recreational vehicle of FIG. 4 including adjustable shock absorbers coupling the sway bars to the respective front and rear suspensions.

Referring to FIG. 37, a representation of vehicle 200 is provided. Links 282 are replaced with adjustable shock absorbers 1000 which couple sway bar 280 to front suspensions 262 (See FIG. 10A) and links 322 are replaced with adjustable shock absorbers 1000 which couple sway bar 320 to rear suspensions 264. As shown in FIG. 37, each of links 282 and links 322 are replaced. In embodiments, only one of links 282 is replaced with an adjustable shock absorber 1000 and the other one of links 282 remains such that sway bar 280 is coupled to one of the front suspensions 262 through an adjustable shock absorber 1000 and to the other one of the front suspensions 262 through a link 282. In embodiments, only one of links 322 is replaced with an adjustable shock absorber 1000 and the other one of links 322 remains such that sway bar 320 is coupled to one of the rear suspensions 264 through an adjustable shock absorber 1000 and to the other one of the rear suspensions 264 through a link 322.

Adjustable shock absorbers 1000 are operatively coupled to electronic controller 50. By adjusting one or more characteristics of the respective adjustable shock absorber 1000, electronic controller 50 is able to adjust the amount of coupling between the respective front suspensions 262 and the respective rear suspensions 264. In embodiments, electronic controller 50 may control a characteristic of the adjustable shock absorber 1000 to cause adjustable shock absorber 1000 to act similar to a link 282 or link 322 in one scenario or to permit relative movement between the respective front suspension 262 or rear suspension 264 and the corresponding sway bar 280 or 320 in another scenario.

In embodiments, only one of links 282 is replaced with an adjustable shock absorber 1000 and the other one of links 282 remains such that sway bar 280 is coupled to one of the front suspensions 262 through an adjustable shock absorber 1000 and to the other one of the front suspensions 262 through a link 282. In embodiments, only one of links 322 is replaced with an adjustable shock absorber 1000 and the other one of links 322 remains such that sway bar 320 is coupled to one of the rear suspensions 264 through an adjustable shock absorber 1000 and to the other one of the rear suspensions 264 through a link 322. An exemplary adjustable shock absorber 1000 is a Magnetorheological Fluid (MR) shock having a fluid whose viscosity may be changed by applying a magnetic field which may be controlled by electronic controller 50. Exemplary MR shocks are available from XeelTech located at Number 181, 6771 St. Anton im Montafon, Austria. With exemplary MR shocks, the shock may be locked in any position of stroke. In embodiments, when the vehicle is traveling straight, the MR shock is left open and damping is controlled based on selected mode and vehicle speed and when the vehicle is cornering, the MR shock is locked out at different positions (based on mode and/or other inputs) to achieve different roll stiffnesses for the adjustable suspensions. Further, the control of the MR shock for sway bar 280 and the MR for sway bar 320 are independently controlled to provide different cornering characteristics. In embodiments, the MR shock has a position sensor on it that provides an indication to electronic controller 50 of the position of travel of the shock, thereby providing an indication of a length of the shock, and/or a velocity sensor providing a rate of change of the length of the shock.

Exemplary controls for electronic controller 50 with an MR shock as part of one or both of front sway bar system and rear sway bar system include the following.

a. Calibrate base (straight-line/Not locked) damping versus vehicle speed and ride and handling mode.
b. Change lock profile—The lock profile (transition from unlocked to locked state of MR shock) may be different for different conditions. In one example, it immediately stops. In another example, it ramps up slowly. The ramp slope or change may change versus vehicle speed, vehicle mode, turn aggressiveness, and/or other characteristics.
c. Lock the link (MR shock) to an exact position in travel. In one example, the position sensor on the MR shock is used to indicate the position in the travel of the shock.
d. Mimic a spring—As the MR shock moves through the travel, add damping force like a spring-rate.
e. End of stroke damping/component protection—Add damping at the ends of shocks stroke to prevent top out (rebound) and bottom out (compression) for shock durability and noise & vibrations.
f. Lock to the MR shocks at different positions front/rear to create mode bias.
g. Lock MR shocks to different positions based on vehicle loading.

Figure 38:
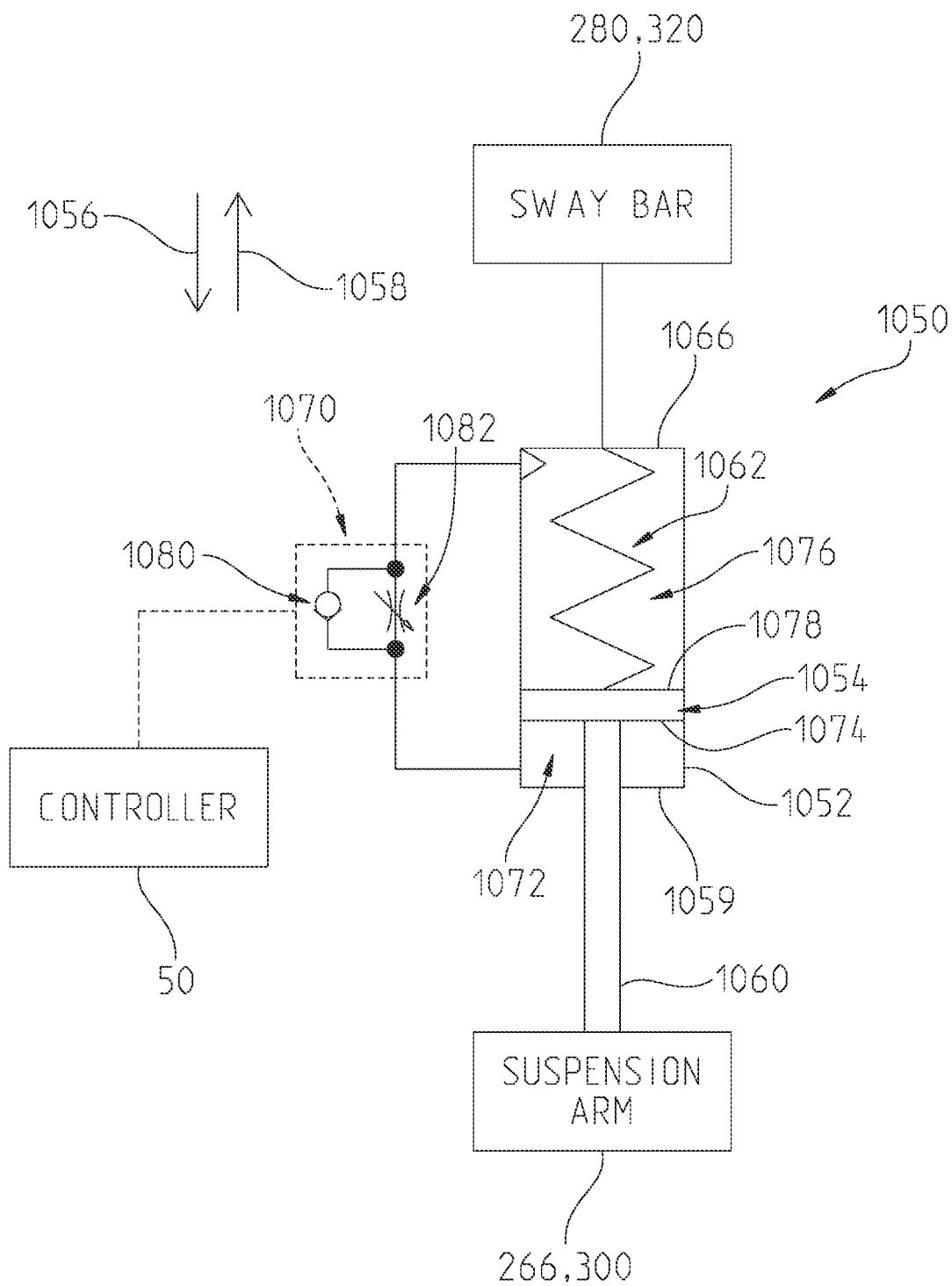
FIG. 38 illustrates an exemplary adjustable shock absorber.

Referring to FIG. 38, an adjustable shock 1050 which may be implemented as adjustable shock absorber 1000 is illustrated. Adjustable shock absorber 1050 includes a body 1052 having an interior in which a piston 1054 reciprocates in directions 1056, 1058. In the illustrated embodiment, a shaft 1060 moveable with piston 1054 extends from an end 1059 of body 1052 and is moveably coupled to a suspension arm 266 or 300. Another end 1066 of body 1052 is moveably coupled to sway bar 280 or 320. A spring 1062 is included internal to body 1052 to bias piston 1054 in direction 1056 by being compressed between end 1066 of body 1052 and piston 1054. In other embodiments, spring 1062 is positioned external to body 1052 and compressed between spring stops (not shown); one spring stop carried by body 1052 and another spring stop carried by shaft 1060. In embodiments, adjustable shock absorber 1050 does not include an associated spring. An advantage, among others, of including an associated spring is the biasing of shock absorber 1050 towards an extended position. In embodiments, the effect of the spring may be accomplished through gas pressure.

An external fluid control circuit 1070 is provided. Fluid control circuit 1070 controls the movement of fluid from an interior chamber 1072 in the interior of body 1052 and bounded by a first side 1074 of piston 1054 and an interior chamber 1076 in the interior of body 1052 and bounded by a second side 1078 of piston.

The ability and the degree of the ease of movement of fluid between chambers 1072 and 1076 along with the stiffness of spring 1062 control the stiffness of adjustable shock absorber 1050. External fluid control circuit 1070 includes a rebound bypass bleed valve 1080 that permits fluid to move from chamber 1072 to chamber 1076; thereby allowing piston 1054 to move in direction 1056 resulting in a length of adjustable shock absorber 1050 extending.

External fluid control circuit 1070 further includes an electronically controlled compression bypass valve 1082. Valve 1082 controls the movement of fluid from chamber 1076 to chamber 1072; thereby allowing piston 1054 to move in direction 1058 and shorten a length of adjustable shock absorber 1050. In embodiments, valve 1082 is an on/off valve and when in the on setting permits the movement of fluid from chamber 1076 to chamber 1072 and in the off setting prevents the movement of fluid from chamber 1076 to chamber 1072. Electronic controller 50 controls the operation of valve 1082 between the on setting and the off setting. In the off setting of valve 1082, adjustable shock absorber 1050 acts similar to a solid link, such as link 282 or link 322. In embodiments, valve 1082 has a variable opening having an off setting (closed) and a plurality of on settings (partial open to full open), each having a different rate of permitted fluid flow from chamber 1076 to chamber 1072. Electronic controller 50 controls the operation of valve 1082 including the permitted flow rate in the various on settings and between the various on settings and the off setting.

With the arrangement shown in FIG. 38, adjustable shock absorber 1050 when electronically controlled compression bypass valve 1082 is closed the position of piston 1054 is locked in compression (the adjustable shock absorber 1050 performs generally like a rigid link by limiting movement of piston 1054 in direction 1058) and the position of piston 1054 is free to move in rebound (movement of piston 1054 in direction 1056). When electronically controlled compression bypass valve 1082 is open the position of piston 1054 is free to move in compression (movement of piston 1054 in direction 1058) and the position of piston 1054 is free to move in rebound (movement of piston 1054 in direction 1056).

Figure 39:
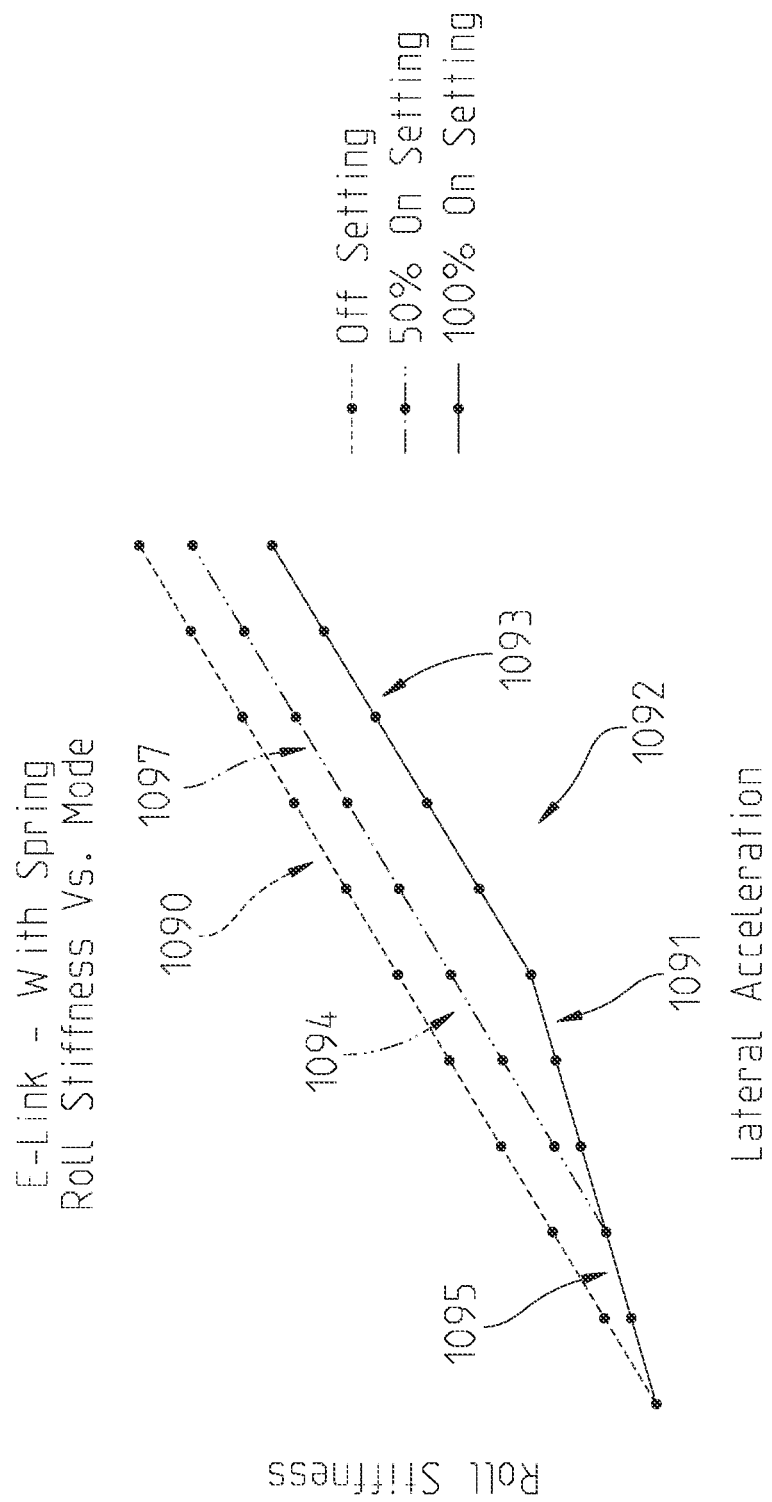
FIG. 39 illustrates representative curves comparing various electronic configurations of the adjustable shock absorber of FIG. 38.

Referring to FIG. 39, the roll stiffness of sway bar 280 based on a lateral acceleration of vehicle 200 is illustrated. Curve 1090 represents when electronically controlled compression bypass valve 1082 is closed (off setting). In this setting, adjustable shock absorber 1050 acts like a solid link and the slope of line 1090 is determined based on a stiffness of sway bar 280 itself. Generally, a higher slope corresponds to a larger diameter sway bar. Curve 1092 represents when electronically controlled compression bypass valve 1082 is fully open (100% on setting). In this setting, the roll stiffness of sway bar 280 is not linear. Rather, curve 1092 includes a first linear segment 1091 having a slope based on the spring constant of spring 1062 (alternatively gas pressure) and a second linear segment 1093 having a slope based on a stiffness of sway bar 280 itself. Curve 1094 represents when electronically controlled compression bypass valve 1082 is locked at 50% of travel. In this setting, the roll stiffness of sway bar 280 is not linear. Rather, curve 1094 includes a first linear segment 1095 having a slope based on the spring constant of spring 1062 (alternatively gas pressure) and a second linear segment 1097 having a slope based on a stiffness of sway bar 280 itself and the fluid pressure of adjustable shock absorber 1050. An advantage, among others, of including a spring 1062 is the ability to tailor the desired roll attributes of vehicle 200. Similar curves would be provided for sway bar 320.

Figure 40:
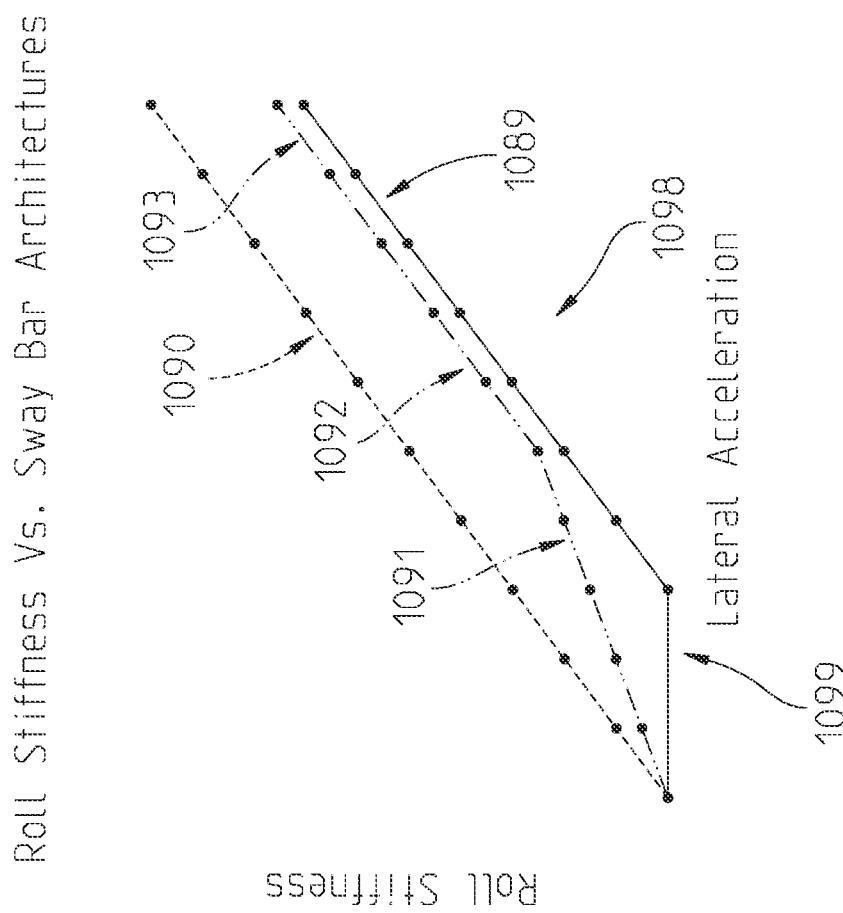
FIG. 40 illustrates representative curves comparing various configurations of the adjustable shock absorber of FIG. 38.

Referring to FIG. 40, another comparison of the roll stiffness of sway bar 280 based on a lateral acceleration of vehicle 200 is illustrated. Curves 1090 and 1092 from FIG. 39 are reproduced. Further, a curve 1098 is illustrated which illustrates the roll stiffness of sway bar 280 when spring 1062 is not included in adjustable shock absorber 1050. Curve 1098, like curve 1092 corresponds to electronically controlled compression bypass valve 1082 being full open (100% open setting) and includes a first linear segment 1099 and a second linear segment 1089. First linear segment 1099 of curve 1098 has a slope based on the adjustable shock absorber 1050 being compressed with electronically controlled compression bypass valve 1082 fully open and a second linear segment 1089 has a slope based on a stiffness of sway bar 280 itself.

In embodiments, an individual adjustable shock absorber 1050 is provided for the connection of each of lower a-arms 266 of front suspensions 262 to sway bar 280 and for the connection of each of trailing arms 300 of rear suspensions 264 to sway bar 320. In embodiments, an individual adjustable shock absorber 1050 is provided for the connection of only one of lower a-arms 266 to sway bar 280 and the connection of the other lower a-arm 266 to sway bar 280 is through a solid link. In embodiments, an individual adjustable shock absorber 1050 is provided for the connection of only one of trailing arms 300 of rear suspension 264 to sway bar 320 and the connection of the other trailing arm 300 to sway bar 320 is through a solid link.

Figure 43:
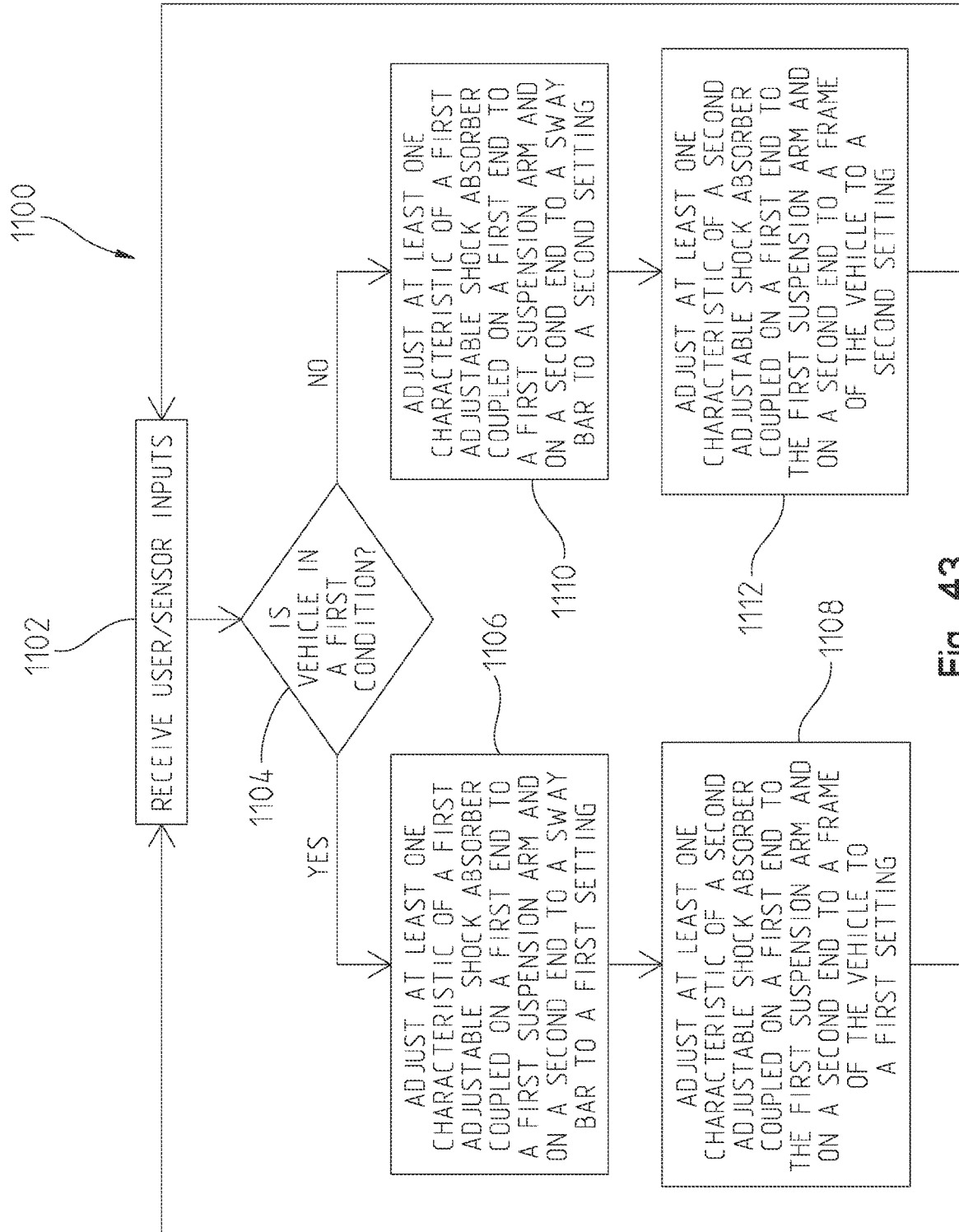
FIG. 43 illustrates another exemplary processing sequence of the shock damping logic of the exemplary control system of FIG. 19 including the control of the adjustable shock absorbers of FIG. 37.

Referring to FIG. 43, an exemplary processing sequence 1100 of shock damping logic 450 of electronic controller 50 is illustrated. Electronic controller 50 receives user and/or sensor inputs, as represented by block 1102. Exemplary user inputs may be received through user interface 62 and include mode selections, manual adjustments, requests to stiffen the suspension through first operator interface 530, or other suitable inputs. Exemplary sensor inputs include one or characteristics of vehicle 200 being monitored by sensors 80.

Electronic controller 50 determines if vehicle 200 is in a first condition, as represented by block 1104. If vehicle 200 is in the first condition, electronic controller 50 adjusts at least one characteristic of a first shock absorber 1000, such as adjustable shock 1050, coupled on a first end to a first suspension arm 266 or suspension arm 300 and on a second end to a sway bar 280, 320 to a first setting, as represented by block 1106. Electronic controller 50 further adjusts at least one characteristic of the corresponding one of left front electronically adjustable shock 290, right front electronically adjustable shock 292, left rear electronically adjustable shock 294, and right rear electronically adjustable shock 296 attached to the same suspension arm 266, 300 as the adjustable shock absorbers 1000 from block 1106 and frame 250 to a first setting (may be different than the first setting of adjustable shock absorber 1000), as represented by block 1108. Electronic controller 50 may, in embodiments, further adjust additional adjustable shock absorbers 1050, such as additional adjustable shocks 1050, and the other of left front electronically adjustable shock 290, right front electronically adjustable shock 292, left rear electronically adjustable shock 294, and right rear electronically adjustable shock 296 based on vehicle 200 being in the first condition. Exemplary first conditions include turning, squatting, diving, rock crawling, a vehicle speed below a first threshold, and other conditions disclosed herein and conditions disclosed in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

If vehicle 200 is not in the first condition, as represented by block 1104, electronic controller 50 adjusts at least one characteristic of a first shock absorber 1000, such as adjustable shock 1050, coupled on a first end to a first suspension arm 266 or suspension arm 300 and on a second end to a sway bar 280, 320 to a second setting, as represented by block 1110. Electronic controller 50 further adjusts at least one characteristic of the corresponding one of left front electronically adjustable shock 290, right front electronically adjustable shock 292, left rear electronically adjustable shock 294, and right rear electronically adjustable shock 296 attached to the same suspension arm 266, 300 as the adjustable shock absorber 1000 from block 1110 and frame 250 to a second setting (may be different than the second setting of adjustable shock absorber 1000), as represented by block 1112. Electronic controller 50 may, in embodiments, further adjust additional adjustable shock absorbers 1000, such as additional adjustable shocks 1050, and the other of left front electronically adjustable shock 290, right front electronically adjustable shock 292, left rear electronically adjustable shock 294, and right rear electronically adjustable shock 296 based on vehicle 200 not being in the first condition.

Figure 44:
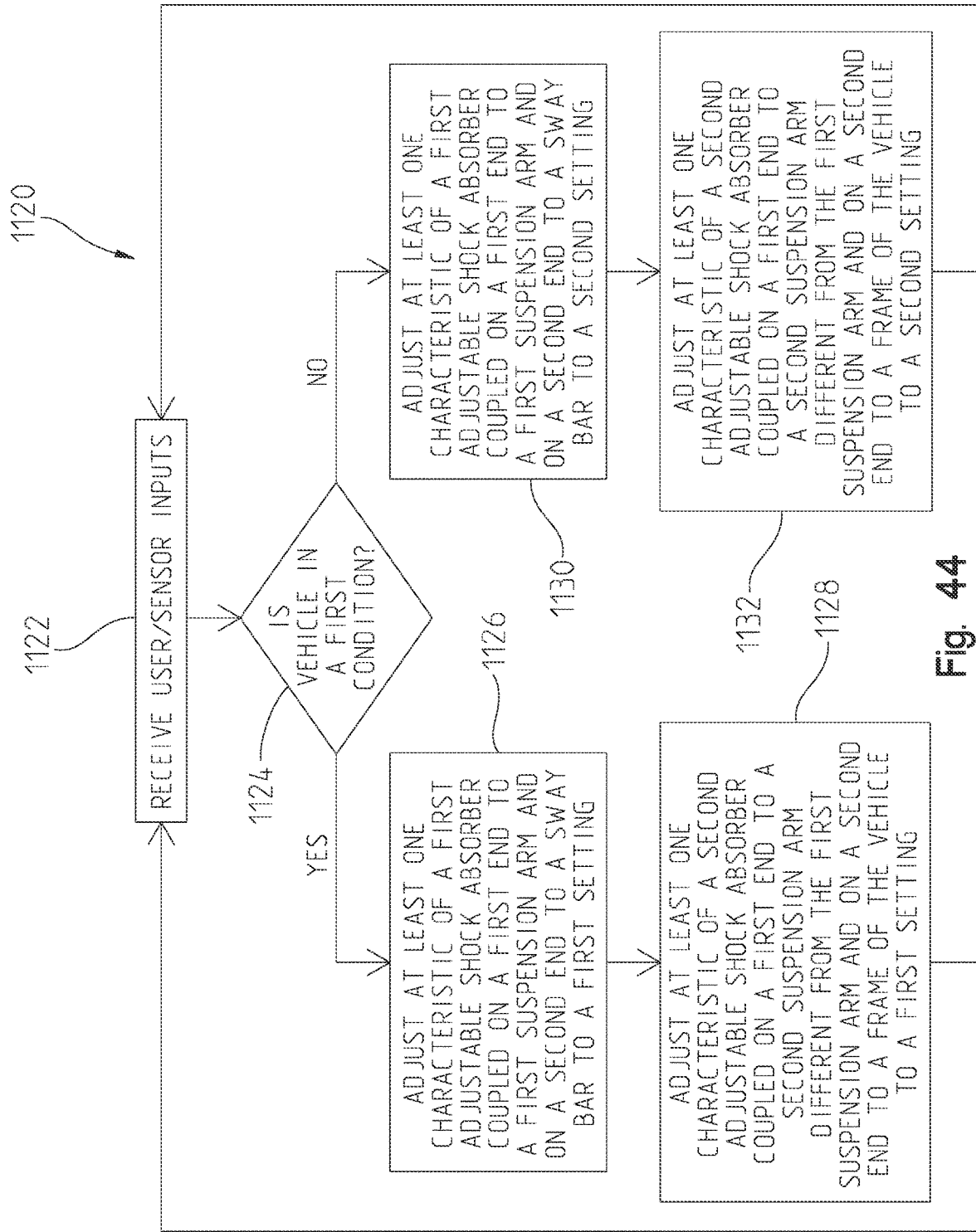
FIG. 44 illustrates yet another exemplary processing sequence of the shock damping logic of the exemplary control system of FIG. 19 including the control of the adjustable shock absorbers of FIG. 37.

Referring to FIG. 44, an exemplary processing sequence 1120 of shock damping logic 450 of electronic controller 50 is illustrated. Electronic controller 50 receives user and/or sensor inputs, as represented by block 1122. Exemplary user inputs may be received through user interface 62 and include mode selections, manual adjustments, requests to stiffen the suspension through first operator interface 530, or other suitable inputs. Exemplary sensor inputs include one or characteristics of vehicle 200 being monitored by sensors 80.

Electronic controller 50 determines if vehicle 200 is in a first condition, as represented by block 1124. If vehicle 200 is in the first condition, electronic controller 50 adjusts at least one characteristic of a first shock absorber 1000, such as shock absorber 1050, coupled on a first end to a first suspension arm 266 or suspension arm 300 and on a second end to a sway bar 280, 320 to a first setting, as represented by block 1126. Electronic controller 50 further adjusts at least one characteristic of one of left front electronically adjustable shock 290, right front electronically adjustable shock 292, left rear electronically adjustable shock 294, and right rear electronically adjustable shock 296 attached to a different suspension arm 266, 300 than the adjustable shock absorber 1000 from block 1126 and frame 250 to a first setting (may be different than the first setting of adjustable shock absorbers 1000), as represented by block 1128. Electronic controller 50 may, in embodiments, further adjust additional adjustable shock absorbers 1000, such as additional adjustable shocks 1050, and additional ones of left front electronically adjustable shock 290, right front electronically adjustable shock 292, left rear electronically adjustable shock 294, and right rear electronically adjustable shock 296 based on vehicle 200 being in the first condition. Exemplary first conditions include turning, squatting, diving, rock crawling, and other conditions disclosed herein and conditions disclosed in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

If vehicle 200 is not in the first condition, as represented by block 1124, electronic controller 50 adjusts at least one characteristic of a first shock absorber 1000, such as adjustable shock 1050, coupled on a first end to a first suspension arm 266 or suspension arm 300 and on a second end to a sway bar 280, 320 to a second setting, as represented by block 1130. Electronic controller 50 further adjusts at least one characteristic of the corresponding one of left front electronically adjustable shock 290, right front electronically adjustable shock 292, left rear electronically adjustable shock 294, and right rear electronically adjustable shock 296 attached to a different suspension arm 266, 300 than the adjustable shock absorber 1000 from block 1130 and frame 250 to a second setting (may be different than the second setting of adjustable shock absorber 1000), as represented by block 1132. Electronic controller 50 may, in embodiments, further adjust additional adjustable shock absorbers 1000, such as additional shocks 1050, and the other left front electronically adjustable shock 290, right front electronically adjustable shock 292, left rear electronically adjustable shock 294, and right rear electronically adjustable shock 296 based on vehicle 200 not being in the first condition.

Figure 41:
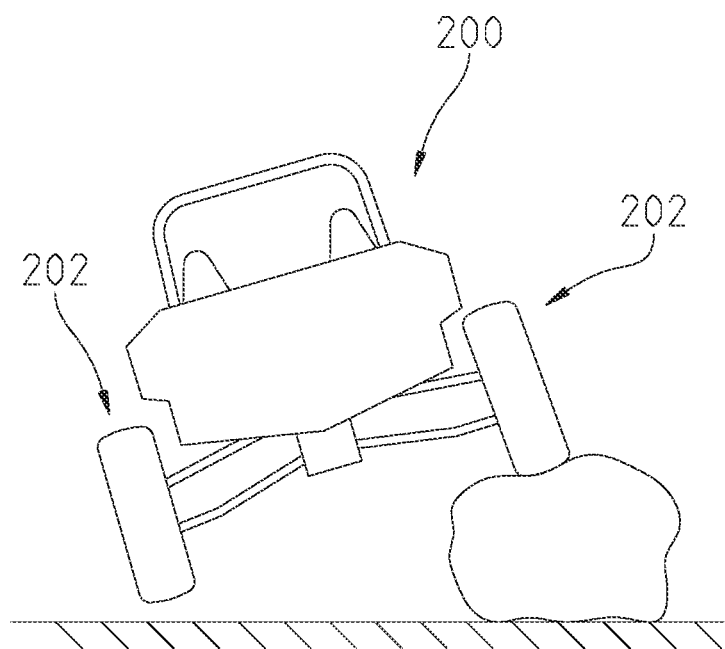
FIG. 41 illustrated the exemplary side-by-side recreational vehicle of FIG. 4 including the suspension system of FIG. 37 with the adjustable shock absorbers of FIG. 38 of a front sway bar in a first setting.
Figure 42:
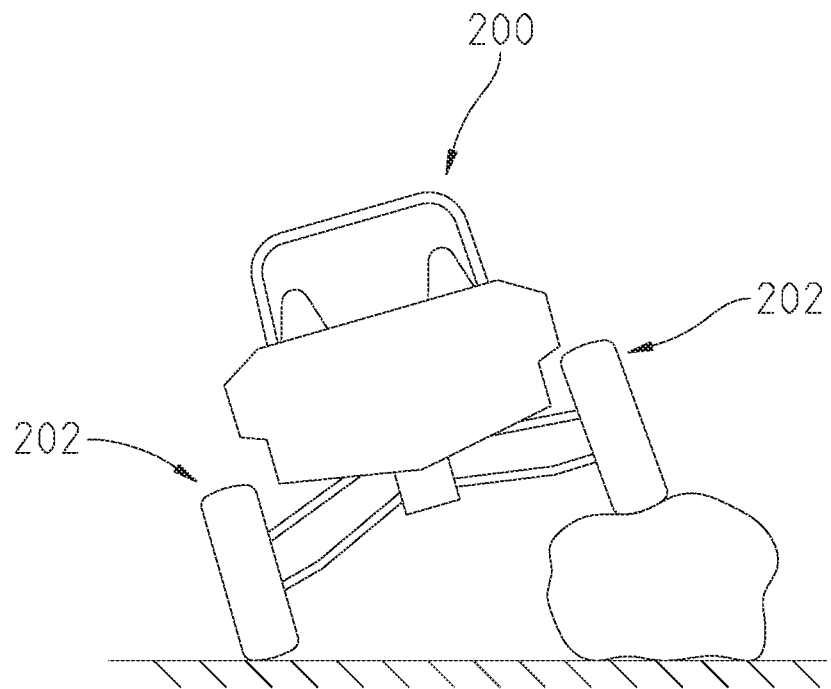
FIG. 42 illustrated the exemplary side-by-side recreational vehicle of FIG. 4 including the suspension system of FIG. 37 with the adjustable shock absorbers of FIG. 38 of a front sway bar in a second setting.

In embodiments, adjustable shock absorber 1000 are altered when vehicle 200 is rock crawling or traversing other large obstacles. Referring to FIG. 41, the adjustable shock absorber 1000 associated with sway bar 280 are in an off setting and a driver side front ground engaging member 202 is positioned on a large rock 1100 resulting in a passenger side front ground engaging member 202 being lifted off of the ground. Referring to FIG. 42, the adjustable shock absorber 1000 associated with sway bar 280 are in an on setting (either fully opened or partially opened) and the driver side front ground engaging member 202 is positioned on large rock 1100 resulting in the passenger side front ground engaging member 202 remaining on the ground. In both FIGS. 41 and 42 (see also sheet A-1), the passenger side adjustable shock absorber 1000 allows full extension of shaft 1060 of adjustable shock absorber 1000, but in only FIG. 42 is the driver side adjustable shock absorber 1000 allowed to compress thereby further lowering the passenger side ground engaging member 202. In FIG. 42, the rebound damping characteristic of right front electronically adjustable shock 292 is also set to promote full extension of right front electronically adjustable shock 292.

In embodiments, vehicle 200 is determined to be rock crawling based on a selection of a user selected mode through user interface 62. In embodiments, vehicle 200 is determined to be rock crawling based on one or more sensor inputs. For example, based on a vehicle speed, vehicle pitch, vehicle roll, relative length of left front electronically adjustable shock 290 and right front electronically adjustable shock 292 (front ground engaging members 202 of vehicle 200 are on a relatively flat surface or are on a non-level surface or surfaces), or the relative positions of lower a-arms 266 (front ground engaging members 202 of vehicle 200 are on a relatively flat surface or are on a non-level surface or surfaces). When it is determined by electronic controller 50 that vehicle 200 is rock crawling then electronic controller 50 alters one or more characteristics of adjustable shock absorbers 1000 associated with sway bar 280 and/or one or characteristics of adjustable shock absorbers 1000 associated with sway bar 320. Further, electronic controller 50 may alter one or characteristics of left front electronically adjustable shock 290, right front electronically adjustable shock 292, left rear electronically adjustable shock 294, and/or right rear electronically adjustable shock 296. In one example, when vehicle 200 is rock crawling, electronic controller 50 alters one or more damping characteristics of left front electronically adjustable shock 290, right front electronically adjustable shock 292, left rear electronically adjustable shock 294, and right rear electronically adjustable shock 296 based on an orientation of vehicle 200 as described in U.S. patent application Ser. No. 16/198,280, filed Nov. 21, 2018, titled VEHICLE HAVING ADJUSTABLE COMPRESSION AND REBOUND DAMPING, the entire disclosure of which is expressly incorporated by reference herein.

In embodiments, when vehicle is traveling at a low rate of speed, such as below 10 miles per hour (mph), adjustable shock absorbers 1000, such as shocks 1050, for each of sway bar 280 and sway bar 320 are configured by electronic controller 50 in a fully open on setting which allows each of the front suspensions 262 and each of rear suspensions 264 to generally act completely independent on generally level ground. A vehicle speed sensor may be used to monitor vehicle speed. As the vehicle speed increases, ground bump frequency increases, and/or a direction of vehicle travel changes, such as turning, electronic controller 50 further alters the configuration or one or more of adjustable shock absorbers 1000, such as shocks 1050.

For example, as vehicle speed increases, electronic controller 50 may further stiffen adjustable shock absorbers 1050 by partially closing valve 1082 and completely closing valve 1082 once the vehicle speed reaches a threshold. Additionally, electronic controller 50 adjusts one or both of the compression damping and rebound damping of one or more of left front electronically adjustable shock 290, right front electronically adjustable shock 292, left rear electronically adjustable shock 294, and right rear electronically adjustable shock 296 due to the increased speed.

As another example, when vehicle 200 is turning electronic controller 50 may alter one or more of adjustable shock absorbers 1050 to partially close or fully close valve 1082 to reduce vehicle roll. Electronic controller 50 may rely on one or more sensors to determine when vehicle 200 is turning and the sharpness of the turn, including IMU 108 (lateral acceleration, vehicle roll), steering angle sensor 106, and a steering rate sensor. In one example, when vehicle 200 is turning to the left, the valve 1082 for the left front adjustable shock absorbers 1050 (in front of the driver) and the valve 1082 for the right rear adjustable shock absorbers 1050 (behind the passenger) are at least partially closed or fully closed by electronic controller 50. Additionally, electronic controller 50 adjusts one or both of the compression damping and rebound damping of one or more of left front electronically adjustable shock 290, right front electronically adjustable shock 292, left rear electronically adjustable shock 294, and right rear electronically adjustable shock 296 due to the turn.

Figure 45:
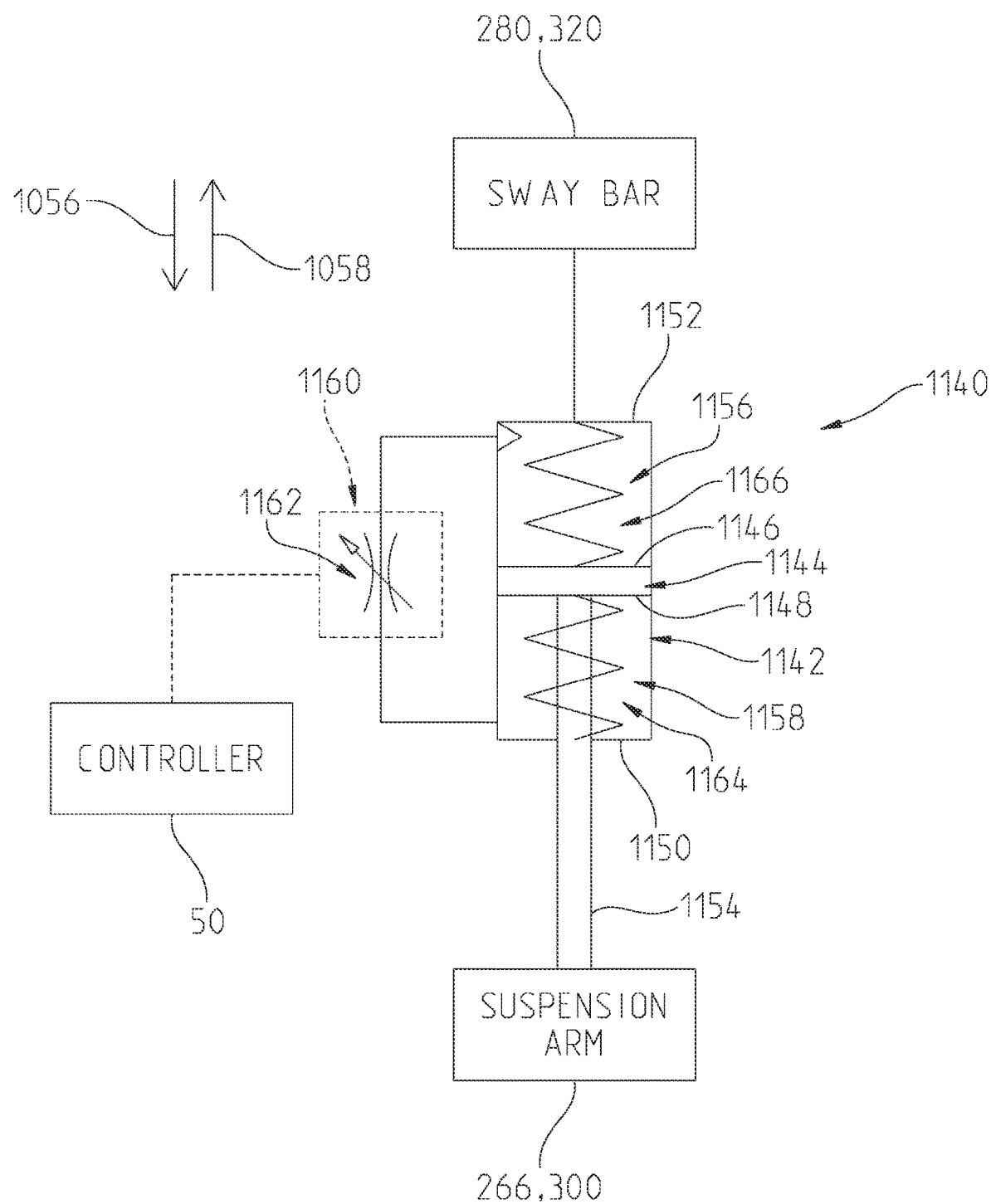
FIG. 45 illustrates another exemplary adjustable shock absorber.

Referring to FIG. 45, another exemplary adjustable shock 1140 which may be implemented as adjustable shock absorber 1000 is illustrated. Adjustable shock absorber 1140 includes a body 1142 having an interior in which a piston 1144 reciprocates in directions 1056, 1058. In the illustrated embodiment, a shaft 1154 moveable with piston 1144 extends from an end 1150 of body 1142 and is moveably coupled to a suspension arm 266 or 300. Another end 1152 of body 1142 is moveably coupled to sway bar 280 or 320. A first spring 1156 is included internal to body 1142 to bias piston 1144 in direction 1056 by being compressed between end 1152 of body 1142 and side 1146 of piston 1144. A second spring 1158 is included internal to body 1142 to bias position 1144 in direction 1058 by being compressed between end 1150 and side 1148 of piston 1144. An advantage, among others of having springs on both sides of piston 1144, is that the springs assist in keeping piston 1144 centered in body 1142. Another advantage, among others, is that a single unit may be provided on one side of the sway bar.

An external fluid control circuit 1160 is provided. Fluid control circuit 1160 controls the movement of fluid between an interior chamber 1164 in the interior of body 1142 and bounded by a first side 1148 of piston 1144 and an interior chamber 1166 in the interior of body 1142 and bounded by a second side 1146 of piston 1144. The ability and the degree of the ease of movement of fluid between chambers 1164 and 1166 along with the stiffness of springs 1156, 1158 control the stiffness of adjustable shock absorber 1140.

External fluid control circuit 1160 includes an electronically controlled compression bypass valve 1162. Valve 1162 controls the movement of fluid between chambers 1164, 1166 thereby allowing piston 1144 to move in directions 1056, 1058. In embodiments, valve 1162 is an on/off valve and when in the on setting permits the movement of fluid between chambers 1164, 1166 and in the off setting prevents the movement of fluid from chambers 1164, 1166. Electronic controller 50 controls the operation of valve 1162 between the on setting and the off setting. In the off setting of valve 1162, adjustable shock absorber 1140 acts similar to a solid link, such as link 282 or link 322. In embodiments, valve 1162 has a variable opening having an off setting (closed) and a plurality of on settings (partial open to full open), each having a different rate of permitted fluid flow between chambers 1164, 1166. Electronic controller 50 controls the operation of valve 1162 including the permitted flow rate in the various on settings and between the various on settings and the off setting.

With the arrangement shown in FIG. 45, when electronically controlled valve 1162 is closed the position of piston 1144 is generally locked in compression and rebound. When electronically controlled valve 1162 is open the position of piston 1144 is free to move in compression and rebound.

In embodiments, an individual adjustable shock absorber 1140 is provided for the connection of each of lower a-arms 266 to sway bar 280 and for the connection of each of trailing arms 300 of rear suspension 264 to sway bar 320. In embodiments, an individual adjustable shock absorber 1140 is provided for the connection of only one of lower a-arms 266 to sway bar 280 and the connection of the other lower a-arm 266 to sway bar 280 is through a solid link. In embodiments, an individual adjustable shock absorber 1140 is provided for the connection of only one of trailing arms 300 of rear suspension 264 to sway bar 320 and the connection of the other trailing arm 300 to sway bar 320 is through a solid link.

Additional exemplary shock absorbers for adjustable shock absorbers 1000 are disclosed in US Published Patent Application No. US2019/0100071.

Figure 46:
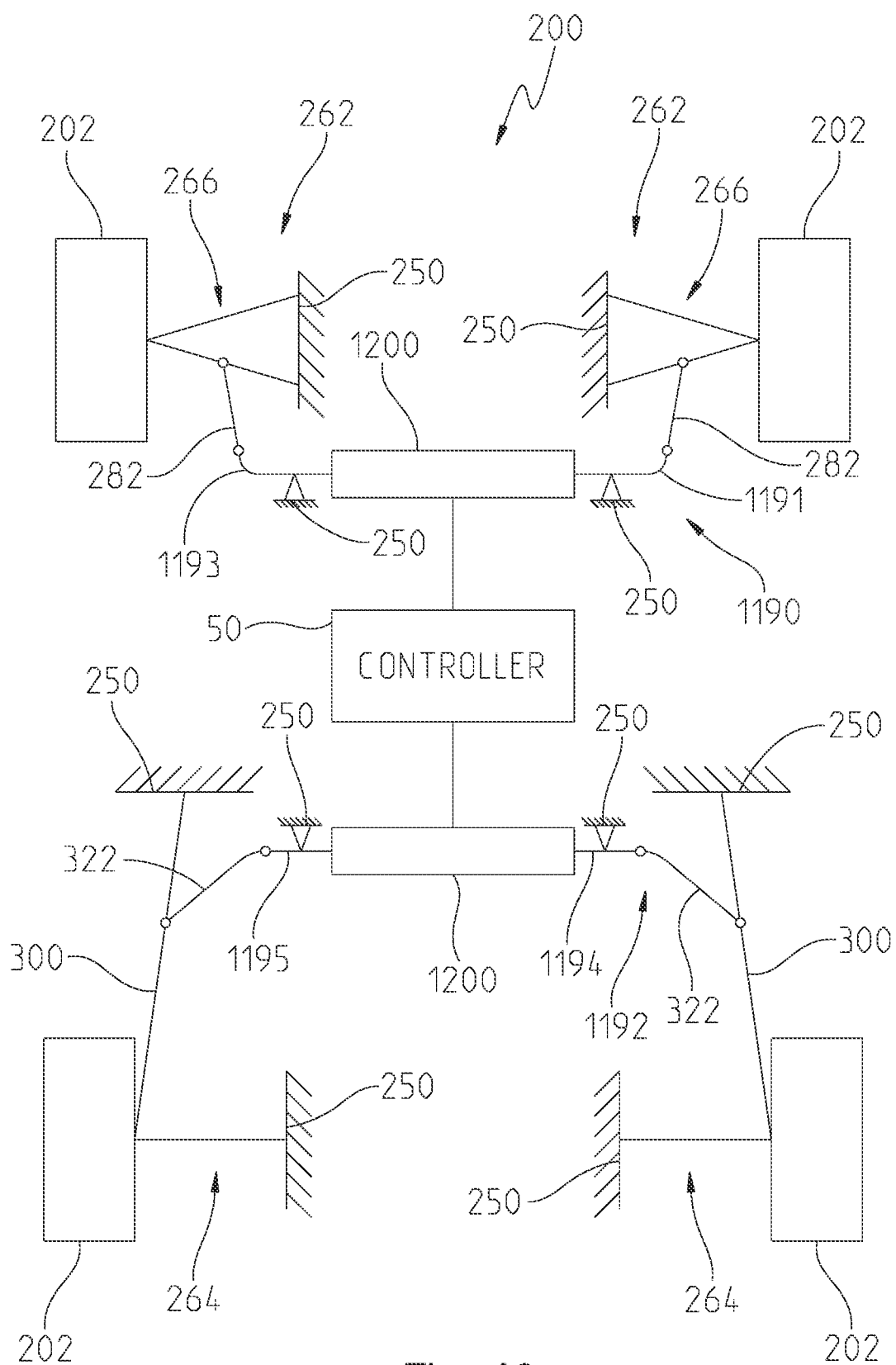
FIG. 46 illustrates a representative view of portions of the suspension of the exemplary side-by-side recreational vehicle of FIG. 4 including sway bars having torque actuators for the respective front and rear suspensions.

Referring to FIG. 46, a representation of vehicle 200 is provided. Links 282 couple front suspensions 262 together through sway bar 1190 and links 322 couple rear suspensions 264 together through sway bar 1192. Sway bar 1190 includes a first section 1191 which is rotatably coupled to right front suspension 262 and frame 250 and a second section 1193 which is rotatably coupled to left front suspension 262 and frame 250. First section 1191 and second section 1193 are coupled together through a torque actuator 1200. In a similar fashion, sway bar 1192 includes a first section 1194 rotatably coupled to right rear suspension 264 and frame 250 and a second section 1195 rotatably coupled to left rear suspension 264 and frame 250. First section 1194 and second section 1195 are coupled together through a torque actuator 1200.

Torque actuator 1200 either acts as a traditional sway bar between the respective two front suspensions 262 and two rear suspensions 264 or proactively induces a torque on at least one of first section 1191 or second section 1193 of sway bar 1190 and/or induces a torque on at least one of first section 1194 or second section 1195 of sway bar 1192. Torque actuator 1200 is operatively coupled to electronic controller 50 which controls the operation of torque actuator 1200. An exemplary torque actuator 1200 is the mechatronic Active Roll Control (eARC) system available from Schaeffler AG located at Industriestraße 1-3 91074 Herzogenaurach Germany. In embodiments, electronic controller 50 further controls left front electronically adjustable shock 290, right front electronically adjustable shock 292, left rear electronically adjustable shock 294, and right rear electronically adjustable shock 296.

Figure 47:
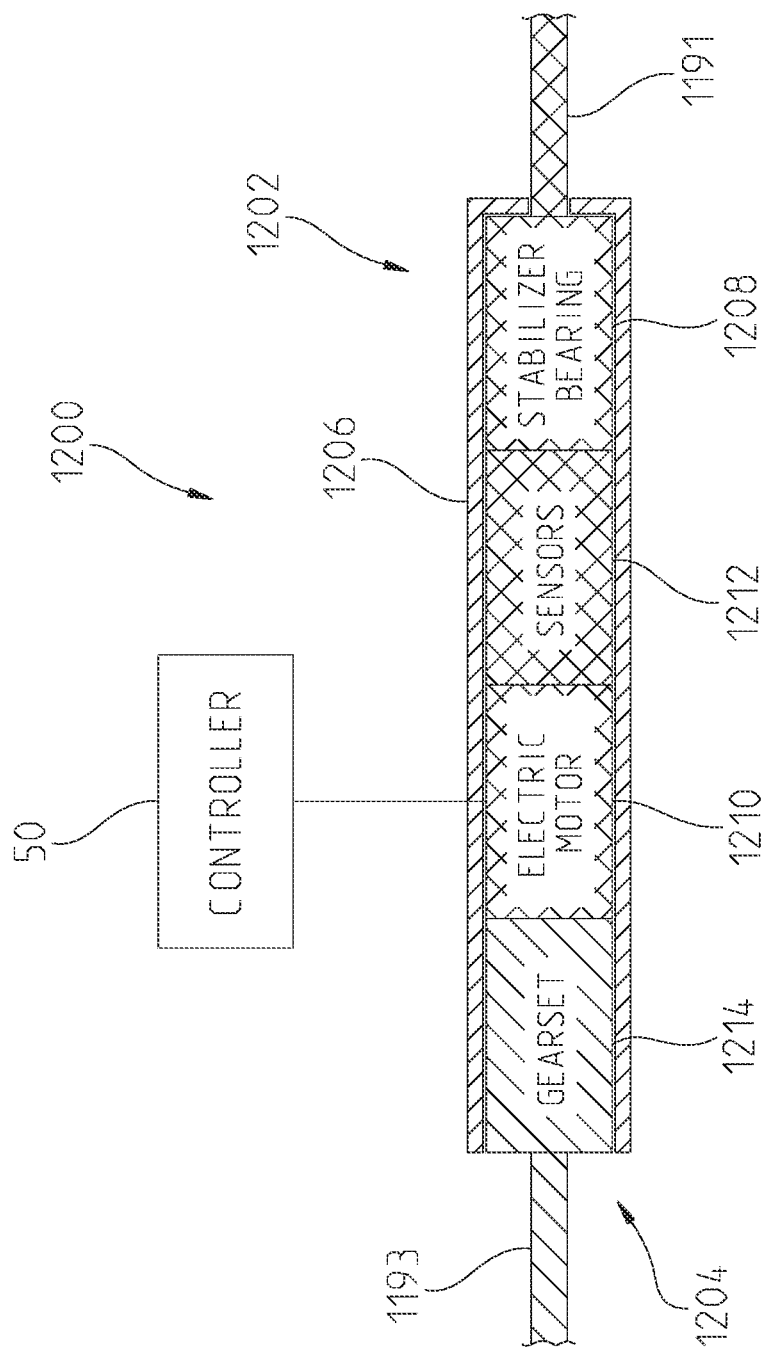
FIG. 47 illustrates a representative view of an exemplary torque actuator.

Referring to FIG. 47, an exemplary torque actuator 1200 is illustrated coupled to first section 1191 and second section 1193 of sway bar 1190. A first portion 1202 of torque actuator 1200 is fixedly coupled to first section 1191 of sway bar 1190 to rotate with first section 1191 and a second portion 1204 of torque actuator 1200 is fixedly coupled to second section 1193 of sway bar 1190 to rotate with second section 1193. First portion 1202 includes a housing 1206 having an electric motor 1210 positioned therein. Electric motor 1210 is fixedly coupled to first section 1191. A stabilizer bearing 1208 supports first section 1191. An output shaft of motor 1210 is fixedly coupled to second section 1193 through a gearset 1212. An exemplary gearset is a planetary gearset. A plurality of sensors 1212 are provided which monitor characteristics of torque actuator 1200. Exemplary sensors 1212 include a motor velocity sensor which monitors a rotational velocity of the output shaft of electric motor 1210, a motor position sensor which monitors a rotational position of the output shaft of motor 1210, a shaft position sensor which monitors a rotational position of the output of gearset 1214, and a shaft velocity sensor which monitors a rotational velocity of the output of gearset 1214.

Electronic controller 50 by inducing a torque on the output shaft of electric motor 1210 in either a first direction or a second direction can induce a torque on one or both of first section 1191 of sway bar 1190 and second section 1193 of sway bar 1190. In embodiments, electronic controller 50 applies torque based on one or more inputs. Exemplary inputs include IMU 108, steering angle sensor 106, vehicle speed sensor 104, selected suspension mode, the rotational velocity of electric motor 1210, the rotational position of the output shaft of electric motor 1210, the rotational position of the output of gearset 1214, and the rotational velocity of the output of the gearset 1214. Electronic controller 50 applies torque by the current level provided to electric motor 1210.

Figure 48:
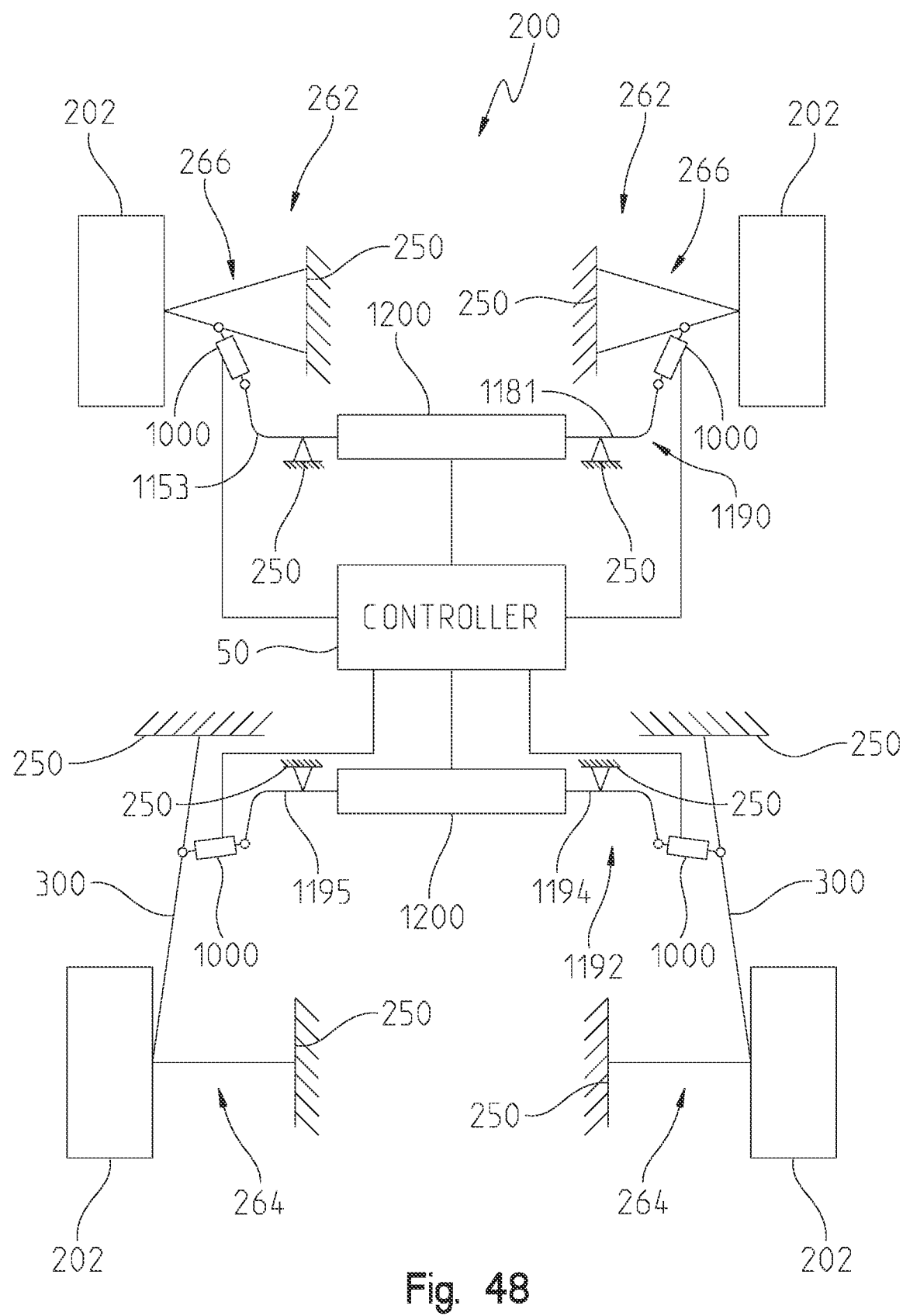
FIG. 48 illustrates a representative view of portions of the suspension of the exemplary side-by-side recreational vehicle of FIG. 4 including sway bars having torque actuators and adjustable shock absorbers coupling the sway bars to the respective front and rear suspensions.

Referring to FIG. 48, a representation of vehicle 200 is shown. The representation in FIG. 48 replaces links 282 and 322 with adjustable shock absorbers 1000 and includes sway bars 1190 and 1192 with torque actuators 1200. Adjustable shock absorbers 1000 and torque actuator 1200 are operatively coupled to electronic controller 50 which controls the operation of each of adjustable shock absorbers 1000 and torque actuator 1200. In embodiments, electronic controller 50 further controls left front electronically adjustable shock 290, right front electronically adjustable shock 292, left rear electronically adjustable shock 294, and right rear electronically adjustable shock 296.

With the inclusion of torque actuator 1200 on sway bar 1190 and sway bar 1192, multiple control processing sequences are provided to increase the performance of vehicle 200.

As explained in US Published Patent Application No. US2020/0156430, the entire disclosure of which is expressly incorporated by reference herein, the damping characteristics of left front electronically adjustable shock 290, right front electronically adjustable shock 292, left rear electronically adjustable shock 294, and right rear electronically adjustable shock 296 are adjusted during cornering. In embodiments, the characteristics of torque actuator 1200 on sway bar 1190 and sway bar 1192 may also be adjusted during cornering. The characteristics of left front electronically adjustable shock 290, right front electronically adjustable shock 292, left rear electronically adjustable shock 294, and right rear electronically adjustable shock 296 and torque actuator 1200 may be adjusted based on a detection of a cornering of vehicle 200 and on the location in a corner (corner entry, mid-corner, corner exit). As discussed in US Published Patent Application No. US2020/0156430, the entire disclosure of which is expressly incorporated by reference herein, the detection of a cornering of vehicle 200 and the location in a corner may be detected based on one or more sensor values. In embodiments, the sharpness of the corner and/or the speed of the vehicle are further considered in the characteristics of left front electronically adjustable shock 290, right front electronically adjustable shock 292, left rear electronically adjustable shock 294, and right rear electronically adjustable shock 296 and torque actuator 1200.

In embodiments, electronic controller 50 determines whether vehicle 200 is cornering (e.g., a turn). Further, electronic controller 50 determines a direction of the turn (e.g., a left turn or a right turn). For example, electronic controller 50 may determine vehicle 200 is cornering and/or direction of the turn based on the steering information indicating a steering rate, angle, and/or position, yaw rate information indicating a yaw rate, and/or the acceleration information indicating a lateral acceleration. Electronic controller 50 may compare the steering rate, steering angle, steering position, yaw rate, and/or lateral acceleration with one or more corresponding thresholds (e.g., pre-determined, pre-programmed, and/or user-defined) to determine if vehicle 200 is cornering. Electronic controller 50 may use the positive and/or negative values of the steering rate, angle, position, yaw rate, and/or lateral acceleration to determine the direction of the turn. Further, electronic controller 50 determines whether vehicle 200 is entering, in the middle of, and/or exiting a corner. Additional details regarding determining when vehicle 200 is cornering, a direction of the turn, and whether vehicle 200 is in the entry of the turn, middle of the turn, or exiting the turn are provided in US Published Patent Application No. US2020/0156430, the entire disclosure of which is expressly incorporated by reference herein.

In embodiments, when vehicle 200 is cornering electronic controller 50 may (based on inputs from the sensors, such as vehicle speed) increase the stiffness of sway bar 1190 during corner entry by increasing a torque applied by torque actuator 1200 of sway bar 1190. An advantage, among others, of increasing the stiffness of sway bar 1190 is to get out tire bite to improve turn in. In other embodiments having adjustable shock absorbers 1000 associated with sway bar 1190, with or without torque actuator 1200, the stiffness of sway bar 1190 may be increased by increasing a stiffness of adjustable shock absorbers 1000 associated with sway bar 1190.

In embodiments, when vehicle 200 is cornering electronic controller 50 may (based on inputs from the sensors, such as vehicle speed) increase the stiffness of sway bar 1192 during mid corner relative to the stiffness of sway bar 1190 by increasing a torque applied by torque actuator 1200 of sway bar 1192 and/or reducing a torque applied by torque actuator 1200 of sway bar 1190. An advantage, among others, of increasing the stiffness of sway bar 1192 over the stiffness of sway bar 1190 is to generate a vehicle more prone to oversteer. In other embodiments having adjustable shock absorbers 1000 associated with sway bar 1190 and sway bar 1192, with or without torque actuator 1200, the stiffness of sway bar 1192 may be increased over the stiffness of sway bar 1190 by increasing a stiffness of adjustable shock absorbers 1000 associated with sway bar 1192 and/or reducing a stiffness of adjustable shock absorbers 1000 associated with sway bar 1190.

In embodiments, when vehicle 200 is performing a sharp turn, such as about 90° or higher) (based on inputs from the sensors, such as longitudinal acceleration) electronic controller 50 may increase the stiffness of sway bar 1190 and decrease the stiffness of sway bar 1192. An advantage, among others, of increasing the stiffness of sway bar 1190 and decrease the stiffness of sway bar 1192 is to make vehicle 200 less prone to tire lift and force traction loss on the front outer tires. In other embodiments having adjustable shock absorbers 1000 associated with sway bar 1190 and sway bar 1192, with or without torque actuator 1200, the stiffness of sway bar 1190 may be increased and the stiffness of sway bar 1192 may be decreased by increasing a stiffness of adjustable shock absorbers 1000 associated with sway bar 1190 and/or reducing a stiffness of adjustable shock absorbers 1000 associated with sway bar 1192.

Additionally, torque actuator 1200 may be adjusted to account for vehicle 200 hitting a bump while turning. Electronic controller 50 senses the direction of turn and the amount of torque on sway bar 1190. If a bump is encountered on the front inside ground engaging member then the stiffness of sway bar 1190 is reduced by adjusting torque actuator 1200. An advantage, among others, of reducing the stiffness is to reduce bottom out of either left front electronically adjustable shock 290 or right front electronically adjustable shock 292 due to sway bar 1190. The force of sway bar 1190 compressing the inside shock of left front electronically adjustable shock 290 and right front electronically adjustable shock 292 reduced and no load from the bump will be transferred by sway bar 1190 to the outside shock of left front electronically adjustable shock 290 and right front electronically adjustable shock 292 causing the shock to compress. In other embodiments having adjustable shock absorbers 1000 associated with sway bar 1190, with or without torque actuator 1200, the stiffness of sway bar 1190 may be decreased by decreasing a stiffness of adjustable shock absorbers 1000 associated with sway bar 1190. If a bump is encountered on the front outside ground engaging member then the stiffness of sway bar 1190 is increased by adjusting torque actuator 1200. An advantage, among others, of increasing the stiffness is to transfer over as much of the hit as possible to the front inside shock of left front electronically adjustable shock 290 and right front electronically adjustable shock 292 to reduce transient roll of vehicle 200 and improve bottom out performance of the outside shock of left front electronically adjustable shock 290 and right front electronically adjustable shock 292. In other embodiments having adjustable shock absorbers 1000 associated with sway bar 1190, with or without torque actuator 1200, the stiffness of sway bar 1190 may be increased by increasing a stiffness of adjustable shock absorbers 1000 associated with sway bar 1190. In embodiments, when at least one torque sensor is associated with sway bar 1190, the torque of a single wheel hit may be measured and the adjustable shock absorbers 1000 and/or torque actuator 1200 of sway bar 1192 may be adjusted in anticipation of the hit.

In embodiments, electronic controller 50 adjusts the stiffness of sway bar 1190 and/or sway bar 1192 by altering a characteristic of the respective torque actuator 1200 to lean vehicle 200 into a high side of vehicle 200, such as a side which is the higher side when vehicle 200 is traveling on a hill side or a side which is raised due to one of the wheels being on a large rock. As disclosed in US Published Patent Application No. US2020/0156430, which is incorporated by reference herein, electronic controller 50 may sense an orientation of electronic controller 50 and adjust the damping characteristics of at least one of left front electronically adjustable shock 290, right front electronically adjustable shock 292, left rear electronically adjustable shock 294, and right rear electronically adjustable shock 296 based on the sensed orientation of vehicle 200. Further, electronic controller 50 may adjust the torque actuator 1200 of one or both of sway bar 1190 and sway bar 1192 to lean vehicle 200 into a high side of vehicle 200, such as a side which is the higher side when vehicle 200 is traveling on a hill side or a side which is raised due to one of the wheels being on a large rock. When vehicle 200 is sensed to have the right side higher than the left side, such as by a threshold amount, torque actuator 1200 of sway bar 1190 is adjusted to apply a torque to second section 1193 of sway bar 1190 to lower second section 1193 and lower a-arm 266 coupled to second section 1193 through link 282 and raise lower a-arm 266 coupled to first section 1191 through link 282 resulting in vehicle 200 leaning into the hillside or rock that is causing the right side of vehicle 200 to be higher than the left side of vehicle 200. When vehicle 200 is sensed to have the left side higher than the right side, such as by a threshold amount, torque actuator 1200 of sway bar 1190 is adjusted to apply a torque to second section 1193 of sway bar 1190 to raise second section 1193 and raise lower a-arm 266 coupled to second section 1193 through link 282 and lower lower a-arm 266 coupled to first section 1191 through link 282 resulting in vehicle 200 leaning into the hillside or rock that is causing the left side of vehicle 200 to be higher than the right side of vehicle 200. In embodiments, electronic controller 50 executes the processing sequence to lean vehicle 200 in response to a mode selection made through operator interface 62, such as a rock crawling mode.

In embodiments, operator interface 62 may have an input whereby an operator may select to raise one side of vehicle 200. For example, when traversing a rock, the operator may position one the left front wheel and the right front wheel on top of the rock and then select through operator interface 62 to alter vehicle 200 to be more level side-to-side. Torque actuator 1200 of sway bar 1190 then applies a torque to raise the other side of vehicle 200. An advantage, among others, would be to assist in vehicle 200 in traversing the obstacle.

In embodiments, operator interface 62 may have an input whereby an operator may select a tire change mode and select the tire to be changed. For example, the operator may select the left front tire to change through operator interface 62. Electronic controller 50 may activate torque actuator 1200 of the one of sway bar 1190 and sway bar 1192 coupled to the tire to be changed to compress the one of left front electronically adjustable shock 290, right front electronically adjustable shock 292, left rear electronically adjustable shock 294, and right rear electronically adjustable shock 296 positioned proximate the tire to be changed (fp290 in the case of the front left tire being changed) and to extend the one of left front electronically adjustable shock 290, right front electronically adjustable shock 292, left rear electronically adjustable shock 294, and right rear electronically adjustable shock 296 opposite the tire to be changed and coupled to the same one of sway bar 1190 and sway bar 1192 (right front electronically adjustable shock 292 associated with the right front tire in the case of the front left tire being changed). Further, electronic controller 50 may activate torque actuator 1200 of the other one of sway bar 1190 and sway bar 1192 not coupled to the tire to be changed to extend the one of left front electronically adjustable shock 290, right front electronically adjustable shock 292, left rear electronically adjustable shock 294, and right rear electronically adjustable shock 296 positioned on the same side of vehicle 200 as the tire to be changed (left rear electronically adjustable shock 294 associated with the left rear tire in the case of the front left tire being changed) and to compress the one of left front electronically adjustable shock 290, right front electronically adjustable shock 292, left rear electronically adjustable shock 294, and right rear electronically adjustable shock 296 on the opposite of vehicle 200 from the tire to be changed and coupled to the other one of sway bar 1190 and sway bar 1192 (right rear electronically adjustable shock 296 associated with the right rear tire in the case of the front left tire being changed) to further raise the tire to be changed.

In embodiments, vehicle 200 may have a demonstration mode which simulates vehicle movement based on operator inputs while prime mover 66 of vehicle 200 is not running. In the demonstration mode, selectable through operator interface 62, one or more of torque actuator 1200 of sway bar 1190, torque actuator 1200 of sway bar 1192, left front electronically adjustable shock 290, right front electronically adjustable shock 292, left rear electronically adjustable shock 294, right rear electronically adjustable shock 296, and adjustable shock absorbers 1000, may be altered by electronic controller 50 to simulate a movement of vehicle 200. In one example, electronic controller 50 leans vehicle 200 to the left in response to steering wheel 276 being turned to the left, leans vehicle 200 to the right in response to steering wheel 276 being turned to the right, and keeps vehicle 200 level when steering wheel 276 is not turned to either the left or right. In one example, electronic controller 50 may actuate the torque actuator 1200 for both sway bar 1190 and sway bar 1192 to lean vehicle 200 to the left when steering wheel 276 is turned to the left by raising second section 1193 of sway bar 1190 and second section 1195 of sway bar 1192 and lowering first section 1191 of sway bar 1190 and first section 1194 of sway bar 1192.

Figure 49:
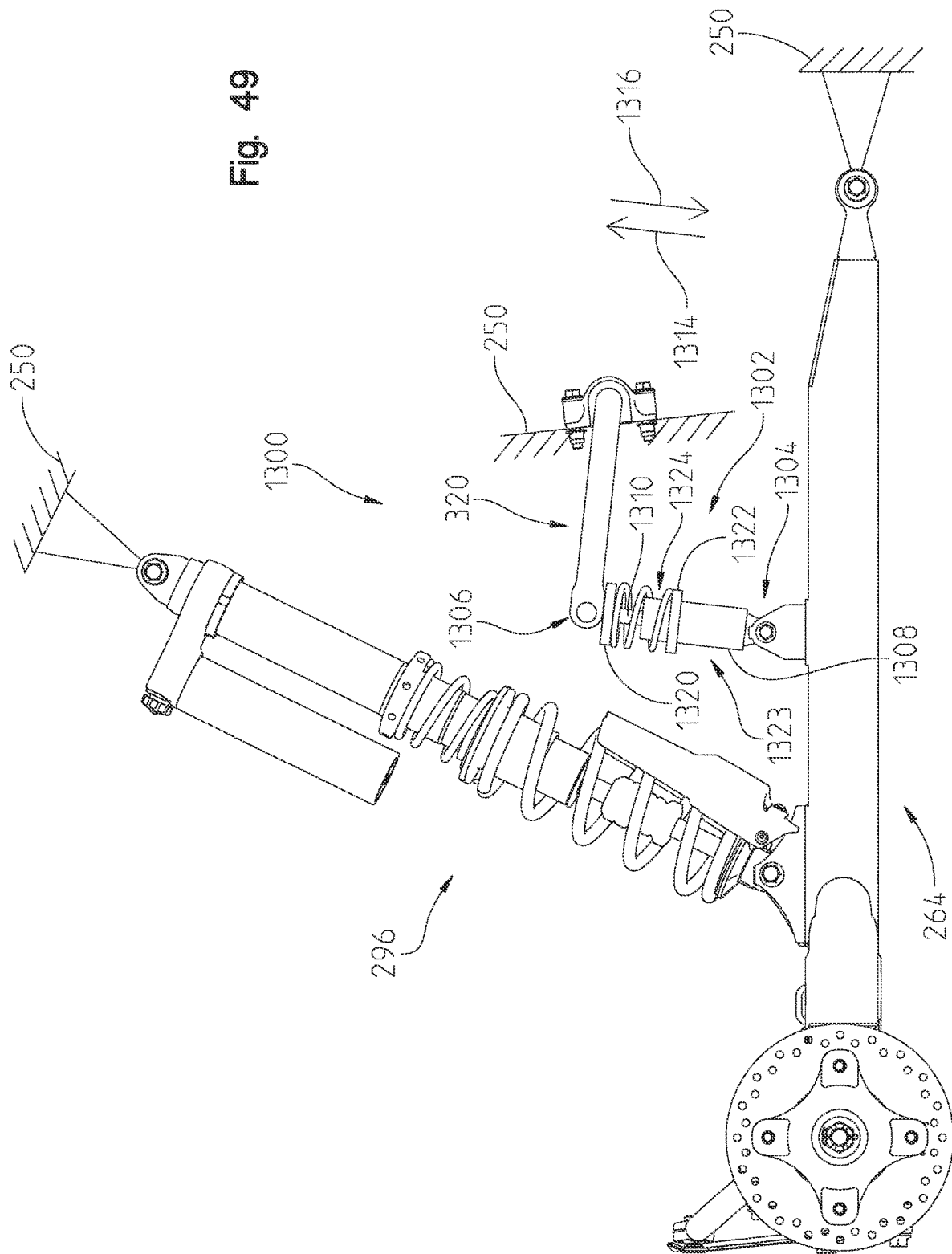
FIG. 49 illustrates an exemplary passive adjustable suspension system of the exemplary side-by-side recreational vehicle of FIG. 4.

Referring to FIG. 49, a passive multi-rate sway bar system 1300 is shown. In the illustrated embodiment, sway bar system 1300 is used to couple rear suspensions 264 together. Sway bar system 1300 may also be used to couple front suspensions 262 together. Additionally, sway bar system 1300 may be implemented along with actively controlled left front electronically adjustable shock 290, right front electronically adjustable shock 292, left rear electronically adjustable shock 294, and right rear electronically adjustable shock 296 or passive shock absorbers for front suspension 262 and/or rear suspension 264.

Sway bar system 1300 includes a sway bar 320 and a damper 1302. Damper 1302, is rotatably coupled to trailing arm 300 at a lower end 1304 and is rotatably coupled to sway bar 320 at an upper end 1306. Damper 1302 includes a shock absorber 1303 having a cylindrical body 1308 and a rod 1310 extending from cylindrical body 1308. Rod 1310 is connected to a piston (not shown) positioned within cylindrical body 1308 and moveable in directions 1314 and 1316 to elongate damper 1302 (movement in direction 1314) and to shorten damper 1302 (movement in direction 1316).

Rod 1310 carries a first stop member 1320 and cylindrical body 1308 carries a second stop member 1322. At least one of first stop member 1320 and second stop member 1322 is adjustable. For example, second stop member 1322 may be threaded onto a portion of cylindrical body 1308 and may be rotated relative to cylindrical body 1308 to raise or lower second stop member 1322 relative to lower end 1304 of damper 1302. A coil spring 1324 is compressed between first stop member 1320 and second stop member 1322.

In embodiments, shock absorber 1303 provides nominal resistance to movement in directions 1314 and 1316. Thus, damper 1302 is controlled by coil spring 1324 and the position of second stop member 1322. In this case, damper 1302 is a non-reservoir coilover shock with no valving. In embodiments, shock absorber 1303 provides a constant resistance for a stroke of rod 1310 up to a first distance (having a combined spring rate of the spring 1324 and sway bar stiffness 320) and acts as a solid link thereafter in the presence of additional torque from trailing arms 300 or sway bar 320 (having a spring rate equal to the sway bar 320 stiffness).

In embodiments, a single damper 1302 is provided on a first side of sway bar 320 (such as one of the driver side of vehicle 200 or the passenger side of vehicle 200) and a solid link 322 is provided on a second side of sway bar 320 (such as the other one of the driver side of vehicle 200 or the passenger side of vehicle 200). In embodiments, a damper 1302 is provided on both sides of sway bar 320 to connect sway bar 320 to each trailing arms 300 of rear suspension 264.

Figure 50:
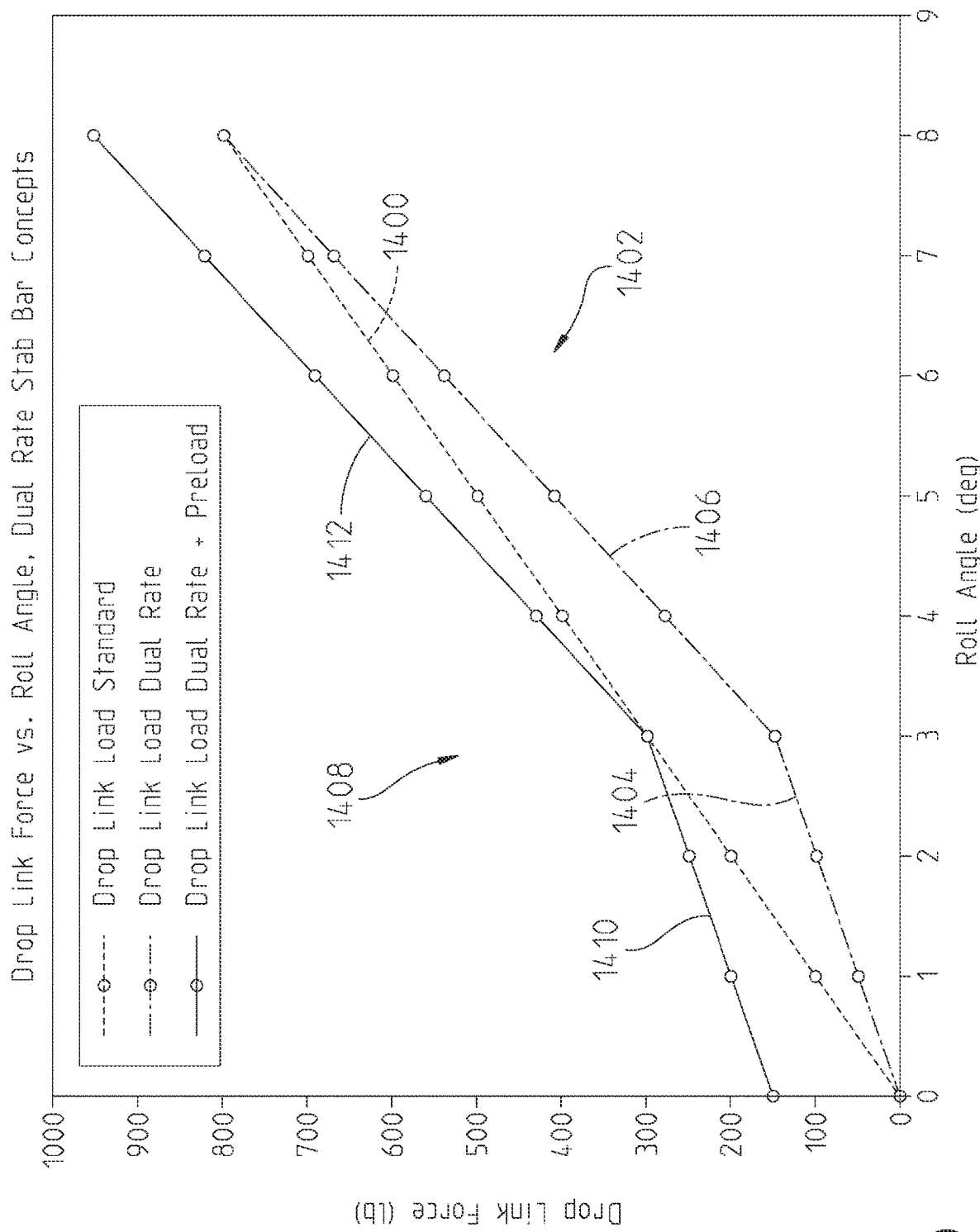
FIG. 50 illustrates representative curves comparing various configurations of the adjustable suspension system of FIG. 49.

Referring to FIG. 50, a theoretical comparison of the drop link force (either links 322 or damper 1302) as a function of roll angle difference between the rear suspension 264. Curve 1400 represents a conventional sway bar 320 with solid drop links 322. Curve 1400 is a linear curve. The slope of curve 1400 is based on the diameter of sway bar 320 and is selected as a compromise between roll control and one or more detractors. Exemplary detractors include reduced ride comfort, reduced traction (cornering, acceleration, braking), increased head toss, reduced articulation, and increased durability requirements for mating components (bushings, bushing clamps, frame mounts, and control arms 300.

Curve 1402 represents the use of damper 1302 as one of the drop links for sway bar 320. Curve 1402 assumes that when suspension arms 300 are at the same height (no twisting of sway bar 320) second stop member 1322 is positioned so that coil spring 1324 is not compressed. Curve 1402 includes a first linear component 1404 and a second linear component 1406. The slope of first linear component 1404 is based on a spring rate of coil spring 1324 and the diameter of sway bar 320. The slope of second linear component 1406 is based on the diameter of sway bar 320. Advantages, among others, of the lower slope of first linear component 1404 of curve 1402 for low roll angles (illustratively 0-3 degrees) compared to curve 1400 include improved ride comfort, compliance, traction, articulation of rear suspension 264, and head toss. The lower slope may result in reduced vehicle responsiveness compared to curve 1400. Advantages, among others, of the higher slope of second linear component 1406 of curve 1402 for higher roll angles (illustratively 3-8 degrees) compared to curve 1400 is it brings the characteristics of vehicle 200 closer to curve 1400 and to mimic the roll feel of solid links during harder cornering events and other high roll events.

Curve 1408 represents the use of damper 1302 as one of the drop links for sway bar 320. Curve 1408 assumes that when suspension arms 300 are at the same height (no twisting of sway bar 320) second stop member 1322 is positioned so that coil spring 1324 is preloaded (partially compressed). This increases the initial force of damper 1302 as shown in FIG. 50. Curve 1408 includes a first linear component 1410 and a second linear component 1412. The slope of first linear component 1410 is based on a spring rate of coil spring 1324 and the diameter of sway bar 320. The slope of second linear component 1412 is based on the diameter of sway bar 320. Advantages, among others, of the lower slope of first linear component 1410 of curve 1408 for low roll angles (illustratively 0-3 degrees) compared to curve 1400 include improved ride comfort, compliance, traction, articulation of rear suspension 264, and head toss. The preloading of damper 1302 maintains a responsiveness of vehicle 200. Advantages, among others, of the higher slope of second linear component 1412 of curve 1408 for higher roll angles (illustratively 3-8 degrees) manages the roll feel of vehicle 200 at higher roll angles.

Figure 52:
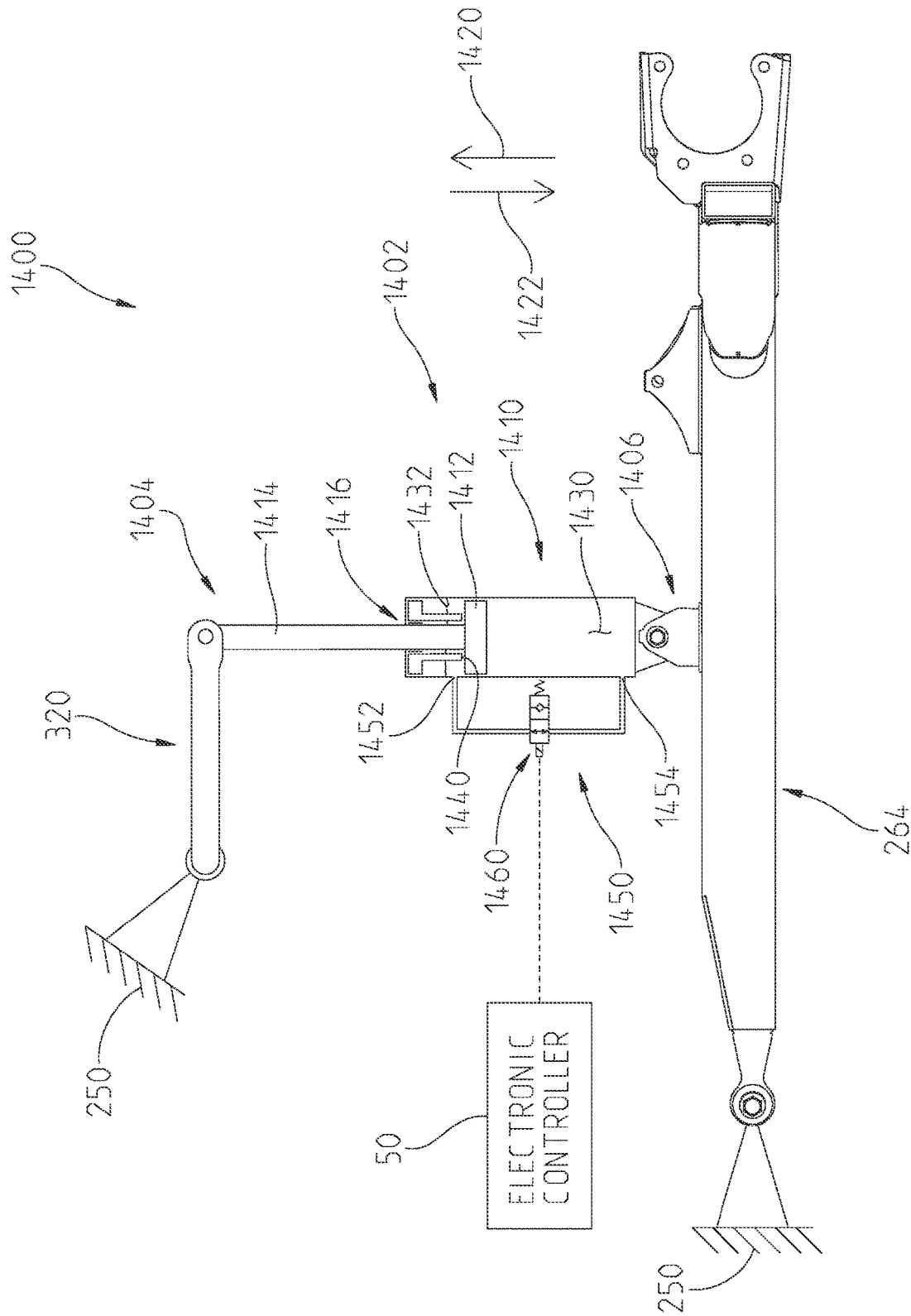
FIG. 52 illustrates an exemplary adjustable suspension system of the exemplary side-by-side recreational vehicle of FIG. 4 having a valve in a first state.

Referring to FIG. 52, a sway bar system 1400 is shown. Sway bar system 1400 includes a shock 1402 having a first end 1404 moveably coupled to sway bar 320 and a second end 1406 moveably coupled to suspension arm 264. Although illustrated with sway bar 320, sway bar system 1400 may also be used in conjunction with sway bar 280 and one of suspension arms 266 and 268.

Shock 1402 includes a body 1410 having a piston 1412 disposed therein. Piston 1412 is coupled to rod 1414 which is received in an opening 1416 of shock 1402. Rod 1414 is rotatably coupled to sway bar 320 and body 1410 is rotatably coupled to suspension arm 264. Piston 1412 is movable within body 1410 in directions 1420 and 1422. The interior 1430 of body 1410 includes a liquid fluid, such as oil, and compressed gas. The interface 1432 between the liquid fluid and the compressed gas is positioned on a top side of piston 1412. The region beneath piston 1412 is completely filled with the liquid fluid. In embodiments, piston 1412 is sealed relative to the interior of body 1410. In embodiments, piston 1412 is sealed relative to the interior of body 1410 has includes no fluid passageways from an upper side of piston 1412 to a lower side of piston 1412.

A stop 1440 is positioned in the interior of body 1410. Stop 1440 limits the movement of piston 1412 in direction 1420. In embodiments, stop 1440 is carried by a spacer positioned about rod 1414. In embodiments, stop 1440 is carried by a seal head of shock 1402.

An external bypass 1450 is operatively coupled to the interior of body 1410 of shock 1402. An upper portion 1452 of external bypass 1450 is coupled above piston 1412 and a lower portion 1454 of external bypass 1450 is coupled below piston 1412. Upper portion 1452 of external bypass 1450 is positioned lower than interface 1432 between the liquid fluid and the compressed gas.

Figure 53:
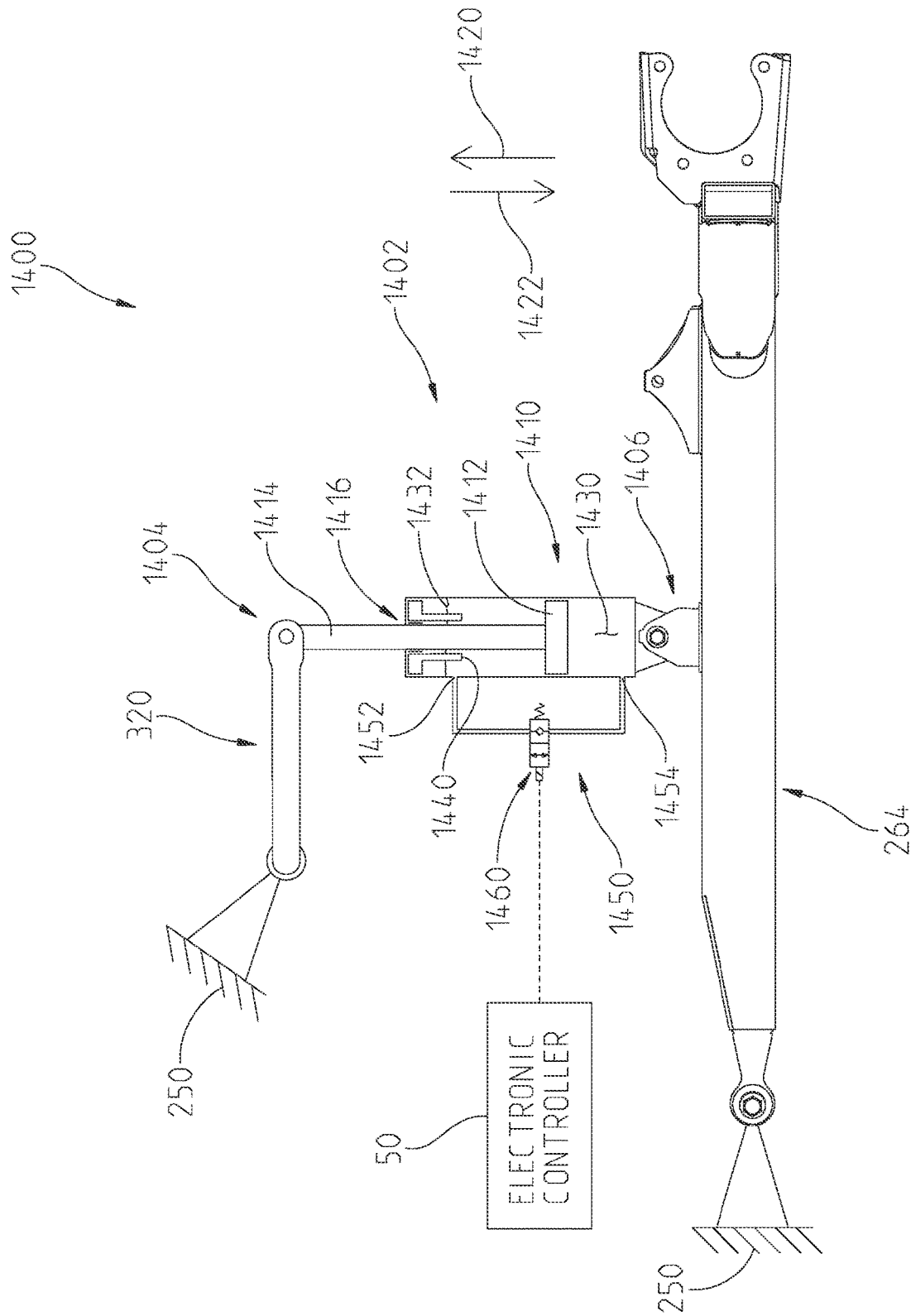
FIG. 53 illustrates the adjustable suspension system of FIG. 52 with the valve in a second state.

External bypass 1450 includes a valve 1460 having a plurality of settings. The position of valve 1460 is controlled by electronic controller 50. In FIG. 52, valve 1460 is in a first position or state wherein the liquid fluid in the interior of body 1410 is free flowing in both compression (movement of piston 1412 in direction 1422) and rebound (movement of piston 1412 in direction 1420). In FIG. 53, valve 1460 is in a second position or state wherein the liquid fluid is free flowing in rebound (movement of piston 1412 in direction 1420) and locked in compression (movement of piston 1412 in direction 1422). In embodiments, in the second position of valve 1460 a check valve is positioned in the fluid passageway of external bypass 1450.

In the arrangement shown in FIGS. 52 and 53, the compressed gas is always on the rebound side of the piston 1412 and not exposed to the high pressures from the compression side of the piston 1412. In embodiments, the compressed gas is retained in a bladder (not shown). When the compressed gas is retained in the bladder, shock 1402 may be installed with the rod side down since the bladder prevents mixing of the liquid fluid and the compressed gas.

In embodiments, electronic controller monitors one or more frame movement characteristics of the vehicle to sense a terrain that the vehicle is traversing. Exemplary movement characteristics of the frame include one or more of the lateral acceleration ($A_{LAT}$), the longitudinal acceleration ($A_{LONG}$), the yaw axis translational acceleration ($A_{VERT}$), the roll axis angular acceleration ($AgrA_{ROLL}$), the pitch axis angular acceleration ($AgrA_{PITCH}$), and the yaw axis angular acceleration ($AgrA_{YAW}$). Each of the lateral acceleration ($A_{LAT}$), the longitudinal acceleration ($A_{LONG}$), and the yaw axis translational acceleration ($A_{VERT}$) are measured by the accelerometers of IMU 108. In embodiments, each of the lateral acceleration ($A_{LAT}$), the longitudinal acceleration ($A_{LONG}$), and the yaw axis translational acceleration ($A_{VERT}$) are transformations (rotational and/or translational) of the accelerations measured by the accelerometers of IMU 108 to the center of gravity of the vehicle. Each of the roll axis angular acceleration ($AgrA_{ROLL}$), the pitch axis angular acceleration ($AgrA_{PITCH}$), and the yaw axis angular acceleration ($AgrA_{YAW}$) are derived from the measurements of the gyroscopes of IMU 108. In embodiments, derivatives are taken of the measured angular velocities of the measurements of the gyroscopes of IMU 108 to obtain each of the roll axis angular acceleration ($AgrA_{ROLL}$), the pitch axis angular acceleration ($AgrA_{PITCH}$), and the yaw axis angular acceleration ($AgrA_{YAW}$). In embodiments, angular velocities may be used in place of angular accelerations.

Electronic controller 50 further analyzes one or more of the lateral acceleration ($A_{LAT}$), the longitudinal acceleration ($A_{LONG}$), the yaw axis translational acceleration ($A_{VERT}$), the roll axis angular acceleration ($Agr_{ROLL}$), the pitch axis angular acceleration ($Agr_{PITCH}$), and the yaw axis angular acceleration ($Agr_{YAW}$) to obtain a frequency spectrum of each one analyzed. In embodiments, the frequency spectrums are determined through a recursive fast Fourier transform (FFT). Based on one or more characteristics of the frequency spectrums, electronic controller 50 is able to determine a terrain that the vehicle is traversing and to alter one or more characteristics of left front electronically adjustable shock 290, right front electronically adjustable shock 292, left rear electronically adjustable shock 294, right rear electronically adjustable shock 296, and/or one or more of the adjustable sway bars described herein. In embodiments, electronic controller 50 selects a first baseline damping profile from a plurality of baseline damping profiles based on the one or more characteristics of the frequency spectrums, and optionally, additional sensor inputs. In embodiments, electronic controller 50 selects a first baseline damping profile from a plurality of baseline damping profiles based on the one or more characteristics of the frequency spectrums, such as applying bandpass filters in certain frequency ranges and optionally, additional sensor inputs. Exemplary bandpass filters would include between about 2 to about 4 Hz for whoops and between about 8 to about 12 Hz for chatter.

Figure 54:
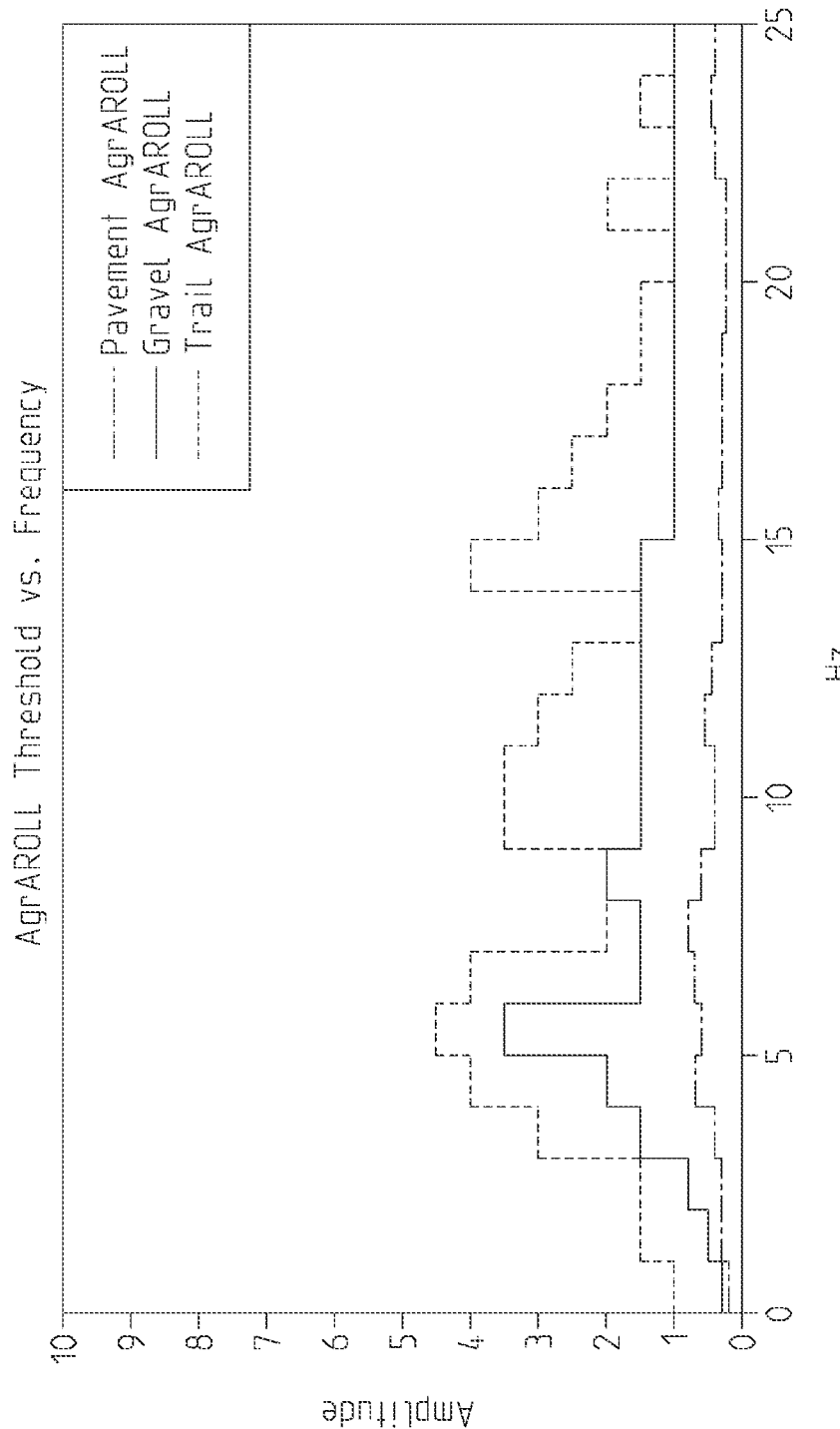
FIG. 54 illustrates exemplary limit curves for the adjustable suspension system.

As an example, electronic controller 50 selects one of eight baseline damping profiles based on one or more characteristics of the frequency spectrums and additional sensor inputs. Eight exemplary baseline damping profiles in Rock mode, Mud mode, Pavement mode, Gravel mode, Trail mode, Chatter mode, Whoops mode, and Rough Trail mode. An exemplary Rock mode is established based on a speed of the vehicle being below a first threshold and the amplitudes of the frequency spectrums for each of the lateral acceleration ($A_{LAT}$), the longitudinal acceleration ($A_{LONG}$), and the yaw axis translational acceleration ($A_{VERT}$) being below respective limit curves for a first frequency range. An exemplary Mud mode is established based on a speed of the vehicle being below a first threshold and the amplitudes of the frequency spectrums for each of the roll axis angular acceleration ($AgrA_{ROLL}$) and the yaw axis angular acceleration ($AgrA_{YAW}$) being below respective limit curves for a first frequency range. An exemplary Pavement mode is established based on the amplitudes of the frequency spectrums for each of the roll axis angular acceleration ($AgrA_{ROLL}$) and the yaw axis angular acceleration ($AgrA_{YAW}$) being below respective limit curves for a first frequency range. An exemplary Gravel mode is established based on the amplitudes of the frequency spectrums for each of the roll axis angular acceleration ($AgrA_{ROLL}$) and the pitch axis angular acceleration ($AgrA_{PITCH}$) being below respective limit curves for a first frequency range. In a variation, the amplitude of the limit curves for the Gravel mode are greater than the amplitude of the limit curves for the Pavement mode for the roll axis angular acceleration ($AgrA_{ROLL}$). An exemplary Trail mode is established based on the amplitudes of the frequency spectrums for each of the roll axis angular acceleration ($AgrA_{ROLL}$) and the pitch axis angular acceleration ($AgrA_{PITCH}$) being below respective limit curves for a first frequency range. In a variation, the amplitude of the limit curves for the Trail mode are greater than or equal to the amplitude of the limit curves for the Gravel mode for the roll axis angular acceleration ($AgrA_{ROLL}$). Referring to FIG. 54, exemplary limit curves of the roll axis angular acceleration ($AgrA_{ROLL}$) for each of the Pavement mode, the Gravel mode, and the Trail mode are shown for the frequency range of 0-25 Hz. An exemplary Chatter mode is established based on the amplitudes of the frequency spectrum of the pitch axis angular acceleration ($AgrA_{PITCH}$) being below respective limit curves for a first frequency range and the frequency spectrum of the roll axis angular acceleration ($AgrA_{ROLL}$) being unbounded and greater than Trail Mode. An exemplary Whoops mode is established based on the amplitudes of the frequency spectrum of the roll axis angular acceleration ($AgrA_{ROLL}$) being below respective limit curves for a first frequency range and the frequency spectrum of the pitch axis angular acceleration ($AgrA_{PITCH}$) being unbounded and greater than Trail Mode. The catch-all or default Rough Trail mode is established based on the frequency spectrum of the roll axis angular acceleration ($AgrA_{ROLL}$) being unbounded and greater than Trail Mode and the frequency spectrum of the pitch axis angular acceleration ($AgrA_{PITCH}$) being unbounded and greater than Trail Mode. in FIG. 54 over a frequency range of 0-25 Hertz. The exemplary limit curves have amplitude limits set for 1 HZ wide frequency bins, more or less frequency bins may be used.

In embodiments, to limit the frequency of switching between baseline damping profiles, the analyzed frequency spectrum must fail the respective limit curves for a set number of test cycles. In examples, a given test cycle is every 5 milliseconds. In embodiments, the analyzed frequency spectrum must fail for a first number of frequency bins or a first percentage of frequency bins to change terrain modes. In embodiments, the number of test cycles required to cause a switch of terrain modes is dependent on the number of frequency bins that fail for the current terrain (faster for more failures).

In embodiments, a vehicle equipped with the processing sequences to determine terrain condition based on frequency response may be used to provide trail maps to a community of users. The vehicle would be driven over a trail or other terrain and based on the frequency responses determine appropriate damping characteristics for the suspensions. These damping characteristics or simply a mode selection are communicated to a remote computing device which stores the data. Other vehicles may access the stored data and use the recorded damping characteristics or mode selection to adjust suspension characteristics on those vehicles based on a GPS location of the vehicle. In other examples, users may access the stored data and be presented with a visual map of the trail with color coding of the terrain conditions of the trail.

In embodiments, the terrain mode is selected by the user and the frequency spectrum analysis is used to make adjustments up or down for the baseline damping characteristics of the selected mode. In embodiments, the user may select an Automatic mode and the system uses the frequency spectrum analysis as described herein to determine damping characteristics based on the sensed terrain.

In embodiments, determining the terrain the vehicle is traveling over, as discussed herein, can be used to further refine various vehicle systems. For example, a surface friction estimate may be included for the determined terrain and used in one or more control systems, such as tractive limits, brake pressure application, vehicle speed estimator, and/or powertrain control.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
a plurality of wheels;
a seating area, and a first portion of the plurality of wheels positioned forward of the seating area and a second portion of the plurality of wheels positioned rearward of the seating area;
a suspension supporting at least one wheel of the plurality of wheels;
a torsion coupler configured to twist in response to tilting of the vehicle; and
an electronically controlled shock absorber connecting the torsion coupler and the suspension;
wherein at least a first portion of the suspension overlaps in front of the electronically controlled shock absorber and at least a second portion of the suspension is positioned behind the electronically controlled shock absorber when viewed from a front of the vehicle, and each of the torsion coupler and the electronically controlled shock absorber are positioned forward of the seating area.

2. The vehicle of claim 1, including a first arm and a second arm;
wherein the first arm includes the first portion and the second arm includes the second portion;
wherein at least a portion of the second arm overlaps behind the electronically controlled shock absorber when viewed from the front of the vehicle.

3. The vehicle of claim 1, wherein the suspension comprises:
a lower arm; and
an upper arm arranged above the lower arm;
wherein at least a portion of the electronically controlled shock absorber is positioned higher than the lower arm and lower than the upper arm when viewed from the front of the vehicle.

4. The vehicle of claim 3, wherein the electronically controlled shock absorber is connected to the lower arm.

5. The vehicle of claim 2, wherein the suspension comprises:
an upper arm having a front portion and a rear portion;
wherein the electronically controlled shock absorber overlaps behind the front portion when viewed from the front of the vehicle and overlaps in front of the rear portion when viewed from the front of the vehicle.

6. The vehicle of claim 1, wherein the electronically controlled shock absorber includes a body with an interior cavity containing fluid, the body being surrounded in a front to rear direction by the suspension.

7. The vehicle of claim 1, wherein the torsion coupler and the electronically controlled shock absorber connect a left suspension and a right suspension, and the electronically controlled shock absorber includes a bypass valve to adjust an ease of movement of a fluid in the electronically controlled shock absorber.

8. The vehicle of claim 1, further comprising a power system including a half shaft coupled to at least one wheel of the plurality of wheels, and a portion of the electronically controlled shock absorber is positioned longitudinally rearward of the half shaft.

9. The vehicle of claim 1, further comprising a frame supported by the plurality of wheels and a steering assembly supported by the frame, the steering assembly comprising a tie rod coupled to the at least one wheel, the electronically controlled shock absorber positioned longitudinally forward of the tie rod.

* * * * *